United States Patent
Paladugu et al.

(10) Patent No.: US 9,596,552 B2
(45) Date of Patent: Mar. 14, 2017

(54) FEATURES AND OPTIMIZATIONS FOR PERSONAL COMMUNICATION DEVICE BASED PUBLIC ADDRESSING SYSTEM

(71) Applicant: Qualcomm Incorporated, San Diego, CA (US)

(72) Inventors: Karthika Paladugu, San Diego, CA (US); Soham Vikrambhai Sheth, San Diego, CA (US); Arungundram Chandrasekaran Mahendran, San Diego, CA (US); Prasana Angolkar, San Diego, CA (US); Soumya Das, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 55 days.

(21) Appl. No.: 14/831,782

(22) Filed: Aug. 20, 2015

(65) Prior Publication Data

US 2016/0142839 A1  May 19, 2016

Related U.S. Application Data

(60) Provisional application No. 62/080,200, filed on Nov. 14, 2014, provisional application No. 62/156,841, filed on May 4, 2015.

(51) Int. Cl.
| | | |
|---|---|---|
| *H04R 27/00* | (2006.01) | |
| *H04L 29/06* | (2006.01) | |
| *H04R 3/02* | (2006.01) | |
| *H04W 4/00* | (2009.01) | |

(Continued)

(52) U.S. Cl.
CPC ......... *H04R 27/00* (2013.01); *H04L 65/1069* (2013.01); *H04L 65/4038* (2013.01); *H04L 65/80* (2013.01); *H04R 3/02* (2013.01); *H04W 4/008* (2013.01); *H04W 76/023* (2013.01);
(Continued)

(58) Field of Classification Search
CPC . H04L 65/4038; H04L 65/1069; H04L 65/80; H04W 76/023; H04W 84/12; H04W 4/008; H04R 27/00; H04R 3/02; H04R 2420/07; H04R 2227/003
See application file for complete search history.

(56) References Cited

U.S. PATENT DOCUMENTS

| | | |
|---|---|---|
| 6,327,276 B1 | 12/2001 | Robert et al. |
| 6,785,339 B1 | 8/2004 | Tahernezhaadi et al. |
| 7,249,185 B1 | 7/2007 | Shaffer et al. |

(Continued)

FOREIGN PATENT DOCUMENTS

WO      2007081180 A1     7/2007

OTHER PUBLICATIONS

Partial International Search Report—PCT/US2015/060739—ISA/EPO—Feb. 4, 2016.

*Primary Examiner* — Muhammad N Edun
(74) *Attorney, Agent, or Firm* — Foley & Lardner LLP

(57) ABSTRACT

Systems and methods are described herein, a method including, but not limited to, transmitting, at a first frame time, a first number of redundant data packets; transmitting, at a second frame time, a second number of redundant data packets in response to data packet loss beyond a predetermined tolerance level, the second number being greater than the first number; and transmitting, at a third frame time, a third number of redundant data packets, the third number is between the first number and the second number.

29 Claims, 34 Drawing Sheets

(51) Int. Cl.
*H04W 76/02* (2009.01)
*H04W 84/12* (2009.01)

(52) U.S. Cl.
CPC .... *H04R 2227/003* (2013.01); *H04R 2420/07* (2013.01); *H04W 84/12* (2013.01)

(56) References Cited

U.S. PATENT DOCUMENTS

| | | | |
|---|---|---|---|
| 7,370,362 B2 * | 5/2008 | Olson | H04L 63/1433 |
| | | | 726/25 |
| 7,577,454 B2 | 8/2009 | Park et al. | |
| 7,751,348 B2 | 7/2010 | Shaffer et al. | |
| 7,809,390 B2 | 10/2010 | Shaffer et al. | |
| 8,112,077 B2 | 2/2012 | Schmidt et al. | |
| 8,452,026 B2 | 5/2013 | Sherman | |
| 8,885,539 B2 | 11/2014 | Trudeau et al. | |
| 2006/0268851 A1 | 11/2006 | Baratakke et al. | |
| 2007/0263824 A1 | 11/2007 | Bangalore et al. | |
| 2010/0150120 A1 * | 6/2010 | Schlicht | H04W 4/20 |
| | | | 370/338 |
| 2010/0150373 A1 | 6/2010 | Sheth et al. | |
| 2014/0078916 A1 | 3/2014 | Kjeldaas et al. | |
| 2014/0219261 A1 | 8/2014 | Johnsson | |
| 2014/0256286 A1 * | 9/2014 | Rangarajan | H04L 63/205 |
| | | | 455/410 |
| 2016/0142453 A1 | 5/2016 | Paladugu et al. | |
| 2016/0142840 A1 | 5/2016 | Das et al. | |

* cited by examiner

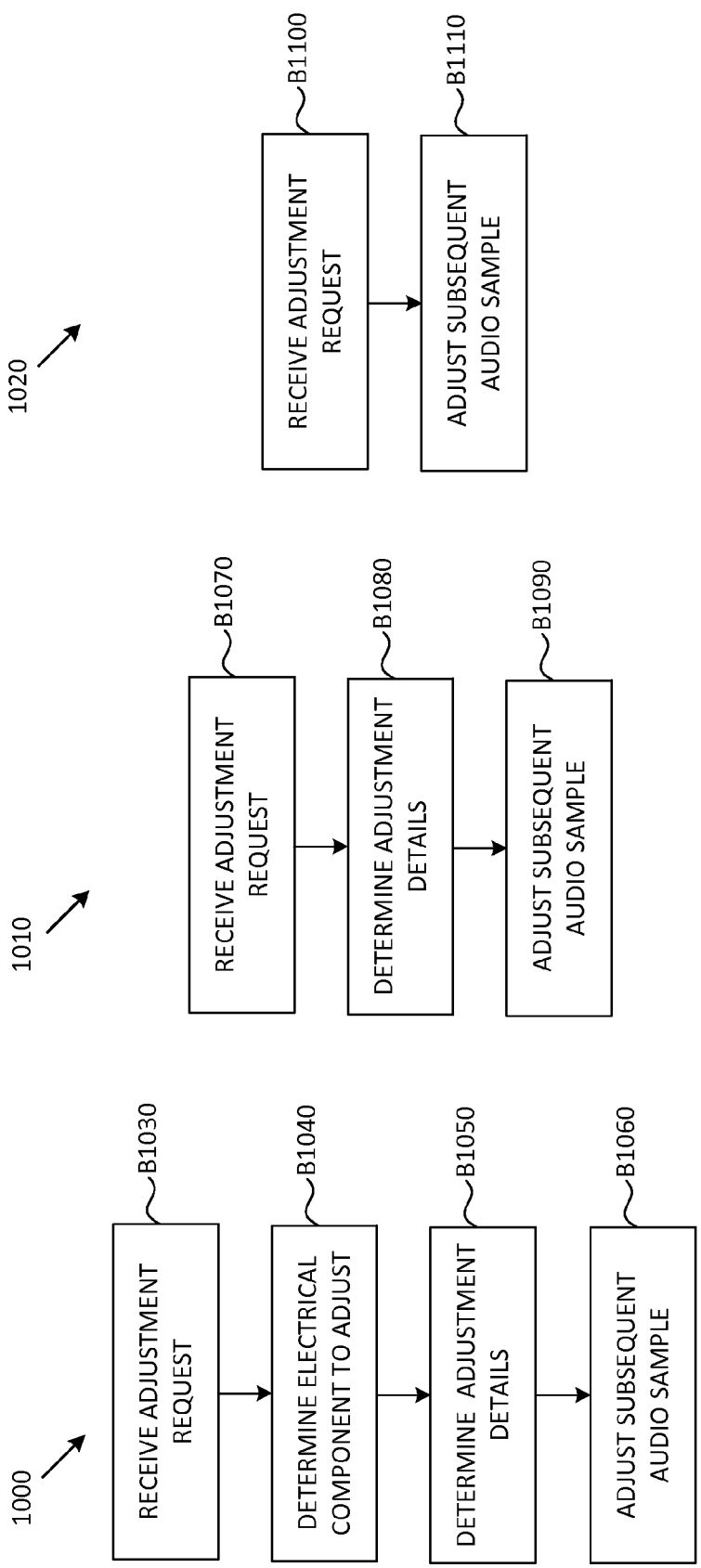

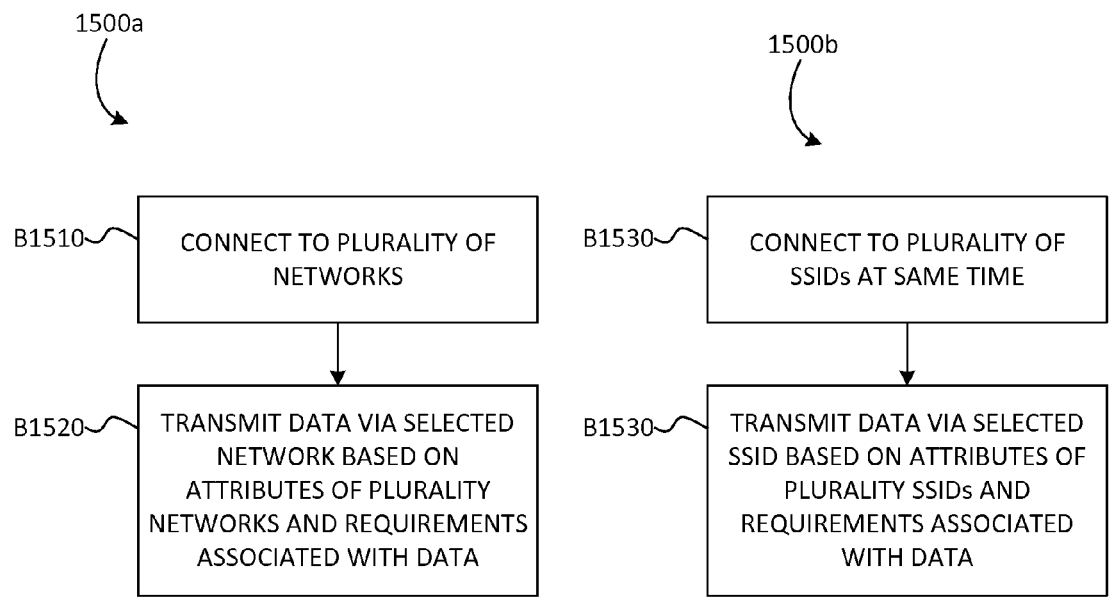
FIG. 15A
FIG. 15B
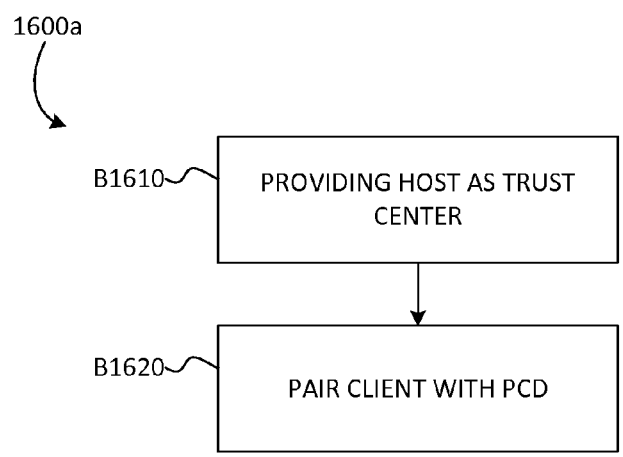
FIG. 16A

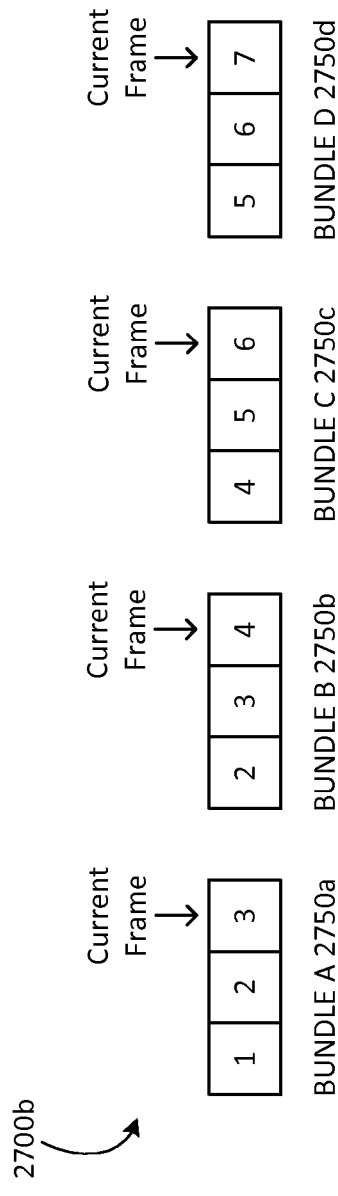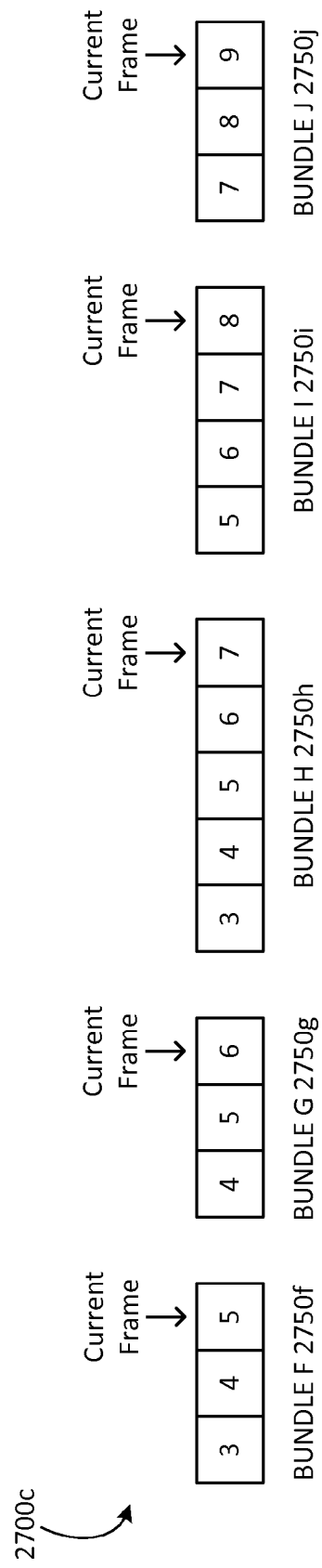
FIG. 27B
FIG. 27C

| Channel Conditions | QoS on PCD? | QoS on Client? | PCD Bluetooth On? | Dejitter Buffer Size? |
|---|---|---|---|---|
| 2.4 GHz | NO | NO | NO | 80 ms |
| 2.4 GHz | YES | NO | NO | 60 ms |
| 2.4 GHz | NO | NO | YES | 100 ms |
| 5 GHz | NO | NO | NO | 60 ms |

FIG. 30

FEATURES AND OPTIMIZATIONS FOR PERSONAL COMMUNICATION DEVICE BASED PUBLIC ADDRESSING SYSTEM

CROSS-REFERENCE TO RELATED PATENT APPLICATIONS

The present application claims the benefit of U.S. Provisional Patent Application No. 62/080,200 filed on Nov. 14, 2014, the disclosure of which is expressly incorporated herein by reference in its entirety. This application also claims benefit of U.S. Provisional Patent Application No. 62/156,841, titled AUDIO SIGNAL ADJUSTMENT FOR MOBILE PHONE BASED PUBLIC ADDRESSING SYSTEM, filed on May 4, 2015 which is incorporated herein by reference, in its entirety. This application relates to application Ser. No. 14/213,445, filed on Mar. 14, 2014, which claims priority to PCT/US2015/019533 filed Mar. 9, 2015, both which are incorporated herein by reference in their entireties. This application also relates to attorney docket number 150699U2, titled FEATURES AND OPTIMIZATIONS FOR PERSONAL COMMUNICATION DEVICE BASED PUBLIC ADDRESSING SYSTEM, filed on Aug. 20, 2015 which is incorporated herein by reference in its entirety. This application also relates to application Ser. No. 14/804,116, filed on Jul. 20, 2015, which is incorporated herein by reference in its entirety.

BACKGROUND

1. Field

The disclosure relates, generally, to public addressing (PA) systems and methods and, in particular embodiments, to systems and methods in which one or more personal communication devices (PCDs) are operated as a microphone for a PA system. Further embodiments relate to a PCD configured to operate with such systems and methods.

2. Background

PA systems can be used in various contexts, including conferences, meetings, seminars, concerts, and other events or activities, to amplify an audio input, such as a person's voice, a group of peoples' voices, music, or other sounds, and broadcasts the amplified sound through one or more electronic speaker devices, to an audience or persons attending the event or activity. For example, one or more hosts or attendees of such an event or activity may desire to access the PA system (as a speaker) to speak, give lectures, add comments, ask or answer questions, or the like. A microphone may be passed or delivered to that host or attendee, to allow the host or attendee to speak through the PA system. Passing and delivering of a microphone through an audience or group of attendees can be inconvenient, and can result in significant pauses between speakers of an audio program. To avoid the need to pass and deliver microphones through an audience, PCDs (such as, but not limited to, mobile phones) may be implemented to interface with the PA system in a manner such that one or more selected PCDs may act as a microphone for the PA system. Given the popularity of PCDs in modern society, hosts or attendees of an event or activity may likely carry their own PCDs. By configuring such PCDs and the PA system to interface, the hosts or attendees may employ their own PCDs as a microphone for the PA system.

However, when using a PCD as a microphone in a PA system, feedback (also known as howling) can occur when a sound that has been captured, amplified, and broadcasted by the PA system is recaptured by the microphone of the PCD and amplified/broadcasted again. In this manner, a loop is created such that the sound is continuously being re-amplified over a short period of time. Such loops produce, with the speakers of the PA system, a high-pitched (howling) sound that can be very unpleasant to the audience or attendees. PCDs with sensitive microphones can tend to create feedback when used as microphones to the PA systems.

Moreover, feedback can be more likely to occur, if audio signals (from multiple PCDs) having different amplitude ranges are fed into the input of the PA system. Conventional PA systems configured to suppress feedback for a first amplitude range, may not be capable of suppressing feedback for a second amplitude range which is greater than the first amplitude range. Thus, the conventional PA systems may not support feedback suppression for PCDs that output audio signals to the PA systems at different amplitude ranges.

One factor contributing to audio signals having different amplitude ranges is that PCDs may include hardware (such as, but not limited to, microphones) with different performance characteristics. This is at least partially because the various PCDs carried by audience members or attendees of an event or activity may be made by different manufacturers, may be different models from the same manufacturer, or may contain hardware from different component suppliers, such that the hardware may have different performance characteristics.

Another factor is that the speaking habits of different PCD users tend to be different from each other. For example, some users may speak loudly (or keep the PCD close) while other users may speak softly (or keep PCD far). Yet another factor is that different electronic speaker devices in a PA system may have different performance characteristics related to outputting sound. Some other factors include, but are not limited to, the speaking user's (speaker's) distance from the electronic speaker devices, the PCD microphone's frequency response, the sensitivity of the PCD microphone, the direction of the PCD microphone relative to the user, the acoustics of the room or area in which the PA system broadcasts, the direction of the electronic speaker devices with respect to speaking user's (speaker's) location, and/or the like.

SUMMARY

Systems and methods for managing, controlling, and optimizing a public addressing (PA) system are described herein, where source data for the PA system is being captured by a plurality of personal communication devices (PCDs). While systems and methods of particular embodiments relate to audio data and PA systems, one of ordinary skill in the art should appreciate that further embodiments may be employed in other applications relating to data processing optimization, and the like. In particular, latency improvement processes, howling suppression processes, service set identifier optimization processes, and device-to-device optimization processes described herein for PA system and method embodiments, may be implemented for other suitable systems and methods processing other suitable data types.

In various embodiments, a method for data communication in a PA system is described, including, but not limited to, transmitting, by a client, non-audio data to a PCD in response to detecting a first triggering event, the non-audio data is used to prevent the PCD from sending an Address Resolution Protocol (ARP) request to refresh the ARP cache on the PCD and to disable the client from entering into a power-saving mode. The first triggering event includes at least one of: (1) the PCD's position in a queue to use the PA system, or (2) the PCD has been granted to use the PA system. The method further includes receiving, by the client, audio data from the PCD with the refreshed ARP cache.

In some embodiments, the non-audio data is transmitted to the PCD when the client has not received the audio data from the PCD and when the PCD is queued to use the PA system.

In various embodiments, the non-audio data is transmitted to the PCD when the PCD has been granted to use the PA system. The queue includes requests to access the PA system from a plurality of PCDs.

In various embodiments, the method further includes receiving, by the client, bidirectional non-audio data from the PCD in response to detecting the first triggering event, the bidirectional non-audio data includes at least a ping request or ping response.

In various embodiments, the method further includes receiving, by the client, unidirectional non-audio data from the PCD to disable the power-saving mode when the PCD is muted, at a shorter interval as compared to the non-audio data sent to prevent ARP cache refresh.

In some embodiments, the PCD outputs the audio data captured by the PCD when granted to use the PA system. The non-audio data is at least one of ping or User Datagram Protocol (UDP).

In some embodiments, the non-audio data is being transmitted via at least one best efforts flow.

In various embodiments, the audio data is being transmitted via at least one Quality of Service (QoS) flow.

In some embodiments, the client sends the non-audio data to the PCD periodically in response to the first triggering event.

In some embodiments, the method further includes: determining, by the client, a second triggering event and disabling, by the client, a power-saving mode of the client in response to the second triggering event.

In some embodiments, the second triggering event is launching an application on the client.

In some embodiments, the second triggering event is selecting the PCD from a plurality of PCDs to output audio data captured by the PCD.

In some embodiments, the client disables the power-saving mode by calling an Application Programming Interface (API) to disable the power-saving mode.

In some embodiments, the method further includes: determining, by the client, a third triggering event, and enabling, by the client, the power-saving mode of the client in response to the third triggering event.

In some embodiments, the third triggering event is terminating an application on the client.

In some embodiments, the third triggering event is receiving an indication to enable the power-saving mode from a host.

In some embodiments, the third triggering event is terminating outputting audio data captured by the PCD.

In some embodiments, the audio data is transmitted without vocoding, by transmitting Pulse-Code Modulation (PCM) frames.

According to some embodiments, a method for data communication in a PA system, including: receiving, by a PCD, non-audio data from a client in response to a first triggering event being detected by the client, the non-audio data is used to prevent the PCD from sending an ARP request to refresh the ARP cache on the PCD. The first triggering event includes at least one of: (1) the PCD's position in a queue to use the PA system; or (2) the PCD has been granted to use the PA system. The method further includes transmitting, by the PCD, audio data to the client without sending ARP refresh request.

In various embodiments, the method further includes transmitting, by the PCD at a first frame time, a first number of redundant data packets of the audio data, transmitting, by the PCD at a second frame time, a second number of redundant data packets of the audio data in response to data packet loss beyond a predetermined tolerance level, the second number being greater than the first number, and transmitting, by the PCD at a third frame time, a third number of redundant data packets of the audio data, the third number is between the first number and the second number.

In various embodiments, the method further includes determining whether the data packet loss is beyond the predetermined tolerance level. The first frame time is prior in time as compared to the second frame time. The second frame time is prior in time as compared to the third frame time.

In some embodiments, the redundant data packets are audio data packets from audio frames transmitted prior in time.

In various embodiments, the method further includes transmitting, at a fourth frame time, the first number of redundant data packets, the first frame time being prior in time as compared to the fourth frame time.

In some embodiments, the predetermined tolerance level is at least one of a number of total data packets lost or a number of continuous data packets lost.

In some embodiments, the method further includes receiving user input related to gain adjustment of the audio data via an interface, caching the gain adjustment based on the user input, and adjusting the audio data based on the cached gain adjustment.

In some embodiments, the gain adjustment is normalized across a plurality of PCDs. The gain is adjusted at the client using Automatic Gain Control (AGC). The gain is adjusted at each of the plurality of PCDs using the AGC or the Dynamic Range Compression (DRC) based on at least one of device capabilities or changing the frequency of the output signal in random or pre-determined manner.

In some embodiments, the method further includes connecting, by the PCD, to a plurality of networks, the network includes two or more networks associated with at least one of a cellular network, WiFi network with multiple Service Set Identifiers (SSIDs) and transmitting the audio data via a selected one of the plurality of networks based on attributes of the plurality of networks and requirements associated with the audio data.

In some embodiments, the method further includes receiving identification information of the client from a host and pair with the client in a Device-to-Device (D2D) link, the D2D link includes at least one of a Wifi-Direct link or Long Term Evolution (LTE)-Direct link.

According to some embodiments, a non-transitory computer medium storing computer-executable instructions such that, when executed, causes a processor of a client in a PA system to: transmit non-audio data to a PCD in response to detecting a first triggering event, the non-audio data is used to prevent the PCD from sending an ARP request to refresh the ARP cache on the PCD, wherein the first triggering event includes at least one of: (1) the PCD's position in a queue to use the PA system, or (2) the PCD has been granted to use the PA system. The processor is further configured to receive audio data from the PCD with the refreshed ARP cache.

In some embodiments, a method for data communication in a PA system, includes connecting, by a PCD, to a plurality of SSIDs of a Wireless Local Area Network (WLAN) network at a same time, and selecting, by the PCD, one of the plurality of SSIDs to transmit data based on attributes associated with each of the plurality of SSIDs and requirements associated with the data.

BRIEF DESCRIPTION OF THE DRAWINGS

FIGS. 10A-10C illustrate process flowcharts of methods performed in response to adjustment requests according to various embodiments.

FIG. 15A is a process flowchart illustrating an example of a generalized connectivity selection method according to various embodiments.

FIG. 15B is a process flowchart illustrating an example of a SSID-based connectivity selection method according to various embodiments.

FIG. 16A is a process flowchart illustrating an example of a device-to-device (D2D) link establishing method according to some embodiments.

FIG. 27B is a diagram illustrating an example of a redundant transmission scheme with a same number of packets being transmitted at each bundle.

FIG. 27C is a diagram illustrating an example of a redundant transmission scheme with dynamically changing numbers of packets being transmitted at each bundle.

FIG. 30 is a mapping table illustrating examples of predetermined correspondence between the de jitter buffer size and the wireless link delay variation.

DETAILED DESCRIPTION

In general, various embodiments relate to systems and methods for audio signal adjustment for a public addressing (PA) system, in which personal communication devices (PCDs) are employed as microphones. Particular embodiments relate to systems and methods of manually and/or automatically adjusting audio signal for a PA system, to suppress or otherwise manage feedback in the PA system. Further embodiments relate to PA systems that include such systems and methods, and PCDs configured to interface in such PA systems.

Figure 1:
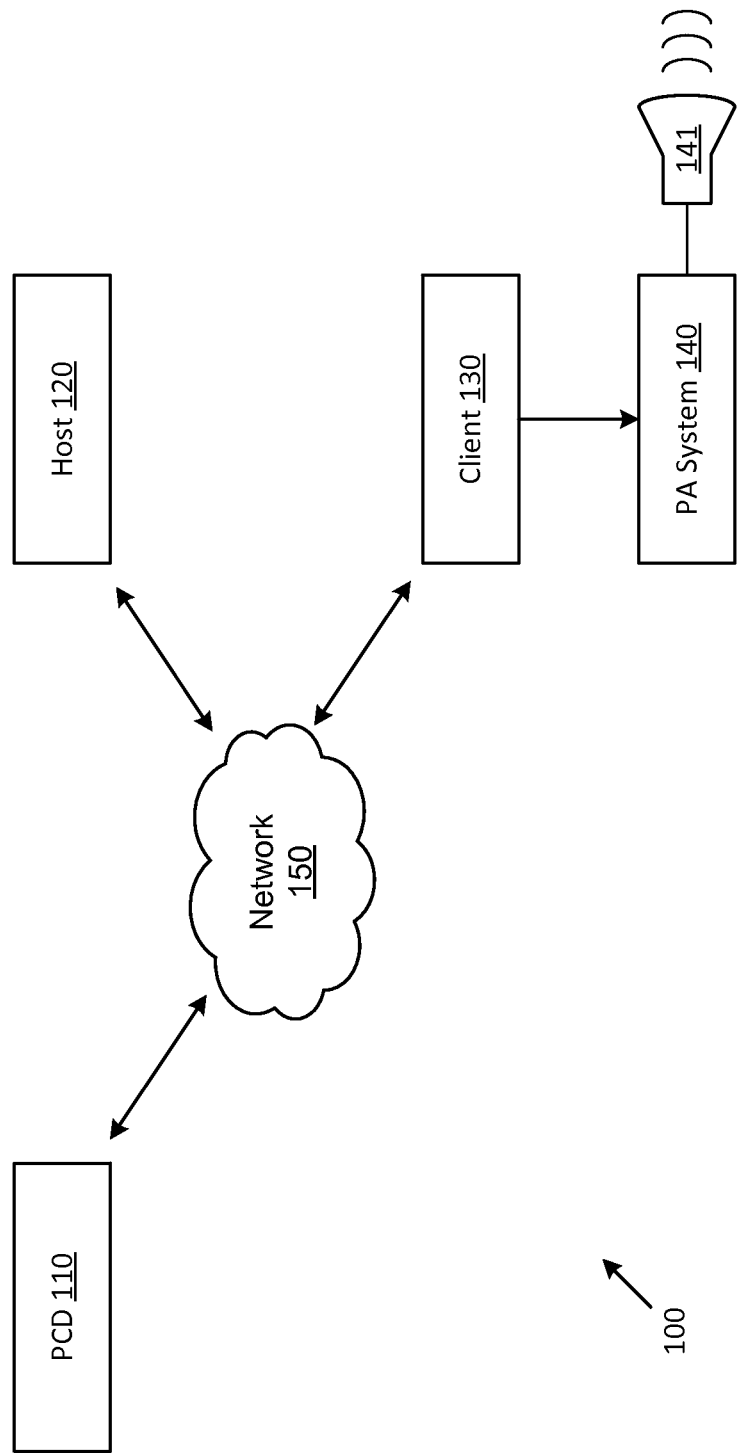
FIG. 1 is a diagram illustrating an audio signal adjustment system according to various embodiments.

Referring to FIG. 1, a system 100 is illustrated in accordance with various embodiments. The system 100 may include or operate with one or more PCDs 110 (where one PCD 110 is shown in FIG. 1) connected for communication on a network 150. The system 100 may further include a host 120, a client 130, and a PA system 140. The PA system 140 may include at least one electronic speaker device 141 configured to broadcast sound. In particular embodiments, the PA system 140 may include, but is not limited to, a home-theater system, an ad-hoc PA system, a karaoke system, or other audio output system that includes at least one electronic speaker device or other audio output device. In some embodiments, the one or more PCDs 110, the host 120, and the client 130 may be connected for communication with one another, through the communication network 150. The network 150 may provide for data transmission between two or more of the components (such as, but not limited to, the PCD 110, the host 120, the client 130, and the PA system 140) of system 100. The network 150 may be any suitable wired or wireless communication network. The client 130 and the PA system 140 may be connected to each other through a wired or wireless connection or network. In particular embodiments, the PCD 110, the host 120, the client 130, and the PA system 140 may be connected to each other through the same network 150, or through multiple, separate or interconnected networks or connections.

In some embodiments, each of the components 110, 120, 130, 140 may be provided in a separate processing device (such as, but not limited to, provided in a separate device or housed in a separate device housing having its own processor). Providing each of the components 110, 120, 130, 140 in a separate device may provide finer granularity. As the total amount of processing of the system 100 is shared by multiple components 110, 120, 130, 140, the overall efficiency of audio signal adjustment may be improved given that the finer granularity can lead to shorter execution time.

In other embodiments, two or more of the components 110, 120, 130, 140 may be provided by the same device. In one example, the host 120 and the client 130 may be provided in one device (such as, but not limited to, a smart phone or a tablet). In yet another example, the client 130 and the PA system 140 may be provided in one device (such as, but not limited to, the PA system 140). In yet another example, the PCD 110 and the host 120 may be provided in one device (such as, but not limited to, the PCD 110). In yet another example, the PCD 110 and the client 130 may be provided in one device (such as, but not limited to, the PCD 110). In yet another example, the PCD 110, the host 120, and the client 130 may be provided in one device (such as, but not limited to, the PCD 110). Those examples are for illustrative purposes and are not meant to provide an exhaustive list. An advantage associated with providing two or more of the components 110, 120, 130, 140 in one (a common) device is that such components may utilize greater processing power and memory capacity of the device. For example, the processing capabilities of some modern PCDs (such as, but not limited to, smartphones) can allow such devices to implement two or more of the components 110, 120, 130, 140.

Figure 2:
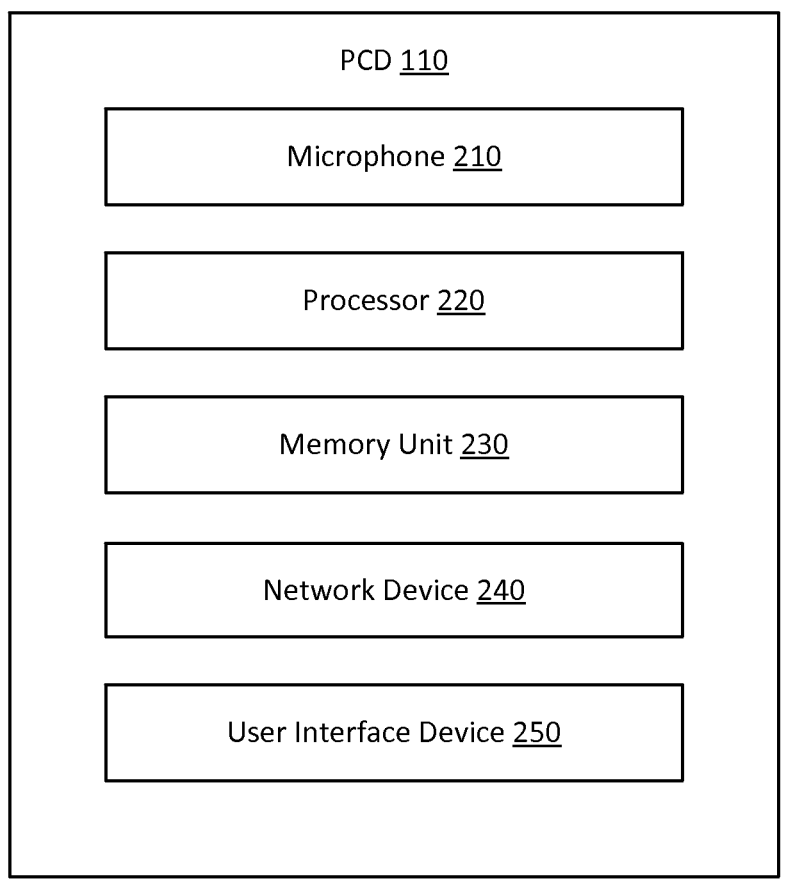
FIG. 2 is a block diagram illustrating an example of a PCD for implementation within the audio signal adjustment system according to various embodiments.

Referring to FIGS. 1-2, an example of the PCD 110 is illustrated in accordance with various embodiments. In various embodiments, the PCD 110 (also known as a source device) may be an electronic mobile device configured to capture sound, process the sound, output audio signal representing the sound to other components, and/or the like. In addition, the PCD 110 may be configured to adjust the audio signal. Examples of the PCD 110 may include, but are not limited to, smartphones (mobile phones), pagers, tablets, PDAs, any mobile computing systems, and/or the like. The PCD 110 may include at least one microphone 210, at least one processor 220, at least one memory unit 230, at least one network device 240, and at least one user interface device 250.

In some embodiments, the at least one microphone 210 may be configured to capture sound from a user of the PCD 110, as the user speaks. In some embodiments, the at least one microphone 210 may be integrated with the PCD 110 or otherwise housed inside of a housing of the PCD 110. In other embodiments, the at least one microphone 210 may be an auxiliary microphone not integrated with the PCD 110, but operatively coupled to the PCD 110 through a wired or wireless connection. In some embodiments, the at least one microphone 210 may be an omnidirectional microphone that may be configured to capture sound from any direction. In some embodiments, the at least one microphone 210 may be a unidirectional microphone that may be configured to capture sound from one, predefined direction. In some embodiments, the at least one microphone 210 may be a microphone of any other polarization pattern. In the case that the at least one microphone 210 may be configured to capture sound from a plurality of directions, the PCD 110 may be configured to deactivate capturing sound from at least one direction of the plurality of directions.

In some embodiments, the at least one microphone 210 may be a plurality of microphones having the same polarization pattern (such as, but not limited to, all of the plurality of microphones may be unidirectional microphones, or all of the plurality of microphones may be omnidirectional microphones). In some embodiments, at least two microphones of a plurality of microphones 210 may have different polarization patterns (for example, if the plurality of microphones include three microphones, two of the three microphones may be omnidirectional microphones and the other microphone may be a unidirectional microphone).

In some embodiments, the at least one processor 220 may be operatively coupled to the at least one memory unit 230 for processing the audio signal. For example, the at least one processor 220 and the at least one memory unit 230 may be configured to perform functions of the PCD 110 as described in the disclosure. In some embodiments, the at least one processor 220 and the at least one memory unit 230 may also be used for processes of the PCD 110 that are unrelated to processing audio signal for the PA system 140.

In some embodiments, the network device 240 may be configured for accessing the communication network 150 such that data may be transmitted via the communication network 150 to and from the PCD 110. In some embodiments, the network device 240 may be a wireless device of the PCD 110, such as a wireless local area network (WLAN) device, wireless wide area network (WWAN) device, personal area network (PAN) device, and/or the like. In other embodiments, the network device 240 may allow for a wired connection to the communication network 150 or other components of the system 100.

In some embodiments, the user interface device 250 may be configured to provide information to the user and/or to accept user input. The user may control the PCD 110 with the user interface device 250. The user interface device 250 may include at least one display for graphical user interface (GUI). The user interface device 250 may also include at least one user input device, such as, but not limited to, a touch screen, a keyboard, a mouse, and/or the like.

Figure 3:
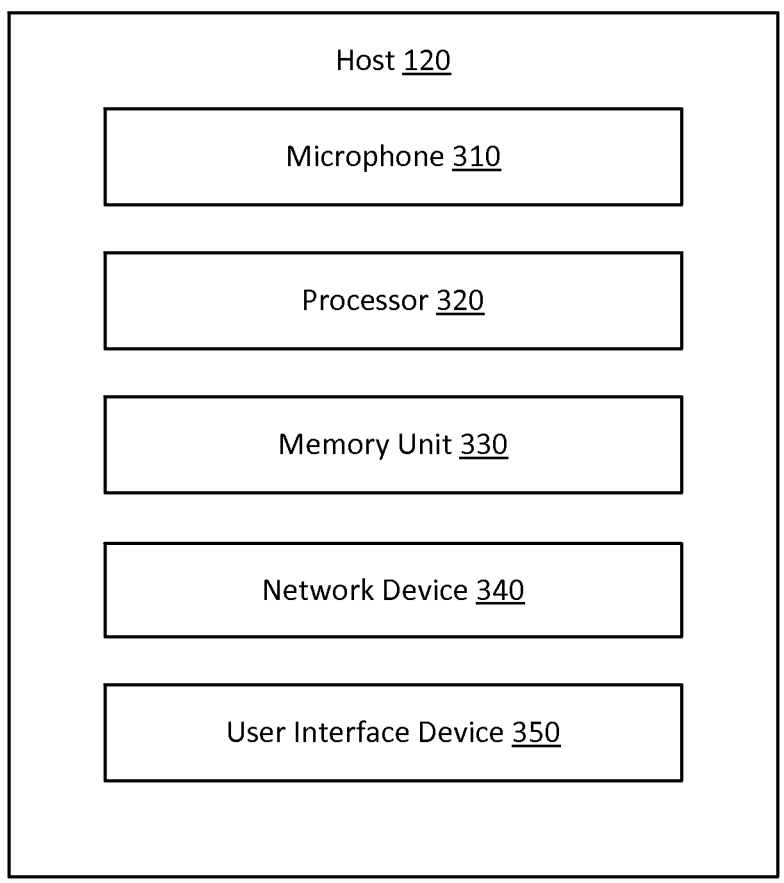
FIG. 3 is a block diagram illustrating an example of a host for implementation within the audio signal adjustment system according to various embodiments.
Figure 4:
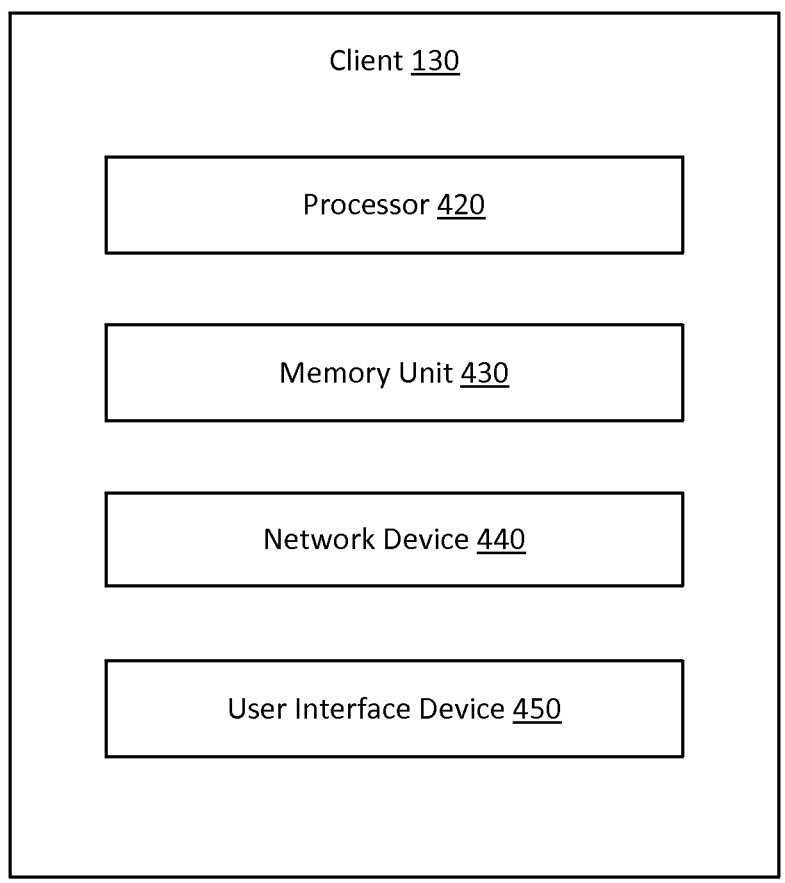
FIG. 4 is a block diagram illustrating an example of a client for implementation within the audio signal adjustment system according to various embodiments.
Figure 5:
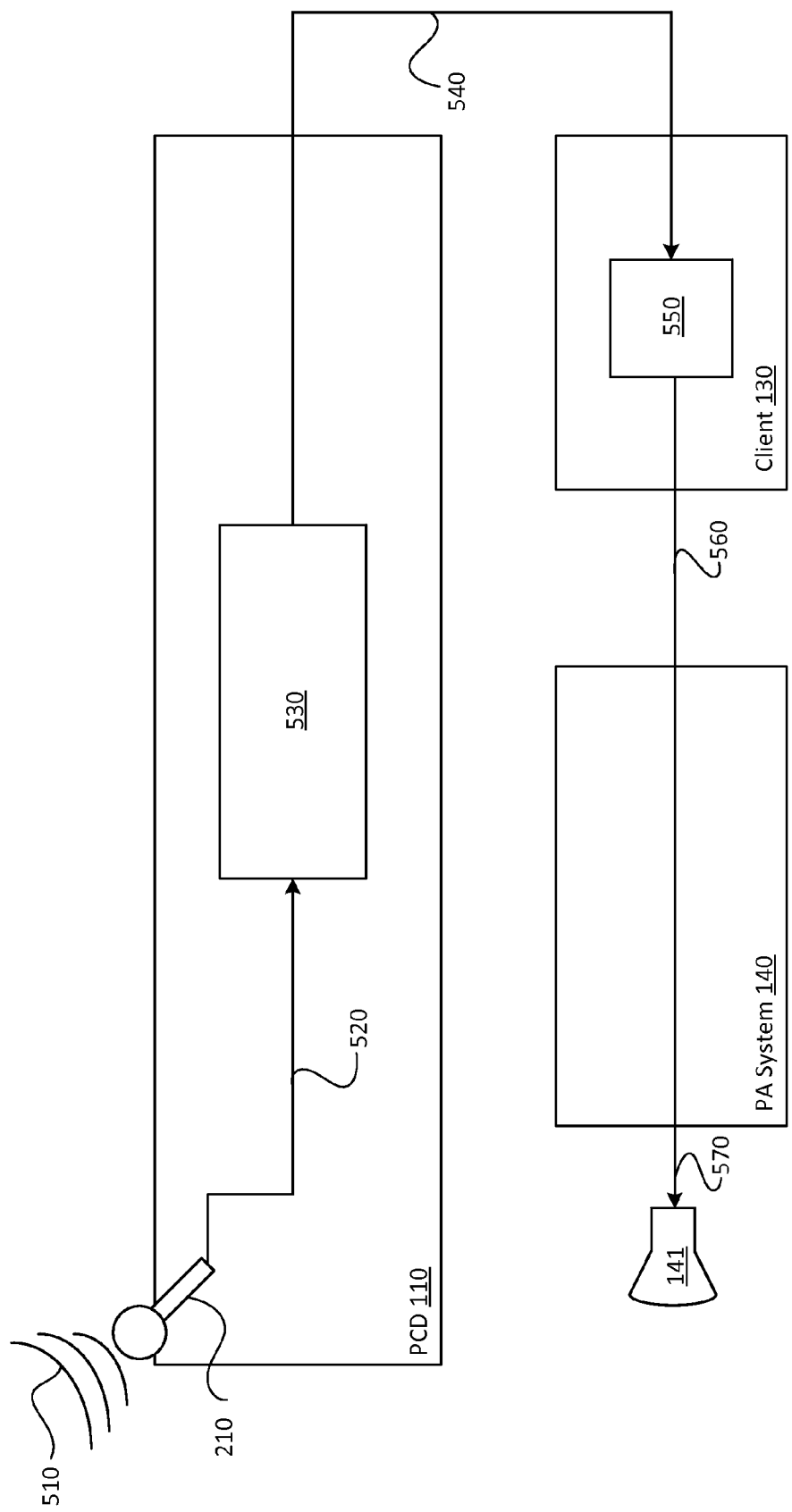
FIG. 5 is a diagram illustrating examples of audio signals that may be adjusted according to various embodiments.
Figure 6:
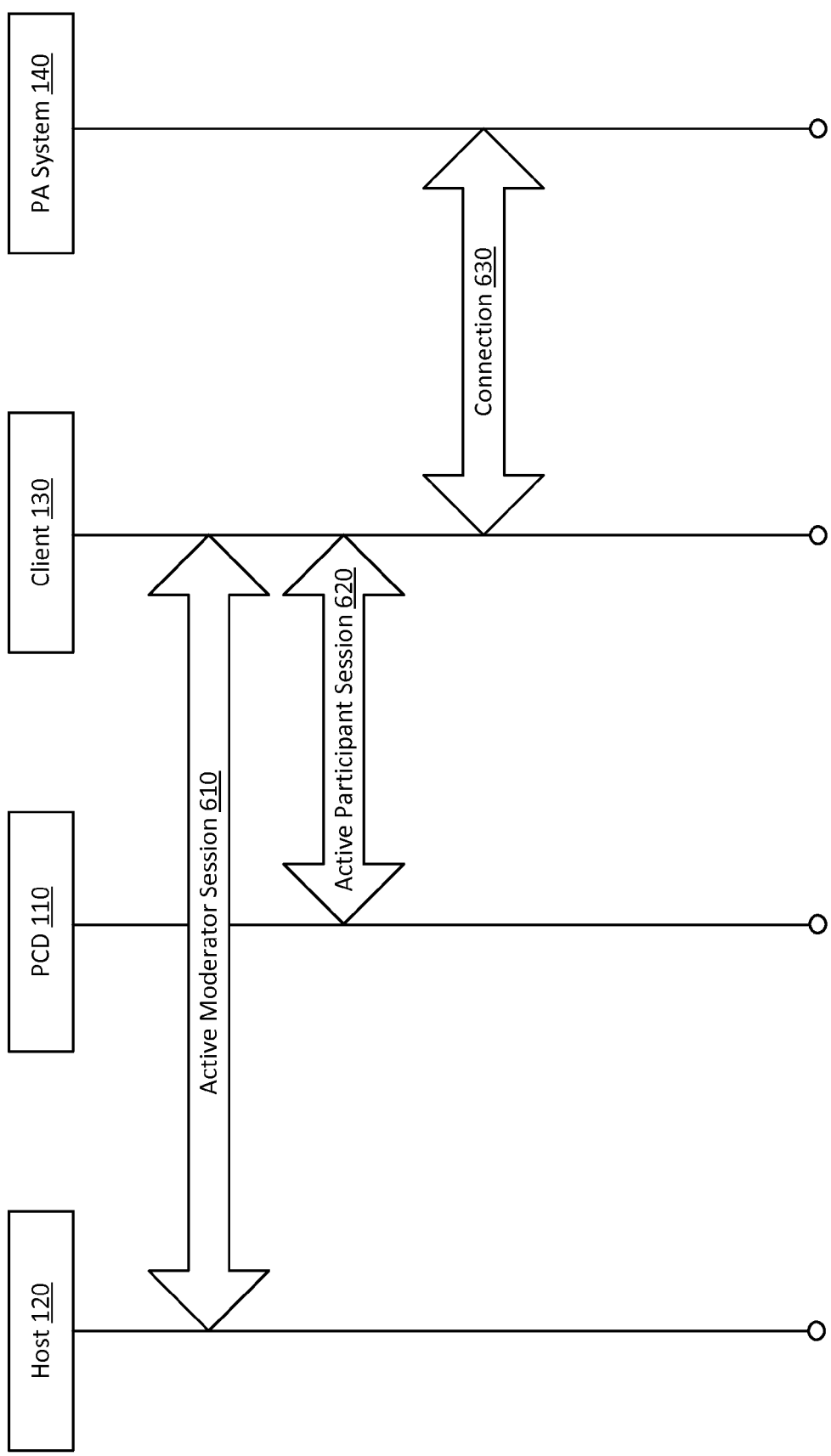
FIG. 6 is a diagram illustrating examples of interaction between components of the audio signal adjustment system according to various embodiments.
Figure 7:
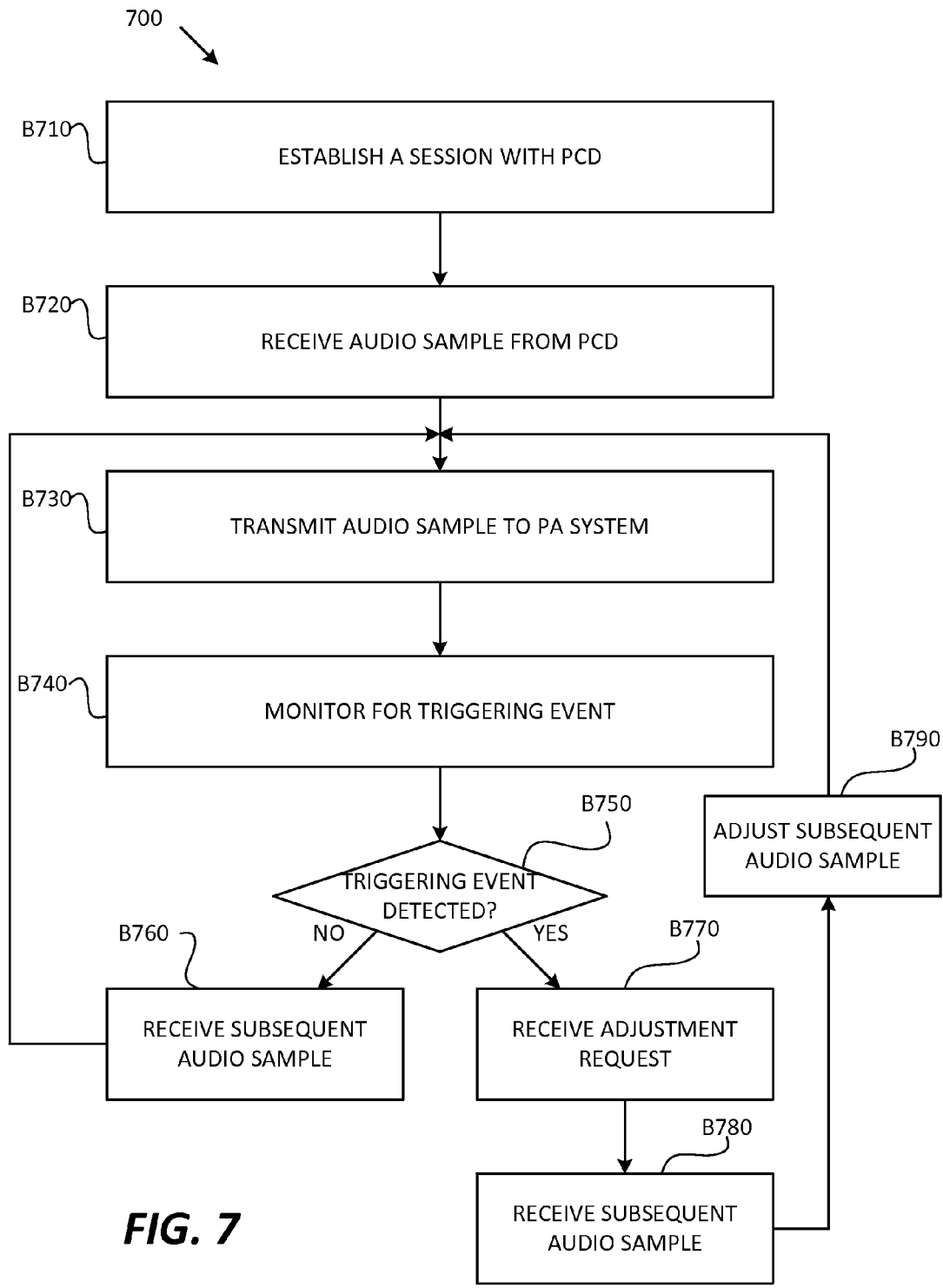
FIG. 7 illustrates a process flowchart of a method for manually adjusting the audio signals according to various embodiments.
Figure 8:
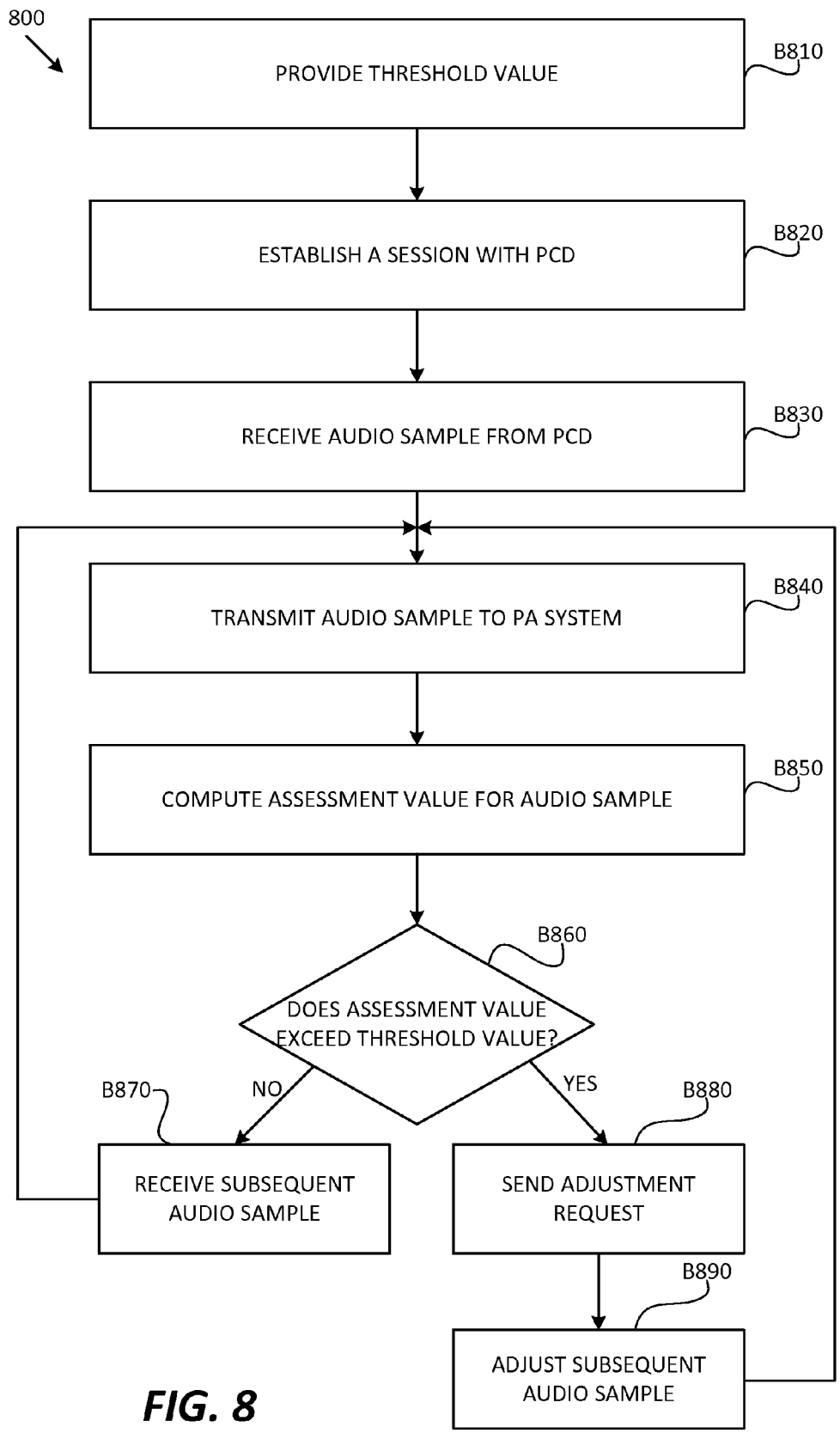
FIG. 8 illustrates a process flowchart of a method for automatically adjusting the audio signals according to various embodiments.

Referring to FIGS. 1-3, an example of the host 120 is illustrated in accordance with various embodiments. In various embodiments, the host 120 (also known as a moderator device) may be an electronic device that allows control and regulation of various aspects of the system 100. For example, the host 120 may provide access to the PA system 140 to prospective users (and their PCDs 110), control duration of the access, terminate the access, enable multiple users to access the PA system 140 concurrently, and/or the like. In particular embodiments, the host 120 may include but is not limited to, a desktop computer, a laptop computer, a PCD, a system on chip, a tablet, a pager, a dongle, and/or the like. The host 120 may include at least one microphone 310, at least one processor 320, at least one memory unit 330, a network device 340, and an user interface device 350.

The host 120 may be configured to suppress feedback by generating an indication (embodied in a signal sent to the client 130, the PCD 110, and the like) to suppress feedback and/or to adjust (such as, but not limited to, increase or decrease) the volume of the outputted sound. In some embodiments, the host 120 may dynamically and remotely control various parameters of the PCD 110, the client 130, or the PA system 140 (or any combination thereof). In some embodiments, the host 120 may be manually operated by an operator (such as, but not limited to, a moderator) to control various aspects of the system 100. In some embodiments, the host 120 may be configured to control various aspects of the system 100 automatically, without any manual input.

In some embodiments, the at least one processor 320 may be operatively coupled to the at least one memory unit 330 for adjusting audio signal. For example, the at least one processor 320 and the at least one memory unit 330 may be configured to perform functions of the host 120 as described in the disclosure. In some embodiments, the at least one processor 320 and the at least one memory unit 330 may also be used for processes of the host 120 that are unrelated to processing audio signal for the PA system 140.

In some embodiments, the network device 340 may be configured for accessing the communication network 150 so that data may be transmitted via the communication network 150 to and from the host 120. In some embodiments, the network device 340 may be a wireless device of the host 120, such as a wireless local area network (WLAN) device, wireless wide area network (WWAN) device, personal area network (PAN) device, and/or the like. In other embodiments, the network device 340 may allow for a wired connection to the communication network 150 or other components of the system 100.

In some embodiments, the user interface device 350 may be configured to provide information to the operator and/or to accept operator input. The user interface device 350 may include at least one display for graphical user interface (GUI). The user interface device 350 may also include at least one user input device, such as, but not limited to a touch screen, a keyboard, a mouse and/or the like. The user interface 350 may support interaction with the operator, i.e., the operator may indicate, through the user interface, whether a triggering event (such as, but not limited to, feedback or insufficient output volume) has occurred.

In some embodiments, the host 120 may be configured to automatically detect, with the at least one microphone 310, whether a triggering event has occurred. In some embodiments, the at least one microphone 310 may be integrated with the host 120 or otherwise contained inside of a housing of the host 120 (such as the same housing that contains the processor 320, memory unit 330, network device 340 and user interface device 350). In some embodiments, the at least one microphone 310 may be an auxiliary microphone not integrated with the host 120, such that the at least one microphone 310 may be operatively coupled to the host 120 in any suitable manner. In some embodiments, the at least one microphone 310 may be an omnidirectional microphone that may capture sound from any direction. In some embodiments, the at least one microphone 310 may be a unidirectional microphone that may capture sound in only one direction. In some embodiments, the at least one microphone 310 may be a microphone of any other polarization pattern. In some embodiments, at least two of a plurality of microphones have different polarization patterns. For example, the plurality of microphones may include three microphones, where two of the three microphones may be omnidirectional microphones, and the other microphone may be a unidirectional microphone. In other embodiments, the at least one microphone 210 may be a plurality of microphones having the same polarization pattern (such as, but not limited to, where all of the plurality of microphones may be unidirectional microphones, or all of the plurality of microphones may be omnidirectional microphones).

Referring to FIGS. 1-4, an example of the client 130 is illustrated in accordance with various embodiments. In various embodiments, the client 130 (also known as a sink device) may be an electronic device that serves as an intermediary between the PCD 110, the host 120, and the PA system 140. For example, the client 130 may be connected to one or more (or each) of the PCD 110 (which may transmit audio signal to the client 130 via the network 150), the host 120 (which may transmit adjustment requests to the client 130), and the PA system 140 (which may broadcast the audio signal provided by the client 130). In particular embodiments, the client 130 may include, but is not limited to, a desktop computer, a laptop, a PCD, a system on chip, a tablet, a pager, a dongle, and/or the like. In some embodiments, the client 130 may include at least one processor 420, at least one memory unit 430, a network device 440, and an user interface device 450. In further embodiments, the client 130 may further include at least one microphone (not shown).

In some embodiments, the at least one processor 420 may be operatively coupled to at least one memory unit 430 for processing audio signal and for adjustment request processing. For example, the at least one processor 420 and the at least one memory unit 430 may be configured to perform functions of the client 130 as described in the disclosure. In some embodiments, the at least one processor 420 and the at least one memory unit 430 may also be used for processes of the client 130 that are unrelated to processing audio signal for the PA system 140.

In some embodiments, the network device 440 may be configured for accessing the network 150 so data may be transmitted via the network 150 to and from the client 130. In some embodiments, the network device 440 may be a wireless device of the client 130, such as a wireless local area network (WLAN) device, wireless wide area network (WWAN) device, personal area network (PAN) device, and/or the like. In other embodiments, the network device 440 may allow for a wired connection to the network 150 or other components of the system 100.

In some embodiments, the user interface device 450 may be configured to provide information to the user and/or to accept user input. The user interface device 450 may include at least one display for graphical user interface (GUI). The user interface device 450 may also include at least one user input device, such as, but not limited to, a touch screen, a keyboard, a mouse, and/or the like. The user interface 450 may support interaction with the user and/or the operator, i.e., the user or the operator may indicate, through the user interface, whether a triggering event (such as, but not limited to, feedback or insufficient output volume) has occurred.

Referring to FIGS. 1-5, one or more of the PCD 110, the client 130, and the PA system 140 may be configured to adjust the audio signals to manage feedback by the system 100. For instance, in some embodiments, the amplitude of the audio signals may be scaled by one or more of the components (such as, but not limited to, the PCD 110, the client 130, and the PA system 140). In some embodiments, frequency ranges or sound-capturing directions of the microphone 210 may be adjusted to suppress feedback.

In some embodiments, sound 510 may be captured by the at least one microphone 210 of the PCD 110 from at least one sound-capturing direction. The at least one microphone 210 may be configured to capture sound from some or all accessible directions depending on the polarization of the microphone 210. In some embodiments, the at least one microphone 210 may be configured to deactivate in (or otherwise ignore) at least one sound-capturing direction (or otherwise to change the polarization of the microphone 210). In some embodiments, the at least one microphone 210 may be a plurality of microphones. The PCD 110 also may selectively deactivate one or more of the plurality of microphones that are capturing sound 510. By deactivating sound-capturing from one or more (or all) directions that generate feedback, the at least one microphone 210 may capture as much sound 510 from the user as possible while still suppressing feedback.

In some embodiments, the microphone 210 may output a microphone signal 520 (such as, but not limited to, corresponding to the captured sound 520). In some embodiments, the microphone signal 520 may be provided to at least one processing unit 530 of the PCD 110 to adjust the microphone signal 520, for example, to manage feedback, adjust volume, and/or the like. The processing unit 530 may include the at least one processor 220 and the at least one memory unit 230. In some embodiments, an insufficient output volume is detected (such as, but not limited to, by the host 120 or the operator thereof) and, in response, the amplitude of the microphone signal 520 may be increased, thus increasing the output volume. In some embodiments, a feedback is detected and, in response, the amplitude of the microphone signal 520 may be decreased, thus decreasing the volume of the outputted sound and managing feedback. In some embodiments, the processing unit 530 may be configured to selectively filter out at least one frequency range in which feedback is occurring. In some embodiments, the processing unit 530 may perform the function of at least one high-pass filter, at least one band-pass filter, at least one low-pass filter, at least one band-stop filter, and/or the like.

In some embodiments, the PCD 110 may output PCD output signal 540 (such as, but not limited to, corresponding to the microphone signal 520). In some embodiments, in response to a detection of an insufficient output volume, the amplitude of the PCD output signal 540 may be increased, thus increasing the volume of the outputted sound. In some embodiments, in response to a detection of feedback, the amplitude of the PCD output gain 540 may be decreased, thus decreasing the volume of the outputted sound and reducing feedback. In some embodiments, the processing unit 530 of the PCD 110 may be configured to adjust the PCD output signal 540.

In some embodiments, the client 130 may output a client output signal 560 (such as, but not limited to, corresponding to the PCD output signal 540). In some embodiments, the PCD output signal 540 may be provided to at least one client processing unit 550 of the client 130 to adjust the PCD output signal 540, for example, to manage feedback, adjust volume, and/or the like. The client processing unit 550 may include the at least one processor 420 and the at least one memory unit 430. In some embodiments, in response to a detection of an insufficient output volume, the client processing unit 550 may increase the amplitude of the PCD output signal 540, thus increasing the volume of the outputted sound. In some embodiments, in response to a detection of feedback, the client processing unit 550 may decrease the amplitude of the PCD output signal 540, thus decreasing the volume of the outputted sound and reducing feedback. In some embodiments, the client processing unit 550 may be configured to selectively filter out at least one frequency range of the PCD output signal 540 in which feedback is occurring. In some embodiments, the processing unit 550 may perform the function of at least one high-pass filter, at least one band-pass filter, at least one low-pass filter, at least one band-stop filter, and/or of the like.

In some embodiments, the PA system 140 may output a speaker signal 570 (such as, but not limited to, corresponding to the client output signal 560). In some embodiments, the client output signal 560 may be provided to at least one processing unit (not shown) of the PA system 140 to adjust the client output signal 560, for example, to manage feedback, adjust volume, and/or the like. The processing unit may include at least one processor (not shown) coupled to at least one memory unit (not shown). A speaker signal 570 may be provided by the PA system 140 to the at least one electronic speaker device 141. In some embodiments, in response to a detection of an insufficient output volume, the amplitude of the client output signal 560 may be increased, thus increasing the volume of the outputted sound. In some embodiments, in response to a detection of feedback, the amplitude of the client output signal 560 may be decreased, thus decreasing the volume of the outputted sound and reducing feedback.

In some embodiments, one of the audio signals 520, 540, 560, 570 may be adjusted, as described. In other embodiments, two or more of the audio signals 520, 540, 560, 570 may be adjusted. For example, a frequency adjustment may be performed on the PCD output signal 540 by the processing unit 530 of the PCD 110 and an amplitude adjustment to one or more of the signals (such as, but not limited to, the microphone signal 520, the PCD output signal 540, the client output signal 560, and/or the speaker signal 570) may be applied concurrently by one or more of the processing units 530 or 550 or the PA System 140.

Referring to FIGS. 1-6, example interactions between the components 110, 120, 130, 140 are illustrated in accordance with some embodiments. In some embodiments, an active moderator session 610 may be established between the host 120 and the client 130 to enable communication between the host 120 and the client 130. For example, adjustment requests may be transmitted from the host 120 to the client 130 during the active moderator session 610. In some embodiments, the active moderator session 610 may be established at or near the beginning of a conference or seminar (or at other suitable time), and remain active throughout the entire (or throughout one or more portions of) the conference.

In some embodiments, the active moderator session 610 may be established in response to the host 120 (or an operator of the host 120) detecting a triggering event. For example, in response to the operator perceiving feedback, the operator may operate the user interface device 350 of the host 120 to control the host 120 to establish an active moderator session 610 with the client 130. Alternatively or in addition, the active moderator session 610 may be established between the host 120 and the client 130 automatically when an active participant session 620 is established. For example, when the active participant session 620 is established between the PCD 110 and the client 130, the client 130 may automatically send a request to the host 120 to initiate an active moderator session 610. In particular embodiments, if the host 120 confirms the request, then the active moderator session 610 may be established. For example, an exchange of credentials between the PCD 110 and the client 130 may prompt a start of the active moderator session 610.

In some embodiments, the active participant session 620 between the PCD 110 and the client 130 may be established to enable communication between the PCD 110 and the client 130. The PCD 110 may transmit the audio signals to the client 130 during the active participant session 620, and the client 130 may provide the adjustment requests to the PCD 110 during the active participant session 620. The adjustment requests may be received from the host 120 or generated by the client 130. In some embodiments, the client 130 may establish the active participant session 620 with a plurality of PCDs 110. In some embodiments, the client 130 may include a plurality of clients, each of the plurality of clients may establish an active session with the host 120.

In some embodiments, the active participant session 620 may be established in response to an indication that the user wishes to access to the PA system 140. In particular embodiments, the user, through the user interface device 250 of the PCD 110, may control the PCD 110 to send a signal, message or other indication to the client 130. In some embodiments, the client 130 may, upon receiving the indication, send a confirmation to the PCD 110 to confirm that the active participant session 620 has been established. In particular embodiments, an exchange of credentials between the PCD 110 and the client 130 may be required to initiate the active participant session 620. In some embodiments, the active participant session 620 may be established in response to a signal, message or other indication from the host 120 and/or the client 130 that the PCD 110 should be granted an active participant session 620. In some embodiments, the operator of the host 120 and/or the client 130 may control the host 120 and/or the client 130 to send the indication via the user interface devices 350, 450. In other embodiments, the host 120 and the client 130 may send the indication automatically. Examples of methods and systems for establishing the active participant session 620 (and/or the active moderator session 610) include, but are not limited to, those described in U.S. patent application Ser. No. 13/275, 100, filed Oct. 17, 2011 (titled SHARING PUBLIC ADDRESSING SYSTEM USING PERSONAL COMMUNICATION DEVICES IN AN AD-HOC NETWORK), which is incorporated herein by reference in its entirety.

In some embodiments, the client 130 may be operatively coupled, via a connection 630, to the PA system 140 to enable the transfer of the data between the client 130 and the PA system 140. In some embodiments, the connection 630 may be a fixed connection between the client 130 and the PA system 140. In other embodiments, the connection 630 between the client 130 and the PA system 140 may be or include a local or network wireless connection.

Various advantages can be associated with configuring the client 130 to establish communication sessions with each of the PCD 110, the host 120, and the PA system 140. For example, with such configurations, each of the host 120, the PCD 110, and the PA system 140 may only need to communicate with one other component to perform its functions in the audio signal adjustment system 100. This can help to conserve resources of the host 120, the PCD 110, and the PA system 140.

Referring to FIGS. 1-7, a process 700 for adjusting audio signal for the PA system 140 in accordance with various embodiments is illustrated. At block B710, a session between the PCD 110 and the client 130 may be established. In some embodiments, the session may be an active participant session 620 established in any suitable manner such as (but is not limited to) manners as discussed herein. The session may be established after an active moderator session 610 between the host 120 and the client 130 is established.

Next, at block B720, the client 130 may receive an audio signal (such as, but not limited to, microphone signal 520) sent by the PCD 110. In some embodiments, the audio signal may be sent after the initiation of the active participant session 620, and communication in the active participant session 620 may be provided by the network 150. The PCD 110 may first capture sound 510 with at least one microphone 210, then convert the captured sound into the audio signal (such as, but not limited to, microphone signal 520) with the at least one processor 220 and the at least one memory unit 230 for transferring to the client 130.

Next, at block B730, the client 130 may transmit the received audio signal to the PA system 140 for broadcasting. The client 130 may transmit the audio signal to the PA system 140 over the connection 630. The PA system 140 may receive the transmitted audio signal and broadcast the audio signal as outputted sound via the at least one speaker 141.

The audio signal may initially be in a predetermined state, i.e., the state that the audio signal may be transmitted or broadcasted before any adjustment takes place. In some embodiments, the predetermined state may be the natural state of the audio signal without any modifications or adjustments. In other embodiments, the predetermined state may be the state of the audio signal after preliminary modification. The preliminary modification may include adjusting at least one of the microphone signal 520, the PCD output signal 540, the client output signal 560, and the speaker signal 570, deactivating capturing sound in at least one direction of the microphone 210, filtering out at least one frequency range, and/or of the like.

In some embodiments, the preliminary modification may be set manually by the user through the user interface device 250 of the PCD 110, or the operator through the user interface devices 350, 450 of the host 120 and/or the client 130. In other embodiments, the preliminary modification may be set automatically by one or more of the components 110, 120, 130, 140. The component that sets the preliminary modifications may itself perform the preliminary modification, or it may forward a preliminary modification request to another component for modification. Preliminary modification (set manually or automatically) may be saved to at least one user profile of the PCD 110 so that the user may select to preliminarily modify the audio signals in accordance with the preferences set forth in the user profile. In addition, preliminary modifications relating to a plurality of users may be saved to separate user profiles of a same PCD 110.

In some embodiments, setting the predetermined state may include scaling at least one of the signals 520, 540, 560, 570 by at least one predetermined scaling factor. In one example, at least one predetermined scaling factor greater than 1 (such as, but not limited to, 1.2, 1.5, or 3) may be applied to increase the amplitude of the signals 520, 540, 560, 570. In another example, at least one predetermined scaling factor less than 1 but greater than 0 (such as, but not limited to, 0.3, 0.5, or 0.8) may be applied to decrease the amplitude of the signals 520, 540, 560, 570. In some embodiments, a same predetermined scaling factor may be applied to a plurality of the signals 520, 540, 560, 570. In other embodiments, two or more different predetermined scaling factors may be applied to the plurality of the signals 520, 540, 560, 570.

In some embodiments, the predetermined scaling factor may be fixed (such as, but not limited to, 0.3, 0.5, 0.8, 1.2, 1.5, or 3) such that the same predetermined scaling factor may be applied to at least one of the signals 520, 540, 560, 570 in the beginning of every session. In other embodiments, the predetermined scaling factor may be determined dynamically and automatically by at least one of the components 110, 120, 130, 140, such that a different predetermined scaling factor may be applied in the beginning of every session. In particular embodiments, the dynamic determination may be based at least in part on the speaking habit of the user of the PCD 110 and/or the environment in which the PA system 140 is deployed. With respect to the speaking habit of the user, the predetermined scaling factor may be applied to scale the audio signals 520, 540, 560, 570 if the user may have been the cause of feedback or insufficient output volume that had occurred previously. In some examples, the user may be the cause if the user speaks too loudly/softly or holds the PCD 110 too close/far. Further, the environment (such as, but not limited to, the placement of the speakers, the acoustics of the conference room in which the PA system 140 may located) may also impact audio signals such that a triggering event may occur. In some embodiments, the PCD 110 may save data related to previous usage of the PCD 110 in the memory unit 230 and select the predetermined scaling factors based on the saved data. In particular, the data may include, among others, previous predetermined scaling factors applied, scaling factors used in the adjustment process, past sessions identifiers that may identify each session to which the PCD 110 may have connected to, a mapping vector containing pointers that map the scaling factors to corresponding sessions. In some embodiments, the predetermined scaling factor may be the same as a last scaling factor or a sum of total scaling (i.e., sum of total scaling refers to multiplying all scaling factors applied in a session; for example, if two scaling factors, 0.8 and 0.5, were applied in a previous session, then the sum of total scaling is 0.8 multiplied by 0.5, which is 0.4) applied in a previous session. In another example, the predetermined scaling factor may be the average of the sum of total scaling of last ten sessions.

In some embodiments, the predetermined state may refer to the microphone 210 of the PCD 110 being initially configured to capture sound in at least one predetermined sound-capturing direction. The predetermined direction may be some or all available sound-capturing directions of the microphone 210. The PCD 110, the host 120, and/or the client 130 may automatically set the predetermined direction based at least in part on the speaking habit of the user of the PCD 110 and/or the environment in which the PCD 110 is used as a microphone. In some embodiments, the PCD 110 may save data related to previous usage of the PCD 110 in its memory unit 230 and select the predetermined direction based at least in part on the saved data. The saved data may include, among others, previous sound-capturing directions, directions eliminated in a previous session, and corresponding session identifiers that may identify each of the session to which the PCD 110 was connected to. In some embodiments, the predetermined sound-capturing direction correspond to the predetermined direction applied in a most recent session. In another example, the predetermined direction may be all available sound-capturing directions other than at least one direction that may be frequently deactivated during the adjustment process in a number of previous sessions.

In some embodiments, the predetermined state may also refer to initially configuring the PCD 110 to transmit the audio signal at a predetermined frequency range. The predetermined frequency range may be the entire available frequency spectrum or a subset of the entire frequency spectrum. The PCD 110, the host 120, and/or the client 130 may automatically set the predetermined frequency range based at least in part on the speaking habit of the user of the PCD 110 and/or the environment in which the PCD 110 is used as a microphone. For example, acoustics of the room and placement of the speakers may cause a certain frequency range to contain feedback. In some embodiments, the PCD 110 may save data related to previous usage of the PCD 110 in its memory unit 230 and select the predetermined frequency range based at least in part on the saved data. The saved data may include, among others, frequency ranges filtered out in previous sessions, previous predetermined frequency ranges, and corresponding session identifiers that may identify each of the session to which the PCD 110 was connected to. For example, in some embodiments, the predetermined frequency range may correspond to a frequency range applied in a most recent session (i.e., the frequency range after filtering out at least one frequency range in the most recent session).

Two or more of the preliminary modification schemes disclosed above regarding the predetermined state (such as, but not limited to, setting a predetermined scaling factor, predetermined sound-capturing direction, and predetermined frequency range) may be implemented in any combination. Transmitting and broadcasting the audio signal in the predetermined state as set forth above may allow the audio signal to be preliminarily modified before any further adjustment occurs. As the preliminary modification process may be based on the speaking habit and/or the environment, fewer iterations of the adjusting loop may be required to further adjust the audio signals, thus improving the efficiency of the adjustment process.

Next at block B740, a triggering event may be monitored for. A triggering event is an event that, if occurs, may require adjustment of the audio signal. In various embodiments, a triggering event may be an occurrence of feedback, insufficient output volume, and/or the like. In some embodiments, a triggering event can be monitored manually by the operator of the host 120 (i.e., the operator may listen to the sound outputted by the PA system 140 for a triggering event). In some embodiments, the operator of the host 120 may detect both types of triggering events simultaneously from a single PCD 110 (such as, but not limited to, both feedback and insufficient output volume) or two or more triggering events simultaneously from two or more PCDs 110 that are connected to the PA system 140 at the same time (such as, but not limited to, feedback for one of the PCDs 110 and insufficient output volume for the other one of the PCDs 110, or insufficient output volume for both of the PCDs 110).

Next at block B750, if a triggering event is not detected (B750:No), then no action may be taken by the host 120, given that the operator of the host 120 does not perceive that a triggering event occurred. Subsequent audio signal may be received at B760 and processed according to blocks B730-B750 (i.e., audio signal may be continuously received, broadcasted, and monitored) until a triggering event is detected. In some embodiments, if a triggering event has not been detected in a predetermined amount of time (such as, but not limited to, 100 ms, 150 ms, or 300 ms), an indication indicating that a triggering event has not occurred in that given time period may be sent automatically or manually (by the operator), through the user interface device 350 of the host 120, to the PCD 110.

On the other hand, at block B770 (B750:Yes), an adjustment request may be sent by the host 120 in response to a triggering event being detected. In some embodiments, the operator may instruct the host 120, with the user interface device 350 of the host 120, to send the adjustment request. In one example, the host 120 presses a touch screen or a button to indicate to the host 120 that feedback was detected. The host 120, in response, may send the adjustment request to the client 130 and/or the PCD 110. In some embodiments, the host 120 sends the adjustment request to the client 130. The client 130 then provides the adjustment request to the PCD 110. In some embodiments, the user interface device 350 of the host 120 may allow the operator to select the type of triggering event (such as, but not limited to, feedback or insufficient output volume), the PCD 110 (in the case that multiple PCDs 110 may be connected) that may be responsible for the triggering event, preset options for the operator to input the audio signals 520, 540, 560, 570 to be adjusted, the details of adjustment, and/or the like. In some embodiments, the display of the user interface device 350 of the host 120 may show a confirmation to the operator that the adjustment request has been sent.

Next at block B780, the PCD 110 may receive (capture) subsequent audio signal. Next at block B790, the PCD 110 and/or the client 130 may adjust the subsequent audio signal in response to the adjustment request. In various embodiments, the PCD 110, the client 130, and/or the PA system 140 may be configured to perform different actions depending on the type of the adjustment request being sent from the host 120. The adjusted subsequent audio signal may then be processed according to blocks B730-B750.

Referring to FIGS. 1-8, illustrated (by at least one of the components 110, 120, 130, 140) is an example of a process 800 through which audio signal may be adjusted automatically (by at least one of the components 110, 120, 130, 140) in accordance with various embodiments. At block B810, a threshold value may be provided to at least one of the components 110, 120, 130, 140. In some embodiments, a plurality of threshold values may be provided to the at least one components 110, 120, 130, 140. The threshold value may be a threshold signal energy content value or a threshold audio signal amplitude. In some embodiments, the threshold value may be set by at least one of the components 110, 120, 130, 140 automatically. In other embodiments, the threshold value may be set by the user via the user interface device 250 of the PCD 110, or the operator via the user interface device 350 of the host 120.

Next, at block B820, a session between the PCD 110 and the client 130 may be established. In some embodiments, the session may be an active participant session 620 that can be established in any suitable manner such as (but is not limited to) discussed in the disclosure. The session may occur after an active moderator session 610 between the host 120 and the client 130 is established.

Next, at block B830, the PCD 110 may send the audio signal to the client 130. In some embodiments, the audio signal may be sent after the initiation of the session, and communication in the session may be viable through the network 150. The PCD 110 may first capture sound 510 with at least one microphone 210, then convert the captured sound into audio signal (microphone signal 520), with the at least one processor 220 and the at least one memory unit 230, for transferring to the client 130. In some embodiments, the PCD 110 may initially transmit the audio signal in a predetermined state in any suitable manner such as (but is not limited to) discussed in the disclosure.

Next at block B840, the received audio signal may be transmitted to the PA system 140 for broadcasting. The client 130 may transmit the audio signal to the PA system 140 over the connection 630. The PA system 140 may receive the transmitted audio signal and broadcast the audio signal as outputted sound via its at least one speaker 141.

Next at block B850, at least one of the components 110, 120, 130, 140 (i.e., at least one detecting component) may analyze the outputted audio signal and compute an assessment value for the outputted audio signal. In some embodiments, the PCD 110 may, via its at least one microphone 210, capture the outputted sound and convert the outputted sound into audio signal. Then, the PCD 110 may analyze the audio signal and compute an assessment value with the at least one processor 220 and the at least one memory unit 230. In particular embodiments, the assessment value may represent the energy content of the audio signal. For example, the energy content may be calculated by computing a quadratic mean of the collected audio signal for a predetermined duration (such as, but not limited to, 10 ms, 50 ms, 100 ms, or 110 ms). Quadratic mean may be calculated as following over n samples ($x_1, x_2, x_3, \ldots, x_n$).

$$X_{(mean)} = \sqrt{\frac{1}{n}(x_1^2 + x_2^2 + x_3^2 + \ldots + x_n^2)}$$

At block B860, the assessment value may be compared to the threshold value. In some embodiments, one of the components 110, 120, 130, 140 (such as, but not limited to, the PCD 110 or the host 120) may forward the assessment value to another component to which the threshold value may be provided for performing the comparison. In other embodiments, the component that computed the assessment value may itself compare the assessment value with the threshold value.

Next, at block B870 (B860:NO), if the assessment value does not exceed the threshold value (signifying that a triggering event has not occurred), no adjustment may be taken by any of the components 110, 120, 130, 140. Therefore, at block B870, the subsequent audio signal may be received by the client 130 but no adjustment may occur. The subsequent audio signal may be transmitted to the PA system 140 for broadcasting at block B840, thus starting another iteration of the process 800.

On the other hand, if the threshold value is exceeded by the assessment value, then at least one of the components 110, 120, 130, 140 (i.e., at least one adjusting component) may adjust the subsequent audio signal based on a set adjustment criteria. For example, at block B880 (B860:

YES), the subsequent audio signal may be received by the adjusting component, and the adjusting component may adjust the subsequent audio signal. In some embodiments, the component that automatically detects the triggering event may not be the component that performs the adjustment. For example, the automatic detection process may occur in the host 120 while the automatic adjusting process may occur in the PCD 110. Similar to what was disclosed above, an adjustment request may be sent from the detecting component to the adjusting component via the network 150, and the adjusting component may adjust the subsequent audio signal based on the adjustment request. For example, the component may adjust the amplitude of the subsequent audio signal by adjusting at least one of the audio signals 520, 540, 560, 570, the sound-capturing directions of the microphone 210, the frequency range, and/or the like. In particular embodiments, the adjustment details may be based on the difference between the assessment value and the threshold value. For example, if the assessment value exceeds the threshold value by a given amount (such as, but not limited to, if the assessment value is 150%, 300%, or 500% of the threshold value), then at least one scaling factor (such as, but not limited to, 0.6, 0.8, or 0.9) that corresponds to the amount may be applied.

In some embodiments, the detecting component may compute the assessment value for the audio signals periodically (such as, but not limited to, every 0.05, 0.1, 0.3, or 0.5 seconds). In some embodiments, every time the detecting component detects a triggering event (i.e., when the assessment value exceeds the threshold value), the detecting components may send an adjustment request locally or via a network 150 to other components. In other embodiments, the detecting component may send an adjustment request when it detects a triggering event, and may send a confirmation indication when the triggering event has subsided.

Figure 9C:
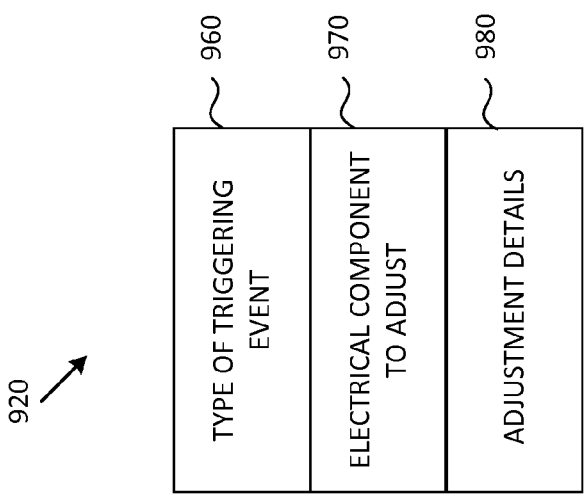
FIGS. 9A-9C are block diagrams illustrating adjustment requests according to various embodiments.
Figure 9B:
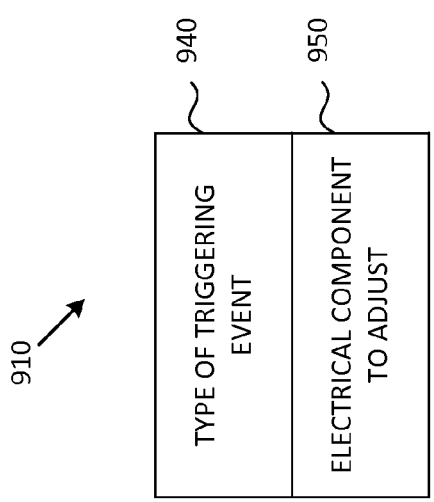
Figure 9A:
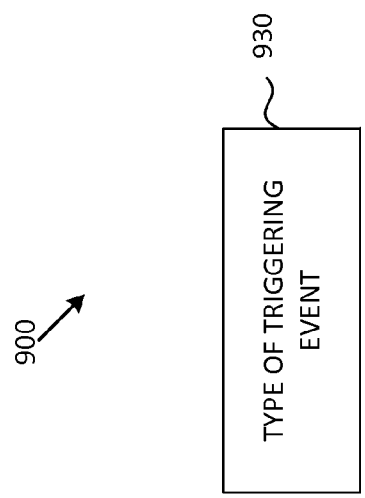
Figure 11:
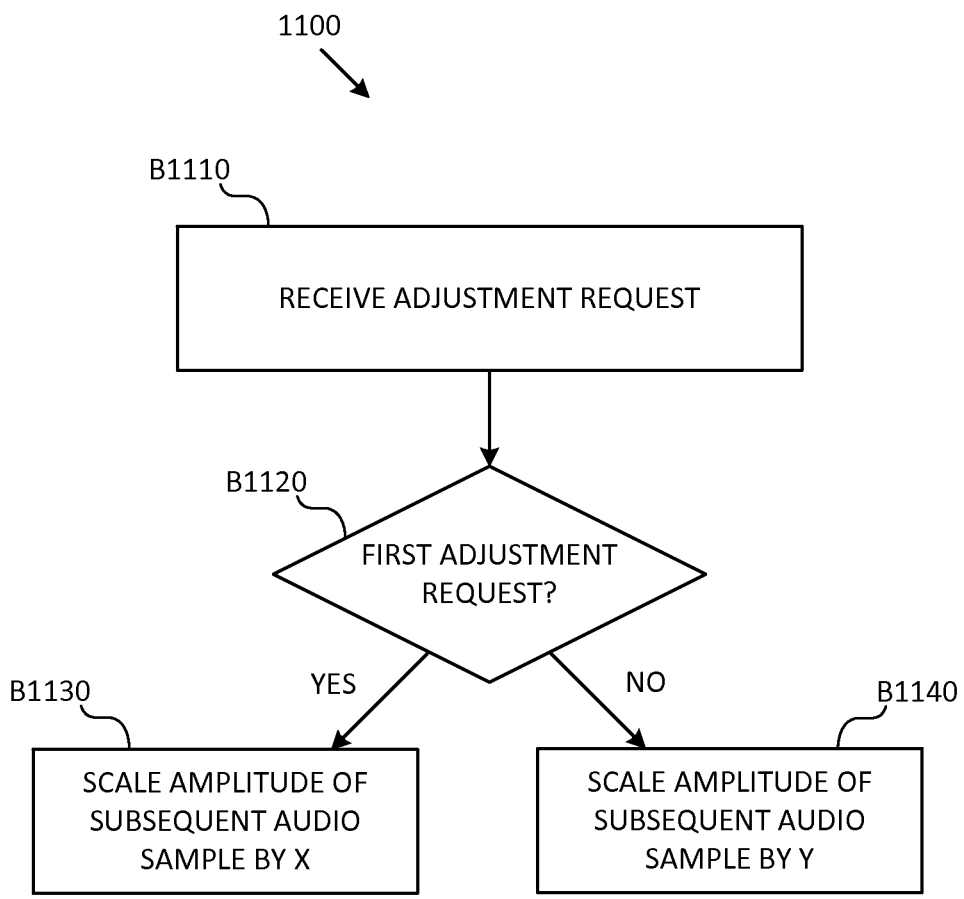
FIG. 11 illustrates a process flowchart of a method for adjusting the audio signals in response to two or more adjustment requests according to various embodiments.
Figure 12:
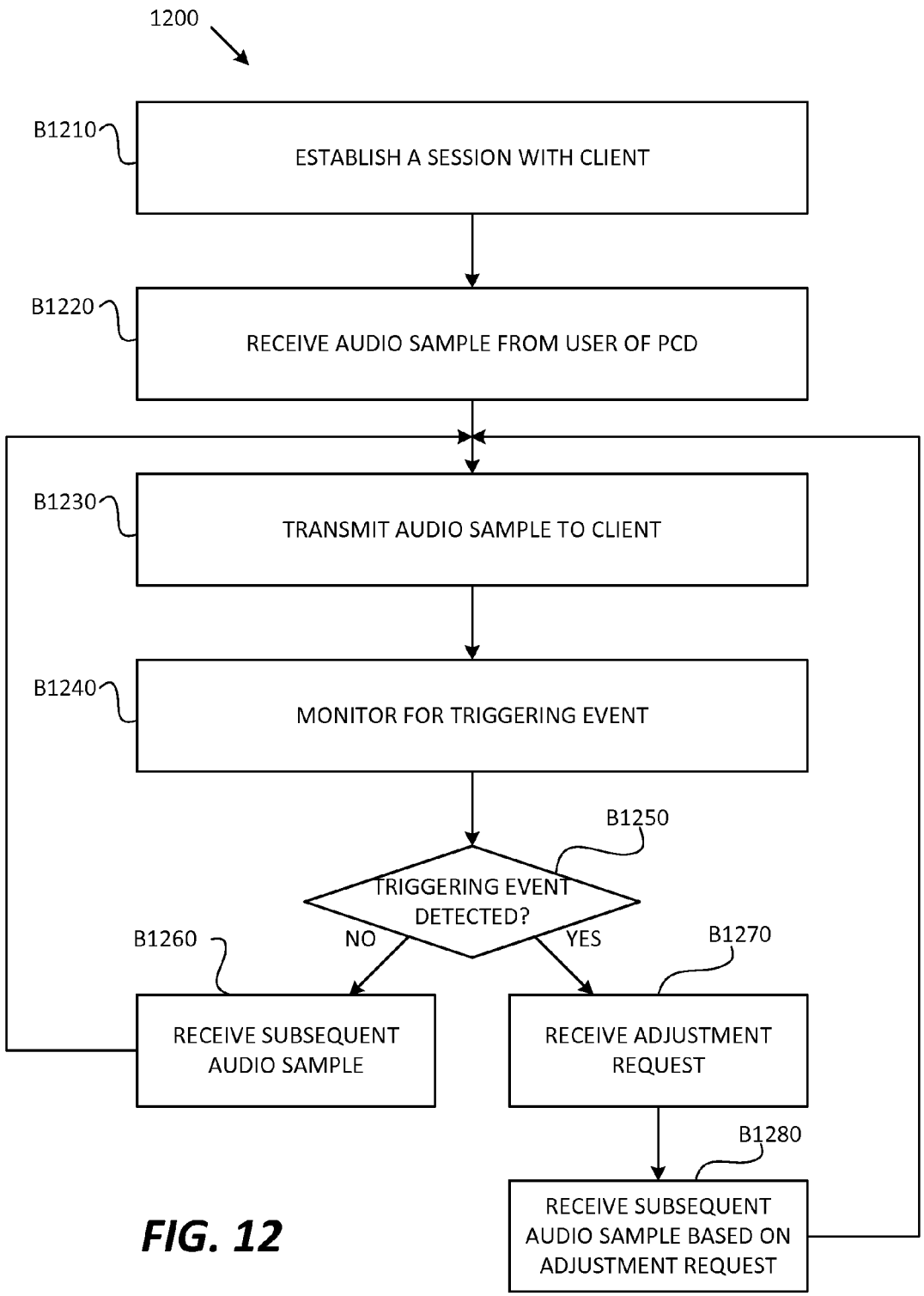
FIG. 12 illustrates a process flowchart of a method for adjusting audio signals by a PCD according to various embodiments.

FIGS. 9A-9C represent embodiments of adjustment requests 900, 910, 920. Referring to FIGS. 1-8 and 9A, an example of the adjustment request 900 is illustrated in accordance with some embodiments. The adjustment request 900 may include a message 930 that may indicate the type of triggering event that may be detected. In embodiments where the system may be configured to monitor and adjust for one type of triggering event (such as, but not limited to, feedback or insufficient output volume, but not both), the adjustment request 900 may only include a message that indicates a triggering event has occurred.

The PCD 110, upon receiving the adjustment request 900 from the host 120 or the client 130, adjusts the subsequent audio signal according to a set of criteria. Referring to FIGS. 1-8, 9A, and 10A, illustrated is an process 1000 for adjusting the subsequent audio signal once the adjustment request 900 is received. At B1030, the adjustment request 900 having a message 930 that indicates the type of triggering event may be received by the PCD 110. Next at B1040, the PCD 110 adjusts the microphone signal 520 in response to the request. For example, if the triggering event is a feedback, then the PCD 110 may reduce the amplitude of the subsequent audio signal, filter out frequency ranges, deactivate sound-capturing directions of the microphone 210, and/or the like. In some embodiments, if the triggering event is insufficient output volume, then the PCD 110 may increase the amplitude of the subsequent audio signal. In other embodiments, the adjustment request may be sent to the client 130 for adjusting the PCD output signal 540 in response to the request, and/or to the PA system 140 for adjusting the client output signal 560 and/or the speaker signal 570.

Next at B1050, the PCD 110 may select adjustment details (such as, but not limited to, the amount and manner of adjustment with respect to the microphone audio signal 520 being adjusted). In some embodiments, the PCD 110 may select to scale the amplitude of the subsequent microphone audio signal by a fixed factor (such as, but not limited to, 0.2, 0.5, 0.7, 1.2, 1.5, or 3). In some embodiments, the PCD 110 may select at least one sound-capturing direction of the microphone 210 to be deactivated. In some embodiments, the PCD 110 may select at least one frequency range to be filtered out. Next at B1060, the PCD 110 may adjust the subsequent microphone audio signal according to the selection made by the PCD 110.

Referring to FIGS. 1-8, and 9B, the adjustment request 910 may include a message 940 that indicates the type of triggering event detected and a command 950 to adjust at least one of the audio signals 520, 540, 560, 570. For example, the command 950 may be a command to adjust the amplitude of the microphone signal 520 and the PCD output signal 540. In some embodiments, the command 950 may be set by the operator manually via the user interface device 350 of the host 120. In other embodiments, the command 950 may be set by the host 120 automatically according to any suitable criteria including, but are not limited to, processing time and power consumption.

Referring to FIGS. 1-8, 9B, and 10B, at B1070, the adjustment request 910 having the message 940 and the command 950 may be received by the PCD 110, the client 130, and/or the PA system 140. Next at B1080, the adjustment details is determined with respect to the at least one of the audio signals 520, 540, 560, 570 specified by the command 950 of the adjustment request 910. Lastly at B1090, the PCD 110, the client 13, and/or the PA system 140 may adjust the subsequent audio signal according to the adjustment details determined.

In some embodiments, the PCD 110, the client 130, and/or the PA system may adjust the at least one of the audio signals 520, 540, 560, 570 by a fixed factor for every adjustment request 900, 910 received. For example, in response to the PCD 110 receiving any adjustment request 900, 910 indicating that feedback is the triggering event, the PCD 110 may reduce the microphone signal 520 by a fixed factor (such as, but not limited to, 0.05, 0.1, or 0.2).

In some embodiments, the PCD 110, the client 130, and/or the PA system may be configured to respond to the adjustment request 900, 910 with a set of predetermined responses when two or more adjustment requests 900, 910 may be received. In particular embodiments, a different scaling factor may be applied in response to each adjustment request 900, 910 in a sequence of adjustment requests. Referring to FIGS. 1-8 and 9-11, illustrated is an example of a process 1100 in which the PCD 110, the client 130, and/or the PA system 140 may be configured to respond to two or more adjustment requests 900, 910. At B1110, the PCD 110 and/or the client 130 may receive an adjustment request 900, 910 containing either only the type of triggering event 930 or the type of triggering event 940 and the audio signals 520, 540, 560, 570 to be adjusted 950. At B1120, a determination may be made as to whether the adjustment request 900, 910 received may be a first adjustment request received. In some embodiments, the first adjustment request may be the first adjustment request received in the current session. In other embodiments, the first adjustment request may be the first adjustment request received in a predetermined period of time (such as, but not limited to, 30 seconds, 2 minutes, 10 minutes, or an hour) since a last adjustment request was received. If the adjustment request 900, 910 received is the first adjustment request, then at B1130 (B1120:YES), the at least one of the audio signals 520, 540, 560, 570 may be scaled by a first factor, denoted by X. If the adjustment request 900, 910 received is not the first adjustment request, then at B1140 (B1120:NO), the at least one of the audio signals 520, 540, 560, 570 may be scaled by a second factor, denoted by Y. In some embodiments, X and Y may be different, such that X may be greater than Y, or Y may be greater than X. For example, amplitude of the PCD output signal 540 may be reduced by a first factor (such as, but not limited to, 0.3) in response to a first adjustment request, and reduced by a lesser factor (such as, but not limited to, 0.05) for every subsequent adjustment request 1200 (such as, but not limited to, the second adjustment request, the third adjustment request, the fourth adjustment request, etc.) received. In addition, Y, which denotes the scaling factor of any subsequent adjustment in response to the subsequent adjustment requests, may also be different depending on an order in which the adjustment requests 900, 910 may be received. In some embodiments, the PCD 110 may increase the amplitude of the at least one audio signals 520, 540, 560, 570 to compensate for over-reduction of the amplitude, vice versa.

In some embodiments, the PCD 110, the client 130, and/or the PA system 140 may begin to scale the audio signals 520, 540, 560, 570 by a fixed factor periodically (such as, but not limited to, every 0.05, 0.1, or 0.3 second) in response to the first adjustment request, until no adjustment request 900, 910 has been received by the PCD 110 for a predetermined period of time (such as, but not limited to, 0.3, 0.5, or 1 second). In some embodiments, the PCD 110, the client 130, and/or the PA system 140 may begin to scale the audio signals 520, 540, 560, 570 by a fixed amount periodically (such as, but not limited to, every 0.05, 0.1, or 0.3 second) in response to the first adjustment request, until a message indicating that the feedback or the insufficient output volume has been eliminated is received by the PCD 110 and/or the client 130. The message may be sent by the host 120 automatically when the operator has not indicated that a triggering event has occurred for a predetermined time period (i.e., 0.2, 0.5, 1, or 2 seconds) since the last indication.

Referring to FIGS. 1-8 and 9C, the adjustment request 920 may include a message 960 that indicates the type of triggering event that may be detected, a command 970 to adjust at least one of the audio signals 520, 540, 560, 570, and adjustment details 980 that specify how each of the selected audio signals 520, 540, 560, 570 may be adjusted. In some embodiments, the adjustment details can be set by the operator manually via the user interface device 350 of the host 120 or by the PCD 110, the host 120, and/or the client 130 automatically according to any suitable criteria, including but are not limited to, processing time and efficiency.

Referring to FIGS. 1-8, 9C, and 10C, at block B1100, an adjustment request 920 having the message 960, the command 970, and the adjustment details 980 may be received by at least one of the PCD 110, the client 130, and/or the PA system 140. At B1110, the PCD 110 may adjust the subsequent audio signal according to the adjustment details 980. The adjustment details may include, but are not limited to, scaling the amplitude of at least one of the audio signals 520, 540, 560, 570, eliminating at least one sound-capturing direction of the microphone, and filtering out at least one frequency range.

Now referring to FIGS. 1-11, processes described in this disclosure may require a short period of time (such as, but not limited to, around 90-150 milliseconds, or approximately 110 milliseconds) to complete one iteration via the audio signal adjustment path (i.e., through B750, B770, B780, and B790).

Referring to FIGS. 1-12, illustrated is a process 1200 performed by the PCD 110 for adjusting audio signal for the PA system 140 in accordance with various embodiments. At block B1210, the PCD 110 may establish a session with a client 130 in any suitable manner such as (but is not limited to) discussed in the disclosure. Next at block B1220, the PCD may receive audio signal from the user as the user speaks into the microphone 210 of the PCD 110. Next at block B1230, the PCD 110 may transmit the audio signal received from the user to the client 130 at a predetermined state in any suitable manner such as (but is not limited to) discussed in the disclosure. In some embodiments, the client 130 may transmit the audio signal to the PA system 140 for broadcasting via at least one speaker 141 of the PA system 140. Next at block B1240, a triggering event may be monitored automatically or manually (by the operator of the host 120). Next at block B1260, if a triggering event is not detected (B1250:No), then no action is taken by the host 120, and subsequent audio signal may be received at B1260 and processed according to blocks B1230-B1250. On the other hand, at block B1270 (B1250:Yes), an adjustment request may be received by the PCD 110 in response to a triggering event being detected. Next at block B1280, the PCD 110 may receive subsequent audio signal based on the adjustment request via the microphone 210. In some embodiments, the subsequent audio signal may be adjusted by the PCD 110, the client 120, and/or the PA system 140. For example, the microphone 210 of the PCD 110 may be configured to scale the amplitude of the microphone signal 520 or deactivate at least one sound-capturing direction of the microphone 210 used to capture the subsequent audio signal. In addition, the subsequent audio signal may be adjusted based on the adjustment request in any suitable manner such as (but is not limited to) discussed in the disclosure. The adjusted subsequent audio signal then may be processed according to blocks B1230-B1250.

Figure 13:
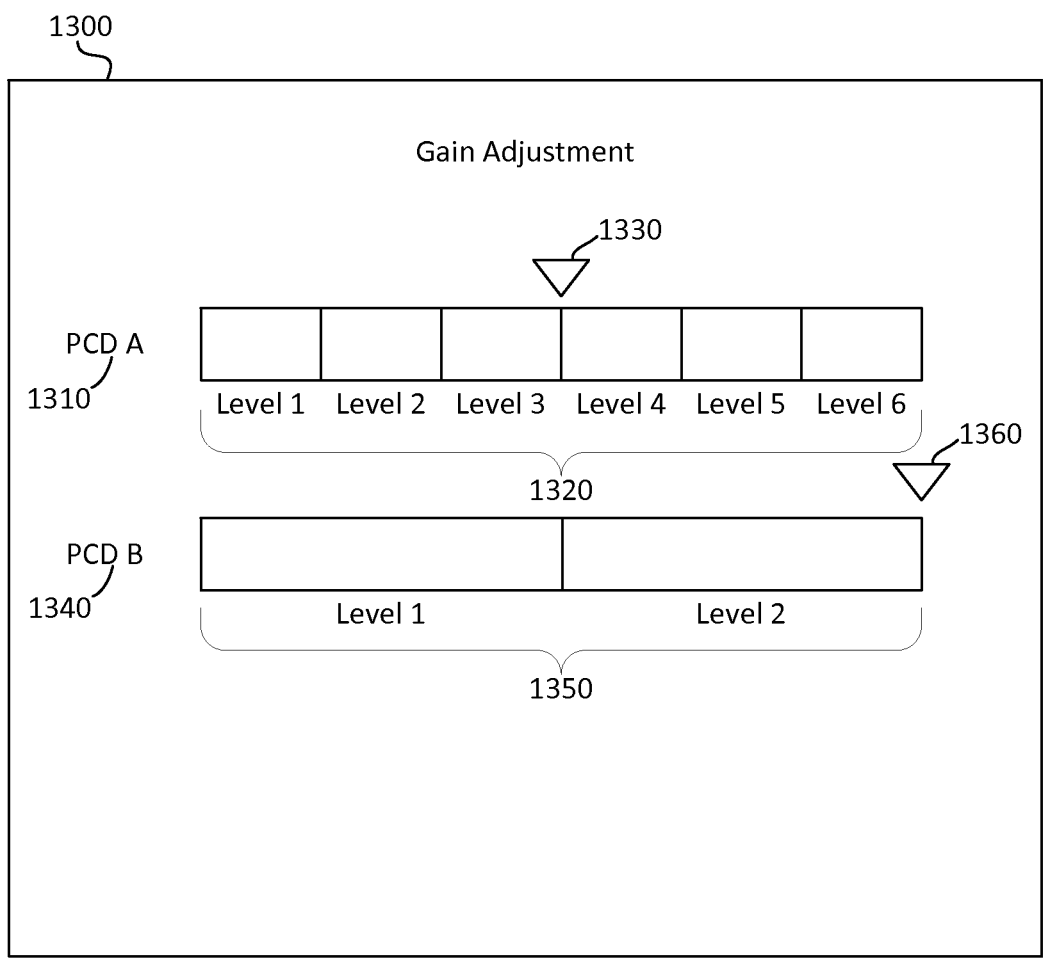
FIG. 13 illustrates an example of a gain adjustment user interface 1300 according to various embodiments.

FIG. 13 illustrates an example of a gain adjustment user interface 1300 according to various embodiments. Now referring to FIGS. 1-13, the gain adjustment user interface 1300 may be a user interface (such as, but not limited to, a display screen) displayable by the PCD 110 (such as, but not limited to, through the user interface device 250), the host 120 (such as, but not limited to, through the user interface 350), and/or the client 130 (such as, but not limited to, through the user interface 450). An operator or user of the PCD 110, the host 120, and/or the client 130 may adjust the gains of the audio signals via the gain adjustment user interface 1300. In some embodiments, the host 120 and/or the client 130 may send adjustment requests to the PCD 110 to adjust the microphone gain at the microphone signal 520 and/or the output gain at the PCD output signal 540 in response to the adjustments received from the operator via the gain adjustment user interface 130.

In some embodiments, the gain adjustment user interface 1300 may include at least one PCD 110 (such as, but not limited to, PCD A 1310, PCD B1340, and/or the like), the gains of which are to be adjusted via the gain adjustment user interface 1300. The gain adjustment user interface 1300 may include user interactive elements (such as, but not limited to, buttons, touch area, and/or the like) to adjust gains of the corresponding PCD 110 based on user interaction with the user interactive elements. For example, the gains (such as, but not limited to, the microphone gain, the output gain, and/or the like) of the PCD 110 may be divided into discrete levels (such as, but not limited to, the first set of levels 1320 corresponding to PCD A 1310 and the second set of levels 1350 corresponding to PCD B 1340). In some embodiments, the level sets for adjusting the gains may be finer (such as, but not limited to, the first set of levels 1320 may include 6 levels, each corresponding to a separate gain adjustment value). In other embodiments, the level sets may be coarser (such as, but not limited to, the second set of levels 1350 may include 2 levels, each corresponding to a separate gain adjustment value). The gain adjustment user interface 1300 may include gain indicators (such as, but not limited to, the first gain indicator A 1330 for the PCD A 1310 and the second gain indicator B 1360 for PCD B 1340) that indicate the current gain level selected for the corresponding PCD 110. In some embodiments, a common control-set may be used for one or more PCDs (such as, but not limited to, the PCD 110).

In other or further embodiments, the PCD 110 may adjust its own microphone gain at the microphone signal 520, the output gain at the PCD output signal 540, sound capturing direction, and/or the like via an interface provided by the user interface device 250. Such interface may include user interactive elements such that when selected by the user of the PCD 110, may trigger the PCD 110 to adjust the gains or the sound capturing directions in the manner described.

Figures 14A, 14B, 14C:
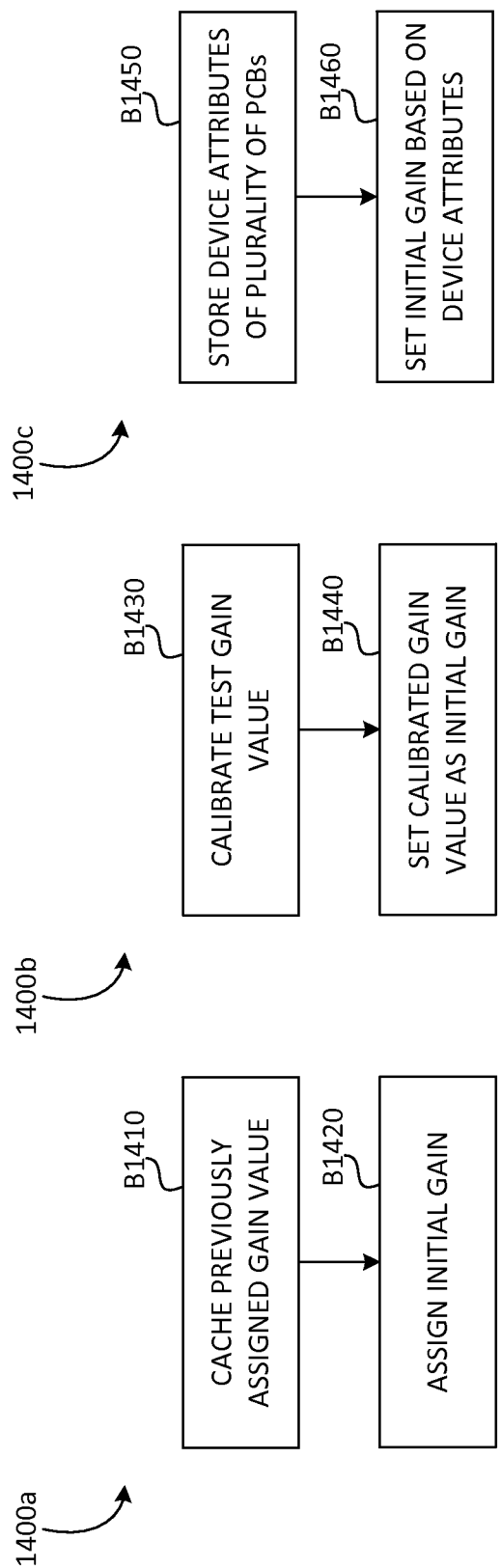
FIG. 14A is a process flow chart illustrating a first example of initial gain assignment method according to various embodiments.
FIG. 14B is a process flow chart illustrating a second example of initial gain assignment method according to various embodiments.
FIG. 14C is a process flow chart illustrating a third example of initial gain assignment method according to various embodiments.

FIG. 14A is a process flow chart illustrating a first example of initial gain assignment method 1400*a* according to various embodiments. Now referring to FIGS. 1-14A, the PCD 110 may cache (such as, but not limited to, in the memory unit 230 or other suitable memory unit) at least one gain value previously assigned by the host 120 and/or the client 130 (such as, but not limited to, as set forth in adjustment request as described herein) at block B1410. In other embodiments, the PCD 110 may store the gain value determined by the PCD 110 itself. The at least one gain value previously assigned may be from a previous session. Next at block B1420, the PCD 110 may set the cached previously assigned gain as an initial gain for the current session. In some embodiments, only the immediate previously assigned gain is cached, in which case, the immediate previously assigned gain is set as the initial gain. In other embodiments, two or more previously assigned gain values may be cached at block B1410, where the initial gain is set as the average of the two or more previously stored gain values. In various embodiment, the PCD 110 may map location information associated with the assigned gain. Subsequently (such as, but not limited to, during next use), the PCD 110 may set the assigned gain based on the mapped location information. For example, the PCD 110 may only use a stored assigned gain if that stored assigned gain is associated with a same location (as identified by the session identification as described herein) based on the location information.

FIG. 14B is a process flow chart illustrating a second example of initial gain assignment method 1400*b* according to various embodiments. Now referring to FIGS. 1-14B, the PCD 110 may calibrate a test gain value at block B1430 before the session where an initial gain value is required. In particular, the PCD 110 may transmit test audio signals to the client 130 for playing at the PA system 140 and receive adjustment requests containing gain adjustments as the test gain values from the host 120 and/or the client 130 and/or the user of the PCD 110. Next at block B1440, the PCD 110 may set the calibrated gain value as the initial gain.

FIG. 14C is a process flow chart illustrating a third example of initial gain assignment method 1400*c* according to various embodiments. Now referring to FIGS. 1-14C, the host 120 and/or the client 130 may store device attributes of a plurality of PCDs (such as, but not limited to the PCD 110) at the memory unit 330 and/or the memory unit 430, respectively, at block B1450. The device attributes include the maker, model, location of the PCDs from the PA system 140 and/or the speaker 141, gain adjustments associated with each of the plurality of PCDs. Next at block B1460, a current PCD of interest (such as, but not limited to, the PCD 110) may set its own initial gain based on the device attributes associated with the plurality of PCDs. In particular embodiments, the current PCD of interest may match its own maker and model with at least one of the plurality of PCDs having the same (or substantially similar) maker and model by sending a request containing its own maker and model, location to the host 120 and/or the client 130 and receiving a response containing an initial gain based on the maker and the model, location of the current PCD of interest, and/or the like. Such device attributes may be sent by the PCD 110 as uplink data in the manner described. The initial gain as an average gain of the gain adjustment values of the at least one of the plurality of PCDs having the same (or substantially similar) maker and model, as determined by the host 120 and/or client 130 based on and in response to the request transmitted by the current PCD of interest. As such, a heuristic gain adjustment scheme serves to improve user experience.

In some embodiments, the client 130 (or the host 120) may execute automatic gain control with respect to a PCD 110 being currently assigned the floor (such as, but not limited to, an active participant session 620 exists between the PCD 110 and the client 130). In some embodiments, the client 130 (or the host 120) may store previous gain values (such as, but not limited to, as included gain adjustment requests or otherwise) determined for previous PCDs (such as, but not limited to, the PCD 110) in the memory unit 430 (or the memory unit 330 of the host 120). The previous PCDs may have had or still have the floor (i.e., the previous PCDs may have in active participant sessions 620 with the client 130). The client 130 (or the host 120) may determine the gain adjustment values for the PCD 110 being assigned the floor based on the gain values for the previous PCDs which were assigned the floor previously. In some embodiments, the gain adjustment values for the PCD 110 currently assigned the floor may be an average of the previous gain values for the previous PCDs. This allows the client 130 (or the host 120) to adjust the gain of the PCD 110 currently assigned the floor to be at or approximate to the average gain adjustment values of the previously assigned PCDs to prevent sudden rise or drop in gain as outputted by the PA system 140.

In some embodiments, the host 120 and/or the client 130 may transmit a request over the network 150 to the PCD 110. The request may be a request to change an output frequency of the PCD output signal 540 and/or the client output signal 560. In some embodiments, the host 120 and/or the client 130 may request the PCD 110 to change its PCD output signal 540 and/or the client output signal 560 periodically (such as, but not limited to, 5 ms, 10 ms, 20 ms, and/or the like). Given that howling occurs at a same frequency over time, howling may be suppressed when the frequency of the PCD output signal 540 and/or the client output signal 560 is switched periodically to avoid amplitude building up at any one particular frequency. In some embodiments, the output frequency of the PCD output signal 540 and/or the client output signal 560 may be alternated between odd or even frequencies. In some embodiments, a predetermined set of at least two output frequencies (randomized or predetermined)

may be cycled over time as the output frequency of the PCD output signal 540 and/or the client output signal 560. In some embodiments, the frequency of the PCD output signal 540 and/or the client output signal 560 may be offset by a randomized or predetermined frequency range.

In some embodiments, automatic close loop control may be implemented with respect to the client 130 to provide feedback on gain adjustment and normalize the gain across multiple PCDs (such as the PCD 110). The PCDs may use Automatic Gain Control (AGC) or Dynamic Range Compression (DRC) algorithms to adjust the gain based on the capabilities of the PCDs. In some embodiments, the client 130 may automatically send the adjustment request to the one of the multiple PCDs to reduce the gain (or adjust the directionality of the sound capturing direction) when the energy of the PCD output signal 540 and/or the client output signal 560 of the one of the multiple PCDs exceeds a predetermined threshold. As such, the client 130 may regulate the gain of the multiple PCDs automatically without input from the host 120. Also, the client 130 and/or host 120 may choose DRC, AGC, or some other suitable algorithm used by the PCDs based on the common capabilities (software version, algorithm support, etc) across multiple PCDs and provide that information along with the gain adjustment feedback.

FIG. 15A is a process flowchart illustrating an example of a generalized connectivity selection method 1500a according to various embodiments. Referring to FIG. 1-15A, first at block B1510, the PCD 110 may be connected to a plurality of networks (or subnetworks/channels) at the same time for sending traffic (audio, non-audio, and/or uplink data). For example, the PCD 110 may be connected to two or more of WiFi, cellular (3G/4G/5g), BLE, Wifi-D, LTE-D, and the like at the same time. Next at block B1520, the PCD 110 may transmit data via a selected network of the plurality of networks (or sub-networks/channels) based on attributes associated with each of the plurality of networks and requirements associated with the data.

Each network may be associated with attributes such as, but not limited to, bandwidth, quality of service (QOS), delay characteristics, load on the network, and/or the like. The data may be associated with requirements such as delay sensitivity, priority, QOS requirement, and/or the like. For example, audio data (such as, but not limited to, the PCD output signal 540) may be associated with high delay sensitivity, high priority, and/or high quality of service. For example, the application data containing the PCD output signal 540 may be transmitted over a network having high bandwidth, low delay, and/or the like. Other application data may be transmitted over another network having relatively lower bandwidth, higher delay, and/or the like. In some embodiments, where a PCD 110 could not locate a suitable/available network to transmit a data type, such data of the data type may not be send until a suitable/available network has been discovered or made available by/to the PCD 110.

FIG. 15B is a process flowchart illustrating an example of a Service Set Identifiers (SSID)-based connectivity selection method 1500b according to various embodiments. The SSID-based connectivity selection method 1500b may be a particular implementation of the connectivity selection 1500a (i.e., block B1530 may be a particular implementation of block B1510, and block B1540 may be a particular implementation of block B1520). Referring to FIG. 1-15B, first at block B1530, the PCD 110 may be connected to a plurality of SSIDs at the same time for sending traffic via the network 150, which may be a WiFi network associated with the multiple SSIDs. Next at block B1540, the PCD 110 may transmit data (such as, but not limited to, audio data, non-audio data, uplink data, metadata, and/or the like) via a selected SSID of the plurality of SSIDs based on attributes associated with each of the plurality of SSIDs and requirements associated with the data.

Each SSID may be associated with attributes such as, but not limited to, bandwidth, quality of service (QOS), delay characteristics, load on the network, and/or the like. The data may be associated with requirements such as delay sensitivity, priority, QOS requirement, and/or the like. For example, the audio data (such as, but not limited to, the PCD output signal 540) may be associated with high delay sensitivity, high priority, and/or high quality of service. The application data containing the PCD output signal 540 may be transmitted over a SSID having high bandwidth, low delay, and/or the like. Other application data may be transmitted over another SSID having relatively lower bandwidth, higher delay, and/or the like. In some embodiments, whereas the PCD 110 could not locate a suitable/available SSID to transmit a data type, such data of the data type may not be send until a suitable/available SSID has been discovered or made available by/to the PCD 110.

FIG. 16A is a process flowchart illustrating an example of a Device-to-Device (D2D) link establishing method 1600a according to some embodiments. Referring to FIGS. 1-16, in some cases, as the PCD 110 (or a plurality of PCDs), the host 120, the client 130, and/or the like communicate with each other via the network 150, a backhaul delay may appear as the data is transmitted from one device to a server supporting the network 150, and then to the receiving device. The backhaul delay may occur in at least two cases. A first case is when data transmitted from the PCD 110 to the client 130 via a server. A second case is when data transmitted from the PCD 110 to the client 130 via a backhaul network (including, but not limited to, a cellular network, WiFi network, in which the audio data is sent through multiple network components). In most of the cases, as the PCD 110 and the client 130 of the PA system 140 are in a same room or within reach of each other via a suitable D2D single hop link. To avoid such backhaul delay, the devices are in communication via suitable D2D single hop link such as, but not limited to, Wifi-Direct, BTLE, LTE-Direct, Bluetooth, and/or the like.

In some case, signaling for any session setup which require interaction between the PCD 110 and the host 120. The host 120 may not be in the D2D range or may not support D2D (typically servers are connected over Ethernet). Data sent to or received by the host 120 may be transmitted via the network 150. The delay sensitive traffic like voice/audio data can be transmitted over D2D. One of ordinary skill in the art should appreciate that, data transfer is not limited to audio data, non-audio data, uplink data, but also may include text messages, file sharing, streaming, and/or the like. Data may be transmitted over D2D to take advantage of the benefits the single hop link provides.

At block B1610, the host 120 (and/or the server) may be provide as a trust center for paring the client 130 with at least one PCD 110. In particular embodiments, the host 120 may store identification information (such as, but not limited to, IP address) associated with the client 130 and at least one PCD 110 store in the memory unit 330 of the host 120. Next at block B1620, the host 120 may pair the client 130 with the at least one PCD 110, for example, based on the identification information (such as, but not limited to, the session identifier). Any suitable handshake may take place between the paired devices. In response to a successful handshake, the client 130 and the at least one PCD 110 may initiate suitable D2D communication as described.

Figure 16B:
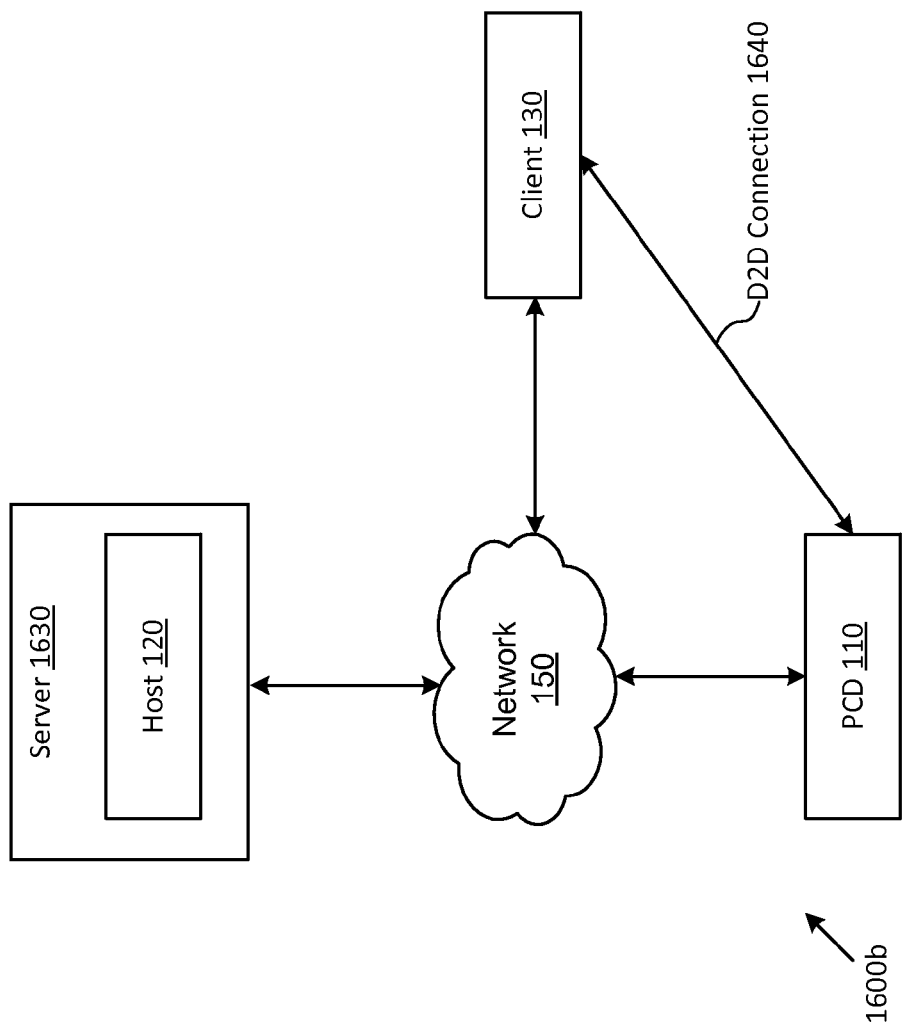
FIG. 16B is a system diagram illustrating an example of a D2D link system according to various embodiments.

FIG. 16B is a system diagram illustrating an example of a D2D link system 1600b according to various embodiments. The D2D link system 1600b may correspond to the device-to-device (D2D) link establishing method 1600a. Referring to FIGS. 1-16B, the PCD 110, the server 1630 (and the host 120), and the client 130 may all be connected to each other via the network 150. The host 120 may be coupled to (via the network 150 or other suitable networks) or is a part of the server 1630. In some embodiments, the server 1630 may be provided as the trust center in the manner described when the host 120 is not a part of the server 1630 or does not perform the D2D link establishment processes described herein.

The PCD 110 may send a request in the form of a signal to the server 1630 (and/or the host 120). The server 1630 (and/or the host 120) may, in response to the request, may transmit the client identification information stored as set forth in block B1610 to the PCD 110. The PCD 110 and the client 130 may then, based on the client identification information, initiate handshakes for establishing the D2D communication.

In further or other embodiments, the client 130 may be coupled to (via the network 150 or other suitable networks) or is a part of the server 1630. It should be appreciated by one of ordinary skill in the art that in addition to of establishing a D2D connection between a PCD 110 and the client 130, the PCDs amongst themselves may also establish D2D connection via the trust center of the host 120 or the server 1630.

Figure 17:
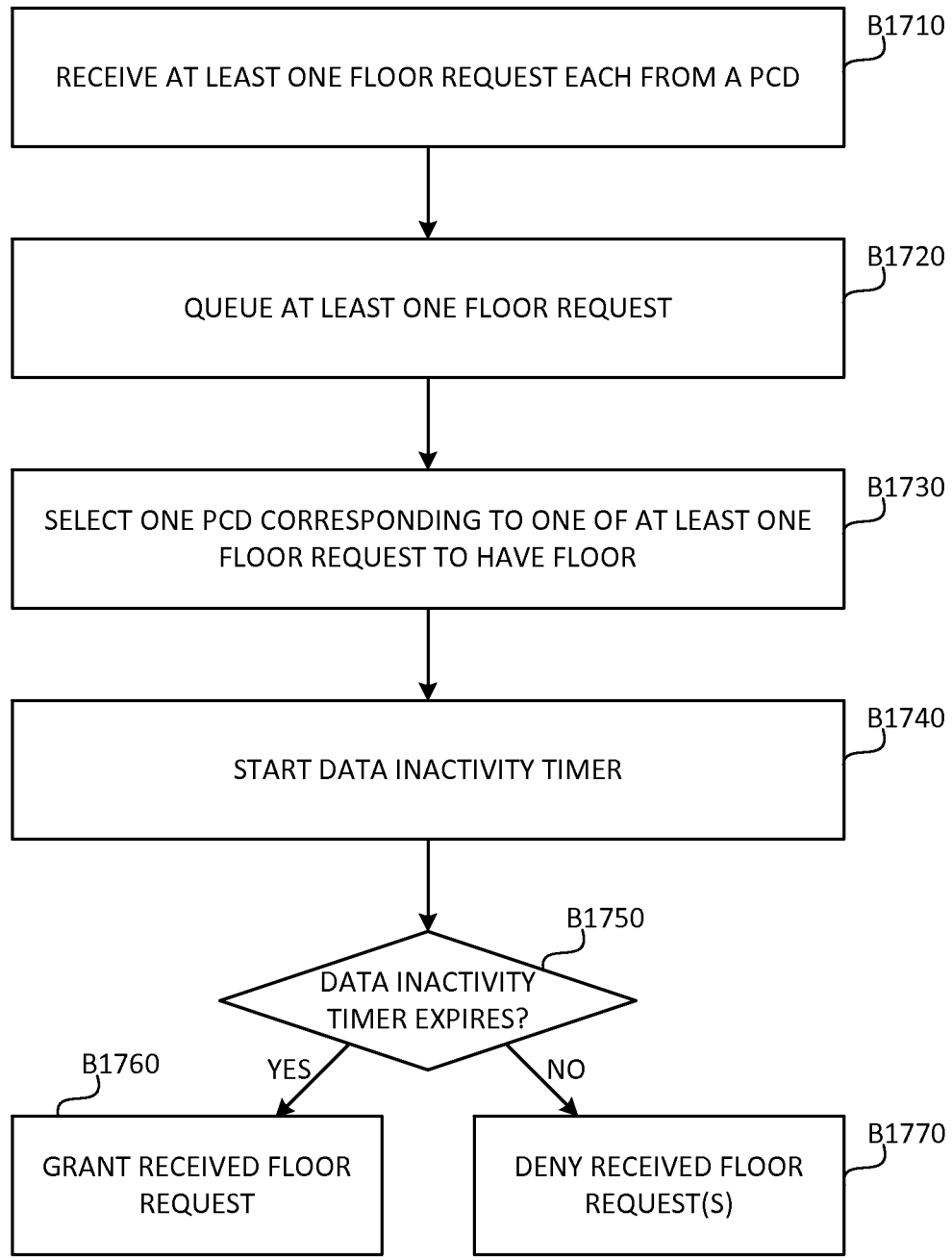
FIG. 17 is a process flowchart illustrating an example of a floor control method according to various embodiments.

FIG. 17 is a process flowchart illustrating an example of a floor control method 1700 according to various embodiments. First at block B1710, the client 130 may receive at least one floor request, each from a PCD 110. The floor request may include identification information such as, but not limited to, an IP address of the PCD 110.

Next at block B1720, the client 130 may queue the at least one floor request (such as, but not limited to, when the client 130 receives two or more floor requests). In some embodiments, the queue may be ordered in suitable manner such as, but not limited to, time when received by the client 130 and/or other designated priority scheme. Each PCD 110 associated with the at least one floor request may be assigned a position (such as, but not limited to, a number) in the queue based on the order. The position may be transmitted back to the corresponding PCD 110 to be displayed via the user interface device 250. As such, the user of the PCD 110 may be aware of his or her position in the queue.

Next at block B1730, the client 130 may select one PCD corresponding to one of the at least one floor request to have the floor. In some embodiments, the client 130 may choose a PCD which transmitted a floor request that is received prior in time as compared to other floor request(s) within the queue. In other embodiments, the client 130 may select a PCD based on other suitable priorities, including manual selection (via user interface device 450) by an operator of the client 130.

Next at block B1740, the client 130 may start a data inactivity timer. In some embodiments, the data inactivity timer may be started as soon as the PCD has been selected. In other embodiments, the data inactivity timer may be selected when the energy and/or amplitude of the output PCD signal 540 falls below a predetermined threshold. At block B1750, the client 130 determines whether the data inactivity timer has expired. When the data inactivity timer has not yet expired, the client 130 may deny any received floor request(s) from at least one other PCD at block B1770 (B1750:NO). The received floor request(s) may be already been placed in the queue or has been received since the start of the data inactivity timer. On the other hand, when the data inactivity timer has expired, the client 130 may grant a received floor request at block B1760(B1750:YES). In some embodiments, the first floor request received subsequent to the expiration of the data inactivity timer may be selected to have the floor. In other embodiments, the client 130 may select another PCD corresponding to another one of the at least one floor request in the queue based on priority as described.

In some embodiments, a server may be connected to the network 150 for storing data (such as, but not limited to, audio data in transit, metadata, and/or the like). The host 120 and/or the client 130 may be devices that is connected to the server (such as, but not limited to, via the network 150 or other suitable network). The host 120 and/or the client 130 may access data stored on the server. In some embodiments, the server may be configured to handle the floor request (such as, but not limited to, instead of the client 130) as set forth in the floor control method 1700.

Figure 18:
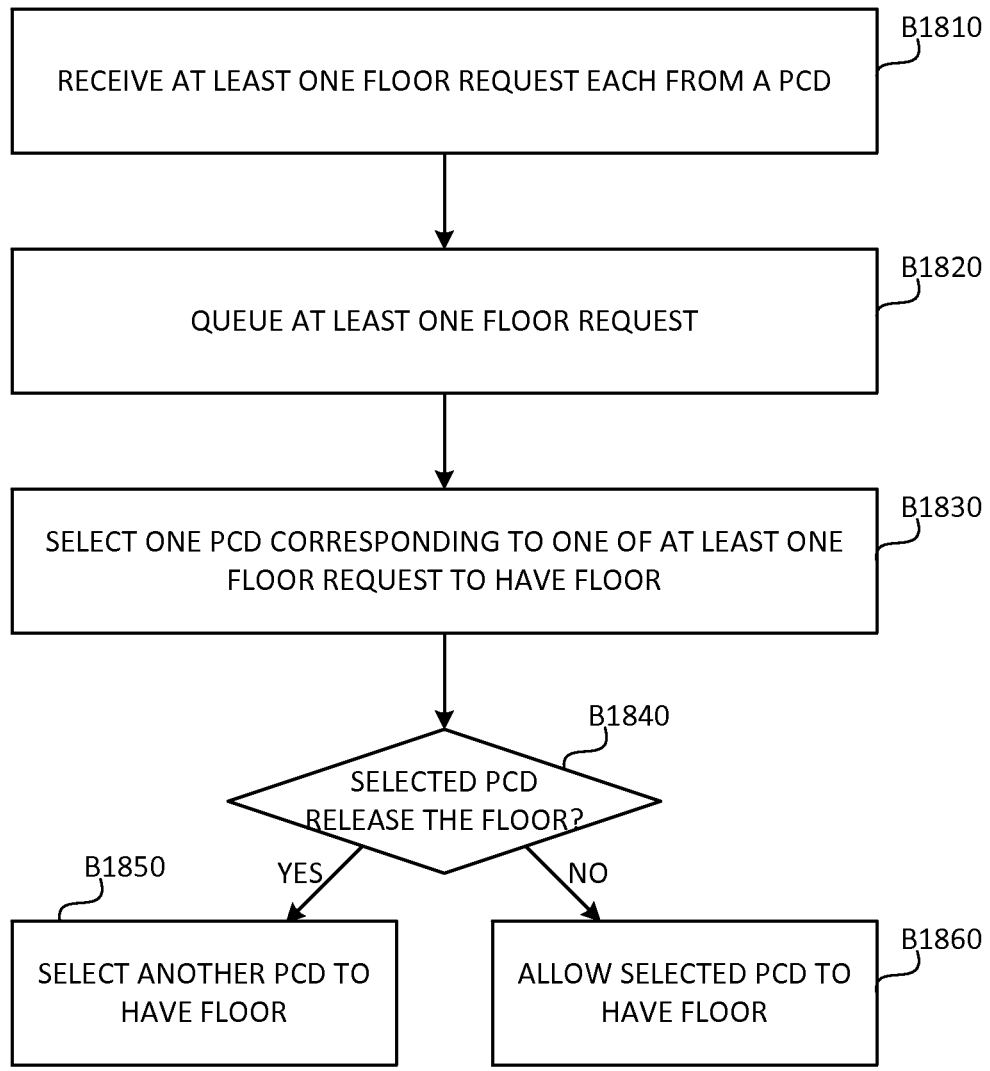
FIG. 18 is a process flowchart illustrating an example of an alternative floor control method according to various embodiments.

FIG. 18 is a process flowchart illustrating an example of an alternative floor control method 1800 according to various embodiments. Referring to FIGS. 1-18, first at block B1810, the client 130 may receive at least one floor request in a manner such as, but not limited to, block B1710. Next at block B1820, the client 130 may queue the at least one floor request (such as, but not limited to, when the client 130 receives two or more floor requests) in a manner such as, but not limited to, block B1720. Next at block B1830, the client 130 may select one PCD corresponding to one of the at least one floor request to have the floor in a manner such as, but not limited to, block B1730.

Next at block B1840, the client 130 may determine whether the selected PCD has released the floor (such as, but not limited to, no longer assigned to transmit signals). In some embodiments, the user of the selected PCD may indicate via the user interface device 250 that it is releasing the floor. In some embodiments, the selected PCD, the host 120, and/or the client 130 may automatically determine such release when the energy or amplitude of the output PCD signal 540 is below a predetermined threshold. In some embodiments, a timer is provided (such as, but not limited to, a predetermined amount set by an operator of the host 120 or the client 130) that represent an allotted time for each PCD to have the floor. When the timer expires, the selected PCD is determined to have released the floor.

Next at block B1860 (B1840:NO), the client 130 may allow the selected PCD to have the floor when the selected PCD has not yet released the floor. On the other hand, whereas the selected PCD has released the floor (B1840:YES), the client 130 may selected another PCD to have the floor at block B1850. The another PCD may correspond to a floor request that is next on the prioritized queue.

In various embodiments, a floor request may be displayed via the user interface device 250, the user interface device 350 or the user interface device 450 to be perceived by the operator or the user of the PCD 110 (a PCD different from the origin of the floor request), the host 120, or the client 130 respectively. The floor request may be displayed as a popup window or any other types of visual/audio notification and notify the operator/user of the request. The operator/user may then indicate approval or rejection through the user interface device 250, the user interface device 350, or the user interface device 450.

One of ordinary skills in the art would appreciate that, alternative to the client 130 being the device performing the alternative floor control method 1800 as described herein, the host 120 and/or the server 1630 may, instead, perform the alternative floor control method 1800 in a similar manner.

In some embodiments, the PCD 110 (such as, but not limited to, the user interface device 250) may provide its user an option (configured as a user interactive element) to request instantaneous floor access to join an ongoing conversation. The ongoing conversation may refer to a PCD transmitting data to the client 130 after the floor has been granted, such as, but not limited to, after the establishing of the active participant session 620. In some embodiments, when selected the instantaneous floor access user interactive element provided by the user interface device 250, the PCD 110 may transmit a request directly to the server (such as, but not limited to, bypassing the host 120 and the client 130). The sever, in response, may automatically grant the instantaneous floor access request to allow the PCD 110 to transmit audio without any operator input at the host 120 or the client 130. In other embodiments, the instantaneous floor access request may be transmitted to the host 120 or the client 130 for approval. For example, the request may be displayed to the user interface device 350 or the user interface device 450 to be perceived by the operator. The operator may then indicate approval or rejection through the user interface device 350 or the user interface device 450.

In some cases, given that media data may be transmitted over a wireless link, it may be relatively foreseeable that an uninvited third-party device could sniff out the port on which the client 130 is receiving the media data and jam the port by sending unsolicited data despite the third-party device is not an approved device to communicate.

Figure 19A:
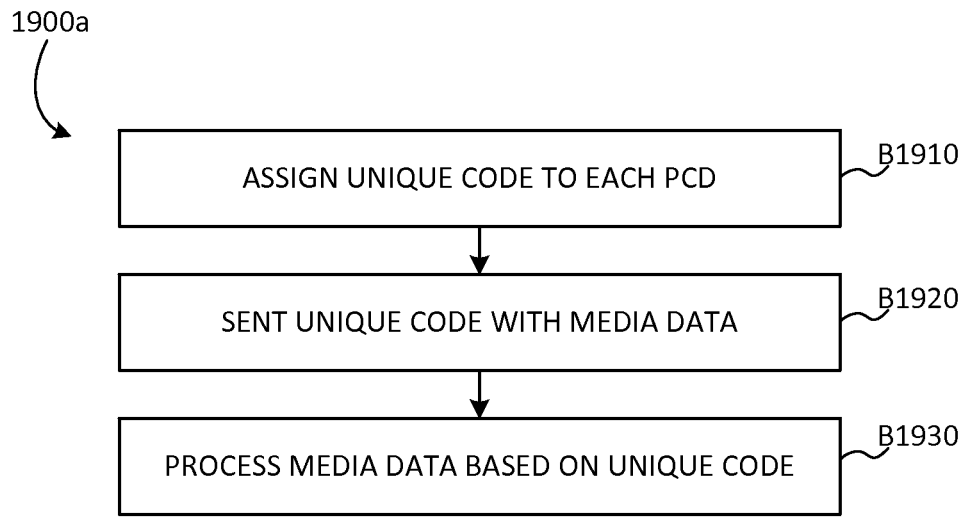
FIG. 19A is a process flowchart illustrating an example of a first jamming prevention method according to some embodiments.

FIG. 19A is a process flowchart illustrating an example of a first jamming prevention method 1900a according to some embodiments. First at block B1910, a unique code may be assigned to a PCD 110. A plurality of PCDs 110 may each be assigned a unique code, for example, at a beginning of the session by the host 120, the client 130, or the server automatically or manually. The unique code may be any pseudo-randomly generated code, or otherwise. Such unique code may be distributed to the host 120 or the client 130 so as to generate a list of approved PCDs 110. Next at block B1920, the PCD 110 may send the unique code with its media data to the client 130. At block 1930, the client 130 may receive the unique code with the media data and process the media data based on the unique code. In other words, the client 130 may determine whether the unique code is associated with an approved PCD 110. The client 130 may only process the media data associated with an approved PCD 110.

Figure 19B:
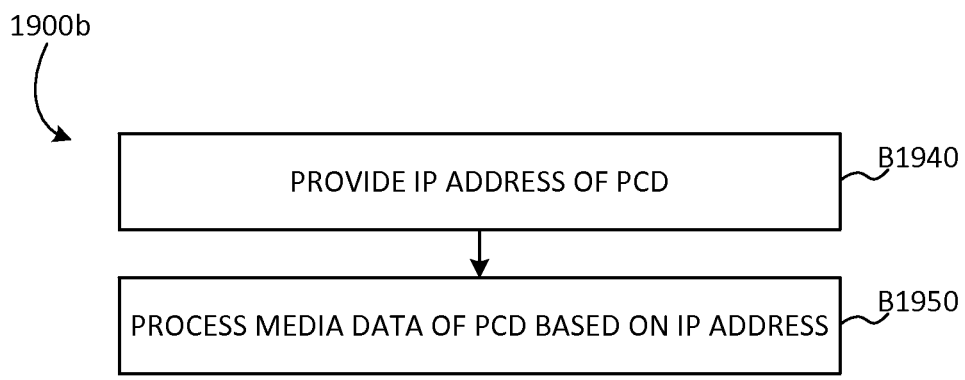
FIG. 19B is a process flowchart illustrating an example of a second jamming prevention method according to some embodiments.

FIG. 19B is a process flowchart illustrating an example of a second jamming prevention method 1900b according to some embodiments. First at block B1940, the host 120 may provide an IP address (or other identifying information) of the PCD 110 to the client 130. A list of approved devices corresponding to IP addresses associated with each may be stored in the client 130 and/or the host 120. At block B1950, the client 130 may process media data of the PCD 110 based on the IP address provided by the host 120. In other words, the client 130 may receive the media data from the PCD 110 and the IP address associated with the PCD 110. The client 130 may only process media data from PCD 110 I the corresponding IP address identifies the PCD 110 as one of the approved device (as ascertainable from the list of approved devices).

Figure 19C:
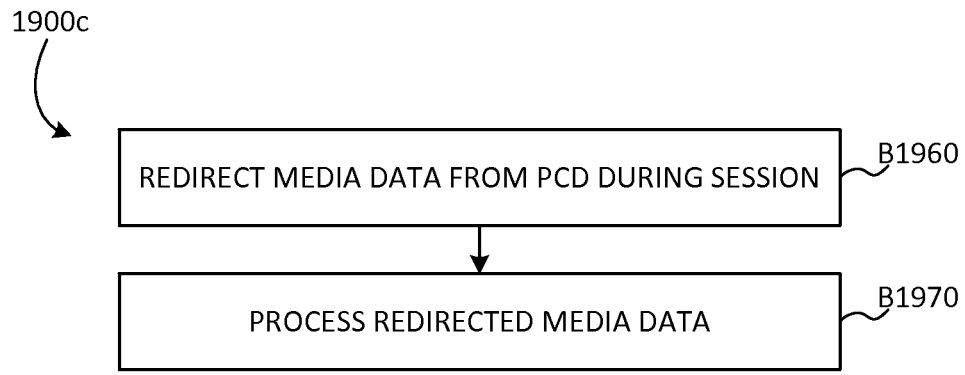
FIG. 19C is a process flowchart illustrating an example of a third jamming prevention method according to some embodiments.

FIG. 19C is a process flowchart illustrating an example of a third jamming prevention method 1900c according to some embodiments. First at block B1960, the host 120 may be configured to redirect media data from PCD 110 during session, for example, to a different client 130 (where two or more clients 130 may be present in the system), or to a different port of the same client 130. Next at block B1970, the client(s) 130 may be configured to process the redirected media data.

In some embodiments, the client 130 may encounter various performance issues such as, but not limited to, port jamming, media data packet loss, and/or the like. Restarting the client 130 may be needed from time to time to reset the configurations. In some embodiments, the host 120 may be configured to allow a user of the host 120 (via the user interface device 350) to reset the client 130 with modified configuration. Such modified configuration may include opening a socket at a different port number, and/or the like. Given that the client 130 and the host 120 may be at different nodes of the network 150 and thus at different locations, the client 130 may be remotely reconfigured/restarted by the host 120.

Figure 20:
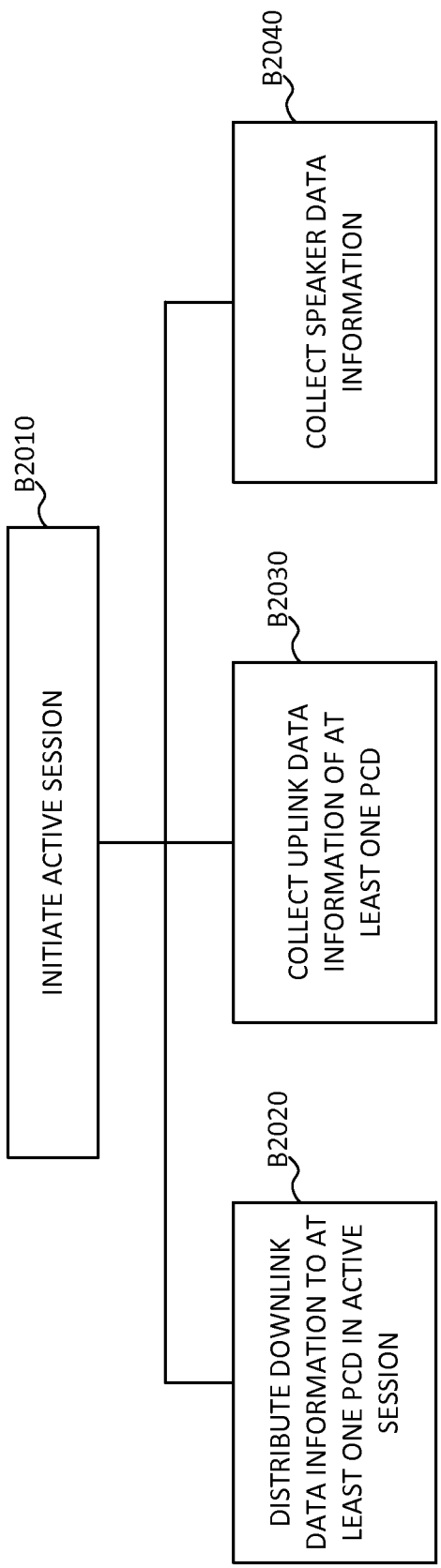
FIG. 20 is a process flowchart illustrating an example of a data collection method according to various embodiments.

FIG. 20 is a process flowchart illustrating an example of a data collection method 2000 according to various embodiments. Referring to FIGS. 1-20, an active session including a plurality of PCDs (such as, but not limited to, PCD 110) may be initiated at block B2010. The active session may include the active moderator session 610 and the active participant session 620 between at least one PCD 110 and the client 130. Blocks B2020, B2030, and B2040 may occur simultaneous or sequentially at no particular order following block B2010.

With respect to block B2020, the host 120, the client 130, or the server may distribute downlink data information to the at least one PCD in the active session. The downlink data information may include, but not limited to, presenter's biography, presentation material, reference sites, advertisement based on the presenter's information or content, and/or the like. In some embodiments, the at least one PCD may display the downlink data information on the user interface device 250 to assist the user in the presentation/conference. Such downlink data information may be stored in any suitable memory units associated with the host 120 (memory unit 330), the client 130 (memory unit 430), and the server (not shown). The downlink data information may be collected as uplink data information previously, for example, in block 2030. In other embodiments, the downlink data information may be prestored or manually inputted.

With respect to block B2030, the host 120, the client 130, or the server may collect uplink data information from the at least one PCD in the active session. The at least one PCD may send uplink data information to one or more of the host 120, the client 130, or the server. The uplink data information may include, but not limited to, audio message, live questions, instance messages, user profile information, profile picture, biography, and/or the like. In some embodiments, the host 120, the client 130, or the server may send a request to some of the at least one PCD in the active session for uplink data information. The PCD(s) may then send such information to the host 120, the client 130, or the server.

With respect to block B2040, the host 120, the client 130, or the server may collect speaker data information. A speaker device may be a PCD that has been, at some point, assigned the floor in the manner described. Speaker data information include, but is not limited to, maker and model of the speaker device, name of user, affiliation of the speaker or the user of the speaker device, audio speech (converted into text), and/or the like originating from the speaker device. In particular embodiments, data (audio data) originating from the speaker device may be recorded and archived at any suitable remote databases for later access.

In some embodiments, the downlink data information and the uplink data information may be transmitted in such manner even when there is no active participant session 620 established between PCD 110 and the host 120/client 130. Whenever the PCD 110 is connected to the network 150 (such as, but not limited to, after launching an application at device level of the PCD 110 and/or successful registration/authentication with server/host 120/client 130, the downlink data information and the uplink data information may be collected and/or distributed.

Figure 21:
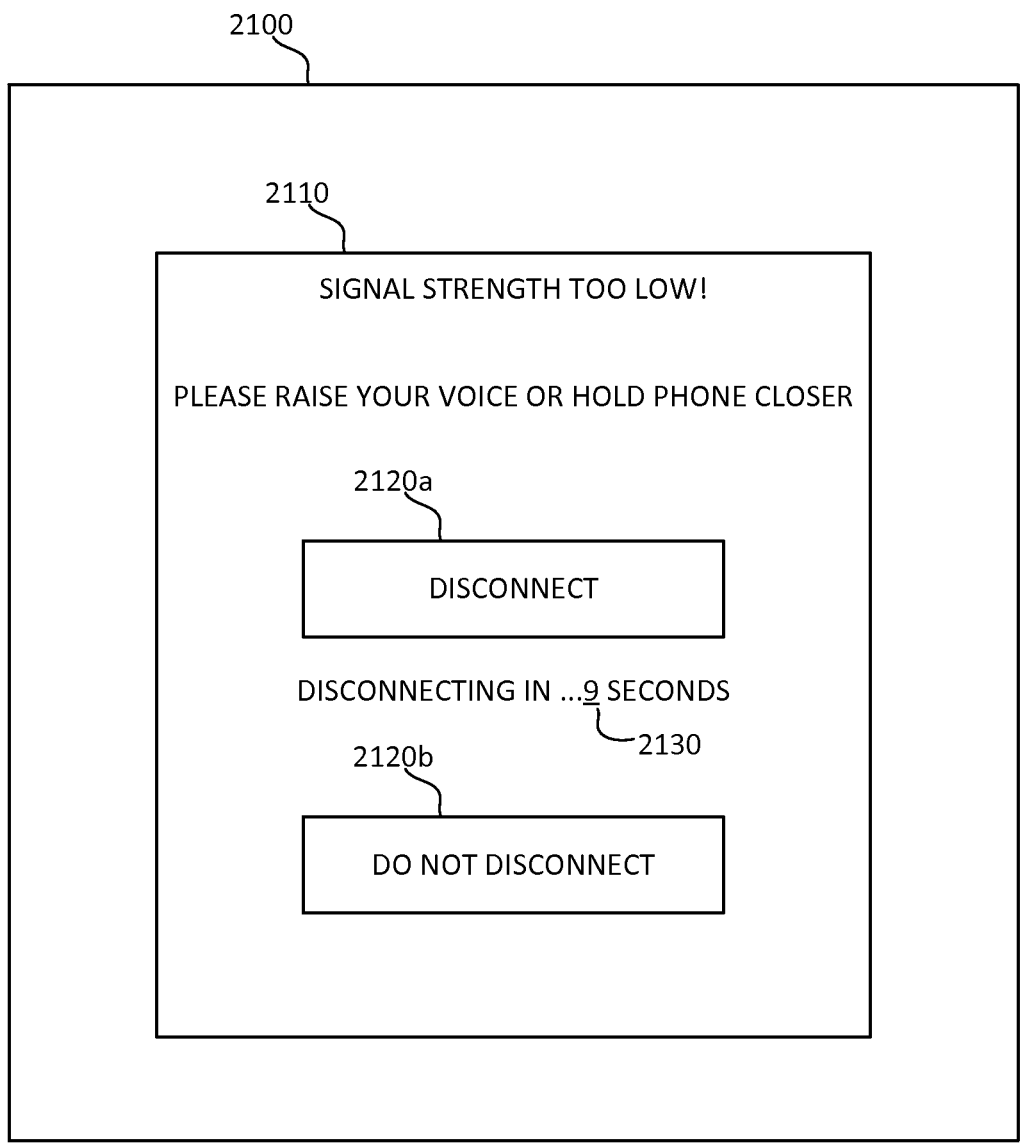
FIG. 21 is an example of a screen shot 2100 informing the user of the PCD the signal strength is too low.

FIG. 21 is an example of a screen shot 2100 informing the user of the PCD 110 the (audio) signal strength is too low. Referring to FIGS. 1-21, the client 130 may monitor the signal strength (such as, but not limited to, signal energy) of the PCD output signal 540 and send a request to the PCD 110 when the signal strength is below a predetermined threshold. In response, the PCD 110 may display a pop-up window 2110 notifying the user that the signal strength is below a threshold and advice the user to either raise his or her voice or hold the PCD 110 closer to the mouth. In some embodiments, whereas the PCD output signal 540 is below a predetermined threshold, a first user interactive element 2120*a* may be provided in the pop-up window 2110 such that, when selected, would trigger the PCD 110 to give up the floor (such as, but not limited to, disconnected as the designated speaker). A second user interactive element 2120*b* may be provided to keep the PCD 110 connected and/or dismiss the pop-up window 2110. In further embodiments, a timer 2130 may be provided such that if the user does not select either the first user interactive element 2120*a* or the second user interactive element 2120*b*, the PCD 110 may be automatically disconnected.

In some embodiments, when the PCD output signal 540 is below a predetermined threshold, the PCD 110 may be deemed to be not a speaker device (or not assigned the floor in other suitable manner described). The microphone 210 of the PCD 110 may then be muted. In some embodiments, the microphone 210 of a first PCD may be muted when a second PCD has been assigned the floor in the manner described.

Figure 22:
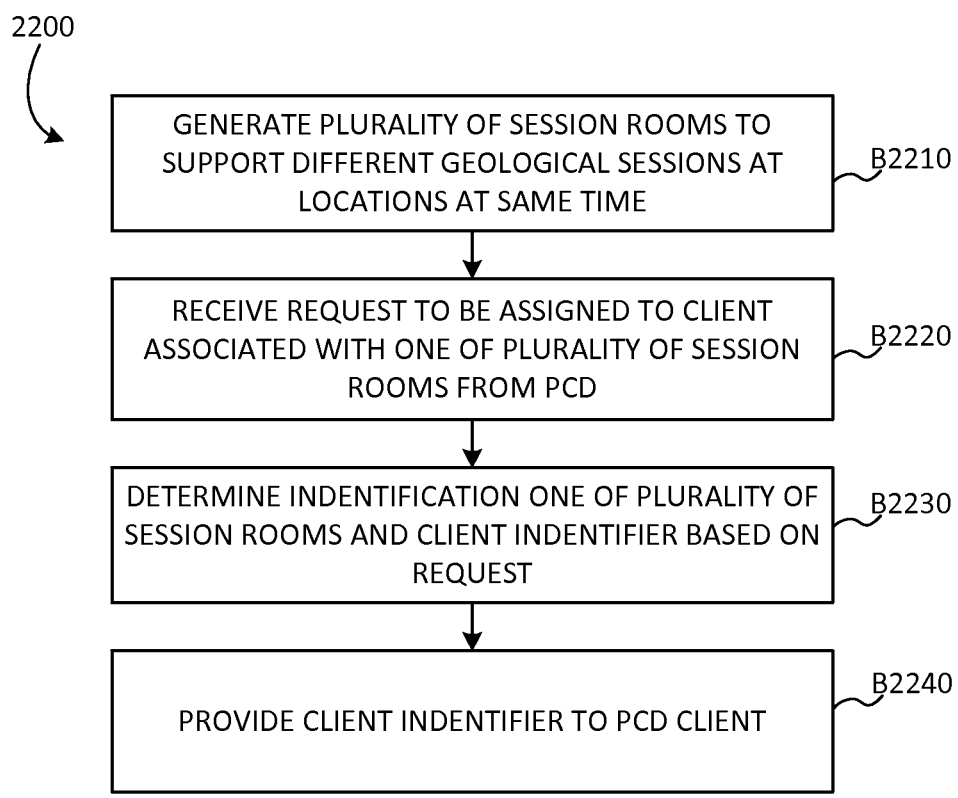
FIG. 22 is a process flowchart illustrating an example of multiple session management method according to various embodiments.

FIG. 22 is a process flowchart illustrating an example of multiple session management method 2200 according to various embodiments. Referring to FIGS. 1-22, first at block B2210, the server may generate a plurality of session rooms to support a plurality of sessions at different geological locations at the same time. For example, in a scenario where multiple conferences are taking place at the same time in different conference halls, a client device 130 may be associated with each conference hall. The server may store data related to each session in separate session rooms (partitions of a memory unit of the server) for individual control.

Next at block B2220, the server may receive a request from a PCD (such as, but not limited to, the PCD 110) to be assigned to a client associated with one of the plurality of session rooms. In some embodiments, the PCD may be carried with the user to a geological location (such as, but not limited to, a particular conference hall) to be used there. In some embodiments, the downlink data information and the uplink data information (as set forth in the data collection method 2000) may be collected, stored, and/or distributed separately for each of the session rooms (such as, but not limited to, stored separately according to each session room). The request may include identification information of the PCD itself or the session identifier identifying a session. Based on the request, the server may determine identification information of one of the plurality of session rooms at block B2230. Given that each of the plurality of session rooms may be associated with a client identifier indicating the identity of the client device 130, the server may also determine the client identifier (such as, but not limited to, IP address). Next at block B2240, the server may provide the client identifier to the PCD. The PCD may then initiate sessions (such as, but not limited to, the active participant session 620) when granted the floor.

In scenarios where there may be a plurality of PCDs (each of which may be the PCD 110), typically one client 130 may support active participant session 610 with only one PCD 110 at a given time. As such, multiple PCDs can only take turns to access the PA system 140. In addition, frequent "access-switch" may be required. This is very cumbersome, at the least. Therefore, it is desirable to allow multiple PCDs to access the PA system 140 simultaneously.

Figure 23:
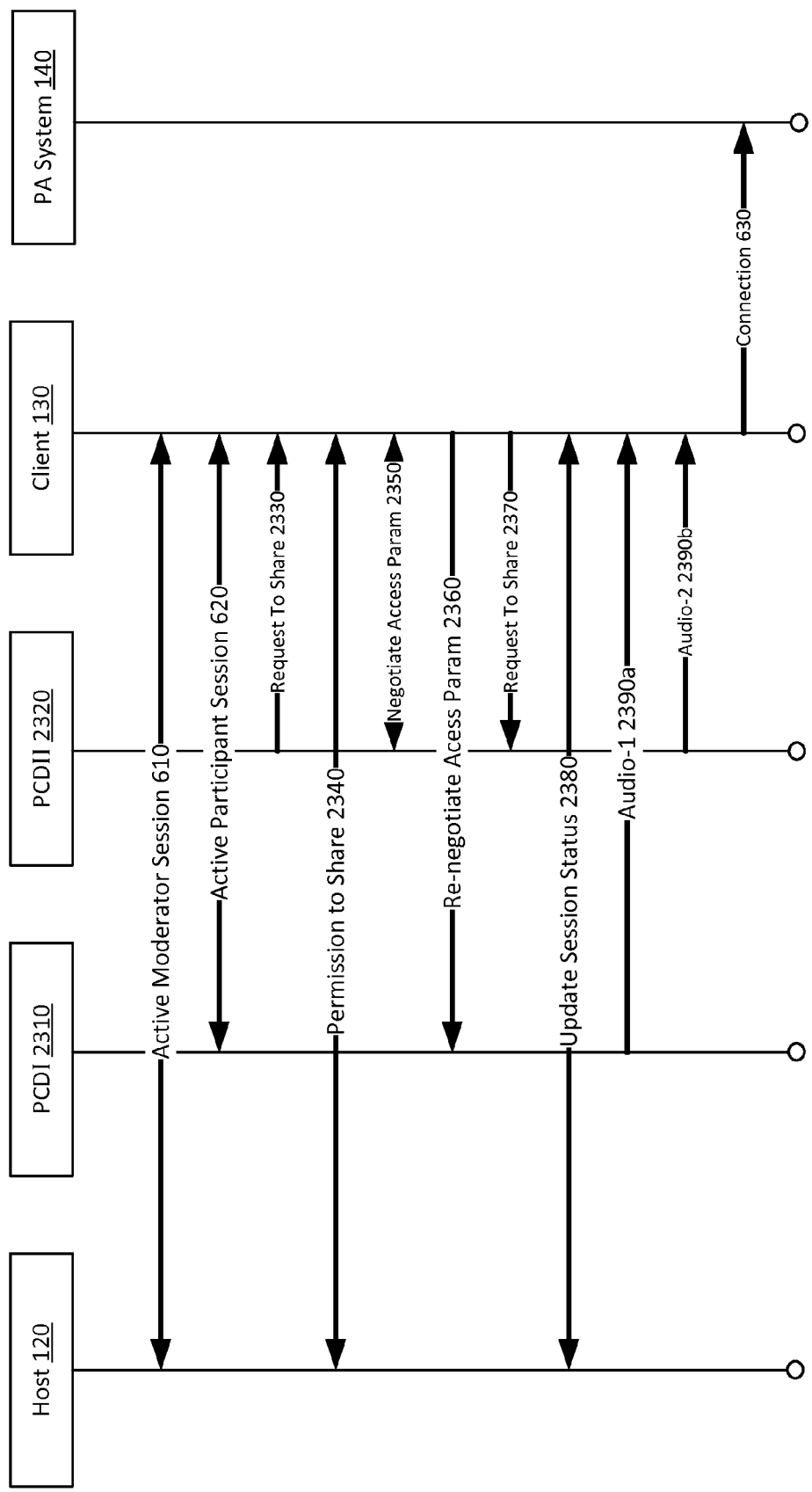
FIG. 23 is diagram illustrating an example of a call flow process according to various embodiments.

FIG. 23 is diagram illustrating an example of a call flow process 2300 according to various embodiments. Referring to FIGS. 1-23, the call flow process 2300 may be implemented with the host 120, the client 130, the PA system 140, a PCD I 2310, and a PCD II 2320. In various embodiments, an active moderator session 610 may be established between PCD I 2310 and the client 130 in the manner described (at least with respect to FIG. 6). The active participant session 620 may be established between PCD I 2310 and the client 130 in the manner described (at least with respect to FIG. 6). The connection 630 may be made between the client 130 and the PA system 140 in the manner described (at least with respect to FIG. 6).

In some embodiments, while PCD I 2310 is already in the active participant session 610 with the client 130, PCD II 2320 may request the client 130 for access (such as, but not limited to, with a request to share 2330). In response to the request to share 2330, the client 130 may seek permission (such as, but not limited to, via the permission to share 2340) from the host 120. The host 120 may response automatically or manually via user interface device 350 permission to share the client 130 between PCD I 2310 and PCD II 2320.

In response to the permission to share 2340 being received from the host 120, the client 130 may set up another active participant session by negotiating access parameters 2350. In some cases, it is likely that PCD I 2310 and PCD II 2320 may have different audio hardware/software processing characteristics. As a result, the client 130 may negotiate with both PCD I 2310 and PCD II 2320 to adjust various parameters of the audio data packets coming from each of PCD I 2310 and PCD II 2320 by negotiating access parameters 2350 and re-negotiating access parameters 2360 with PCD I 2310. The access parameters may include, but are not limited to, sampling rate, sample size, packet size, endian-ness of the samples of the audio data. This allows the participating PCDs (PCD I 2310 and PCD II 2320) to send audio data packets with similar or the same parameters to be processed by one client 130. The client 130 may also update internal resource allocations and assign receive queue for each participating PCD in order to receive and store the incoming audio data from the participating sources.

In response to successful negotiation with PCD II and re-negotiation with PCD I, the client 130 may transmit a response to share 2370 to the PCD II 2320 verifying the share of the client 130. Next, the session status 2380 may be updated between the host 120 and the client 130, indicating the sharing of the client 130. In response to the session status update 2380, audio data from PCD I 2310 (such as, but not limited to, Audio 1 2390*a*) and audio data from PCD II 2320 (such as, but not limited to, Audio 2 2390*b*) may be sent to the client 130. The client 130 may modify and relay the audio data to the PA system 140 via the connection 630.

Figure 24:
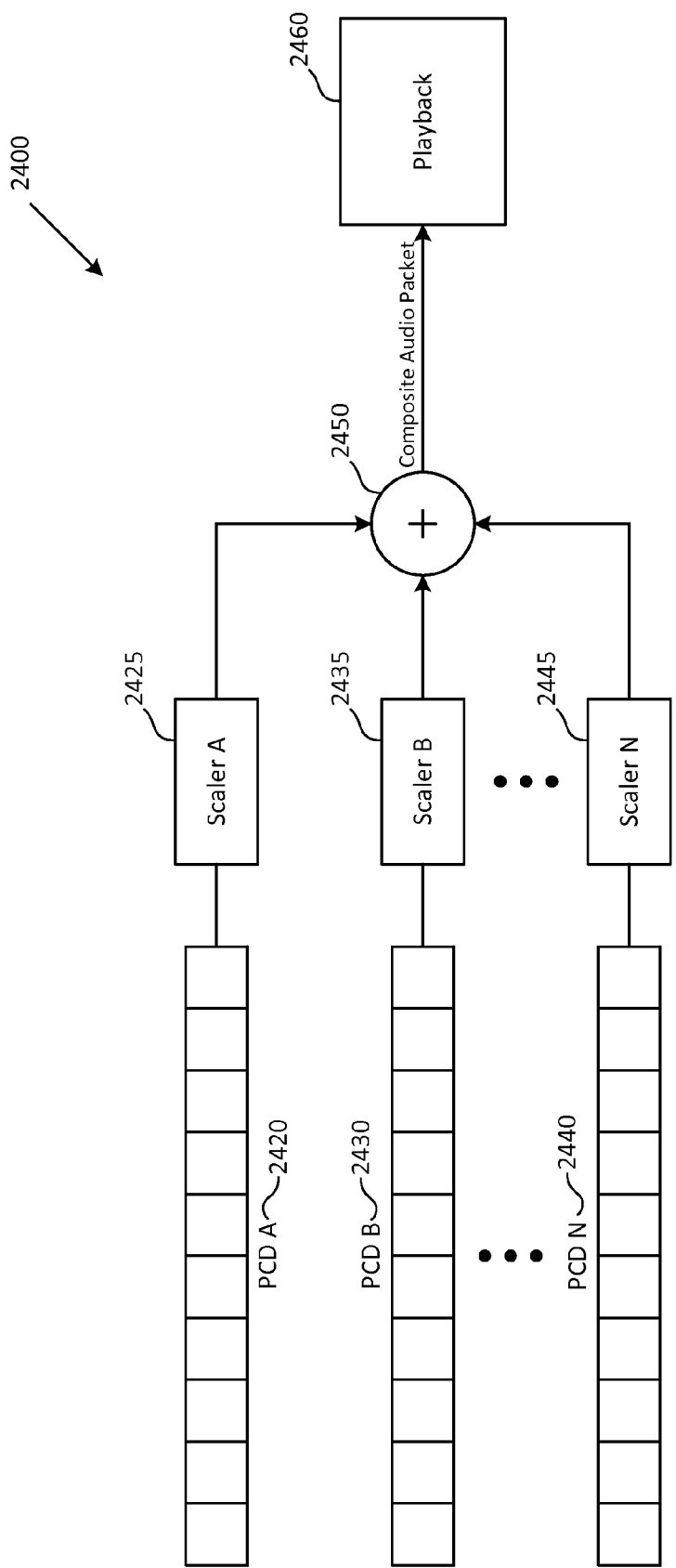
FIG. 24 is a diagram illustrating an example of a multiple PCD shared access processing according to various embodiments.

FIG. 24 is a diagram 2400 illustrating an example of a multiple PCD shared access processing according to various embodiments. Based on the negotiated parameters (e.g. number of samples, sample size, sampling rate), the client 130 may periodically select an audio packet received from each of the participating PCDs. The client 130 then applies dynamically determined scaling factors to one sample at a time from the each of the selected audio packets and produces a composite audio sample by combining scaled samples from each participating PCD. This composite sample is used for playback (such as, but not limited to, at the PA system 140). As a result, input from the all the participating PCDs will be played out through the speakers 141 of the PA system 140. The scaling of the samples may control the energy and avoids possibility of saturation when composite sample is produced.

In a non-limiting example, the multiple PCD shared access processing as set forth in FIG. 24 may include PCD A 2420, PCD B 2430, . . . , and PCD N 2440. Each PCD may produce 2-byte samples using 16 KHz sampling rate, which produces 128-byte audio packets every 4 ms. The client 130 may select a given audio packet from each PCD in a predetermined period of time (such as, but not limited to, 4 ms). The client 130 may scale a 2-byte sample from each of the selected audio packets at the scalers (such as, but not limited to, scaler A 2425, scaler B 2435, . . . , scaler N 2445) by for example, 3. Then, the client 130 may combine the scaled samples into a single composite sample at adder 2450. The composite sample is then sent to playback 2410. For example, the audio sample of PCD A 2420 is assumed to be 900, the audio sample of PCD B 2430 is assumed to be 30000, and the audio sample of PCD N 2445 is assumed to be 63000 (no additional PCD present). After scaling, the scaled audio sample of PCD A 2420 is assumed to be 300, the scaled audio sample of PCD B 2430 is assumed to be 10000, and the scaled audio sample of PCD N 2445 is assumed to be 21000. The composite audio packet may be 31300 as outputted by the adder 2450. The client 130 may repeat this process for each audio sample in all the selected audio packets.

Alternately, multiple clients 130 may be assigned to each PCD having active participant session. These clients 130 would co-ordinate in distributed manner and, in some embodiments, with the help trigger from the host 120, allow multiple PCDs to access the PA system 140 simultaneously.

Accordingly, the shared access as described enables new capacity for the PCD-based PA system 140 (that uses shared wireless medium). Hardware resources may be reduced given that a same client 130 may cater to the plurality of PCDs; therefore, cost is reduced. The shared access processes may also provide a scalable solution, as the call flow could support many more simultaneous PCDs, which traditional PA system (based on wireless microphones) could not have supported without significant hardware expenses.

Figure 25:
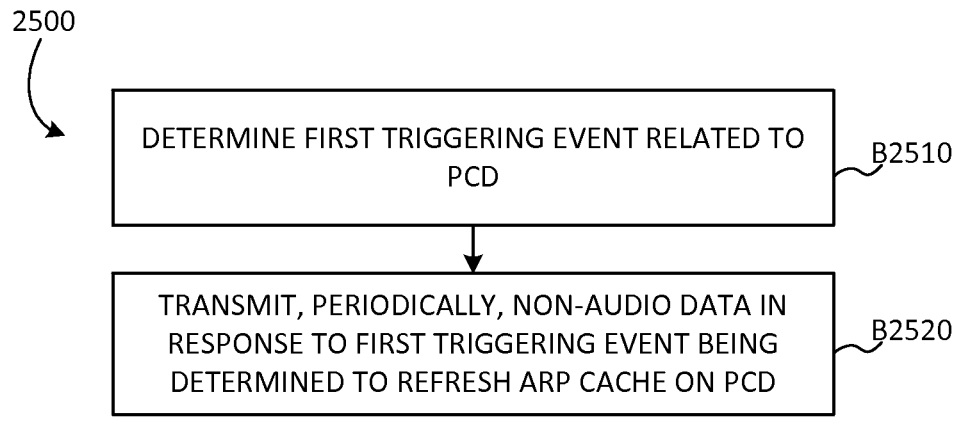
FIG. 25 is a process flowchart illustrating an example of a latency optimization process according to various embodiments.

FIG. 25 is a process flowchart illustrating an example of a latency optimization process 2500 according to various embodiments. In some cases, when a PCD 110 and a client 130 are engaged in the active participant session 620 (such as, but not limited to, the PCD 110 has the floor and is engaged in an active call), audio data is transmitted from the PCD 110 to the client 130. Audio transmission latency may be increased when the address resolution protocol (ARP) cache on the PCD 110 times out and a refreshing mechanism to refresh the ARP cache is triggered. This may result in outgoing data traffic from the PCD 110 to transmit a ARP request and interrupt the sending of audio data given that ARP refresh requests are OS processes having a high transmission priority than audio data transmission processes. As such, the audio data transmission would experience increased latency. In addition, the client 130 may automatically initiate power-saving mode when the audio data is not received for a predetermined period of time. Starting up the client 130 from the power-saving mode may also increase latency for audio data transmission.

Referring to FIGS. 1-25, at block B2510, a first triggering event may be determined. The first triggering may include the PCD 110's position in the queue for floor requests, the PCD 110 being granted the floor, or the like. For example, the position in queue that triggers the sending of the non-audio data may be first in queue, second in queue, third in queue, fifth in queue, or the like. The first triggering event may be determined by client 130, the host 120, the server 1630, and/or the PCD 110. The host 120, the server 1630, and/or the PCD 110 may send an indication of detection to the client 130, the indication including also the PCD 110's identifier (such as, but not limited to, IP address) when detecting the first triggering event. In embodiments where the client 130 itself detects the first triggering event, the client 130 may obtain directly from the PCD 110 or otherwise ascertain the PCD 110's identifier (such as, but not limited to, by requesting it from the server 1630, the host 120, and/or the PCD 110 itself via other suitable channels).

Next at block B2520, the client 130 may periodically transmit non-audio data (via best effort flows in some embodiments, but QOS follows in others) in response to the first triggering event being detected. Whereas the triggering event is the PCD's particular position in queue, the audio data has not yet been received by the client 130 from the PCD 110 (given that the PCD 110 has not been yet granted the floor). In this case, the non-audio data may be sent (periodically) to the PCD 110 while the audio data from the PCD 110 has not yet been received since the PCD has been first queued. Whereas the triggering event is the PCD's been granted the floor, the non-audio data may be sent (periodically) to the PCD 110 while the audio data is being received by the client 130 from the PCD 110. This is to prevent ARP refresh processes when the PCD 110 does not send the audio data (due to silence, network conditions, or the like) for a predetermined period of time. In some embodiments, the non-audio data may be transmitted by the client 130 via best effort flows while the audio data may be transmitted by the PCD 110 via QOS flows. The non-audio data may include ping, User Datagram Protocol (UDP) packets, and/or other meaningful or meaningless data packets. By periodically transferring non-audio data from the client 130 to the PCD 110, the ARP cache does not time out and the client 130 does not enter the power-saving mode. In particular embodiments, where the PCD 110's position in the queue for floor requests is the first triggering event (such as, but not limited to, determined at block B2510), a predetermined time period is determined based on the position in queue. For example, when the PCD 110 reaches a predetermined place (such as, but not limited to, third place) in the queue, the non-audio data may start to be transmitted by the client 130 periodically until the active participant session 620 ends and/or after a subsequent PCD has been granted the floor. In other embodiments, the client 130 may start to transmit the non-audio data periodically in response to the active participant session 620 being initiated (as the first triggering event) until the active participant session 620 ends. The non-audio data may be transmitted once every 1 ms, 2 ms, 5 ms, and/or the like.

In further embodiments, the PCD 110 may periodically transmit non-audio data to the client 130. Such data may be bidirectional (e.g., the client 130 may respond to the PCD 110). For example, the PCD 110 may transmit a ping request and receive a ping response from the client 130, or transmit other types of bidirectional data at longer intervals than the audio data to the client 130 in response to the PCD 110 being granted the floor. Bidirectional data prompts the client 130 to respond in the manner described, thus avoids ARP refresh. The PCD 110 may cease transmitting such data in response to floor release.

Accordingly, one of ordinary skill in the art would appreciate that the non-audio data may be transmitted before the audio data is transmitted. This is true when the first triggering event is the PCD 110's position in the queue. An initial ARP cache request stage may be eliminated to prevent initial latency for the audio data transmitted to the client 130, given that ARP cache has already been requested and is kept timed-in due to the transmissions of the non-audio data before or while the audio data is transmitted.

Figure 26:
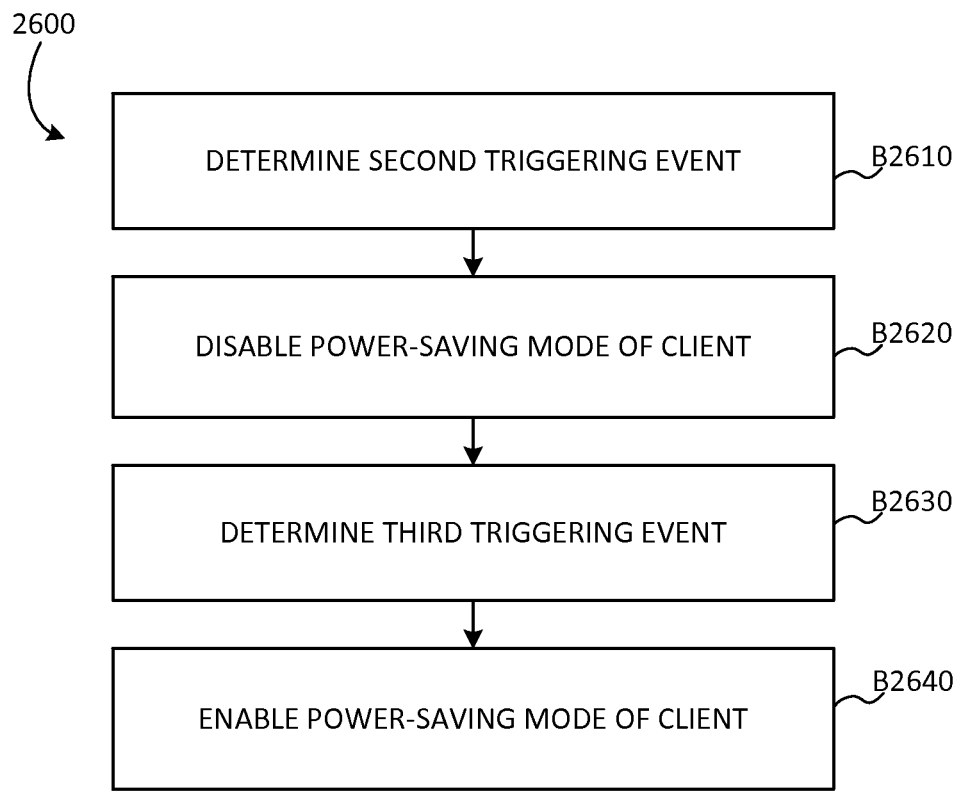
FIG. 26 is a process flowchart illustrating an example of a power-saving mode activation process according to various embodiments.

FIG. 26 is a process flowchart illustrating an example of a power-saving mode activation process 2600 according to various embodiments. As described, when the client 130 enters the power-saving mode, audio transmission latency increases due to the time it would take for the client 130 to wake up from the power-saving mode to transmit the downlink data or relay the audio data. Typically the client 130 enters the power-saving mode when no data is being transmitted or received for a predetermined amount of time from any of the PCDs (or the PCD 110 that has the floor). In some embodiments, the power-saving mode is disabled entirely to assure minimal latency at the sacrifice of power consumption.

Now referring to FIGS. 1-26, the client 130 may determine a second triggering event in block B2610. In some embodiments, the second triggering event may be the launching of an application instructing the client 130 to perform its functions described herein. In other embodiments, the second triggering event may be the floor being granted to a PCD 110 (such as, but not limited to, the PCD 110 being selected from a plurality of PCDs to output audio data captured by the PCD 110). In response to the floor being granted the PCD 110, the entity granting the floor (such as, but not limited to, the server 1630 or the host 120 or the client 130 itself) and/or the PCD 110 itself may transmit any indication of the occurrence of the second triggering event to the client 130.

Next at block B2620, the client 130 may disable the power-saving mode. For example, the client 130 may call an Application Programming Interface (API) (Operating System (OS) or Wireless Local Area Network (WLAN) firmware) to disable the power-saving mode on the client 130. Next at block B2630, a third triggering event may be determined by the client 130. In some embodiments, the third triggering event may be the shutting off of the application for the client 130. In some embodiments, the third triggering event may be receiving an indication to enable the power saving mode of the client 130 from the host 120. An operator manning the host 120 may use the user interface 350 to input the indication to be transmitted over the network 150 to the client 130. In other embodiments, the third triggering event may be the floor being assigned to another PCD (such as, but not limited to, terminating outputting audio data captured by the PCD 110). The third triggering event may be detected by the client 130, the PCD 110, the host 120, and/or the server 1630. In response to block B2630, the client 130 may enable or re-enable the power-saving mode of the client 130.

In further embodiments, in response to detecting the second triggering event by the PCD 110, the PCD 110 may begin transmitting unidirectional non-audio data independent of whether audio data has been transmitted or not. When the PCD 110 is muted, the PCD 110 may send unidirectional non-audio data. Such non-audio data may be sent at an interval shorter than the bidirectional non-audio data sent to prevent ARP cache refresh. This is because shorter interval is needed to prevent the client 130 from entering into the power-saving mode. When the PCD 110 is unmuted, the PCD 110 may cease sending the unidirectional non-audio data as audio data is being sent.

In further embodiments, the client 130 may send unidirectional non-audio data to the PCD 110 if data from the PCD 110 has not been received for a predetermined period (e.g., 100 ms, 200 ms, 1 s, 2 s, 4 s, or the like). The client 130 may send such unidirectional non-audio data until audio data is received form the PCD 110.

In various embodiments, vocoders may be used to encode and decode the audio data described herein. Given that a typical frame interval is 20 ms, the audio transmission delay may be affected by the 20 ms frame generation/playout delay associated with using the vocoders. In other embodiments, the audio frames may be transmitted without vocoding, i.e., pulse-code modulation (PCM) frames transmitted to reduce delays associated with encoding/decoding. As such, latency may further be reduced given that the audio frames are being transmitted more frequently than 20 ms per frame.

Figure 27A:
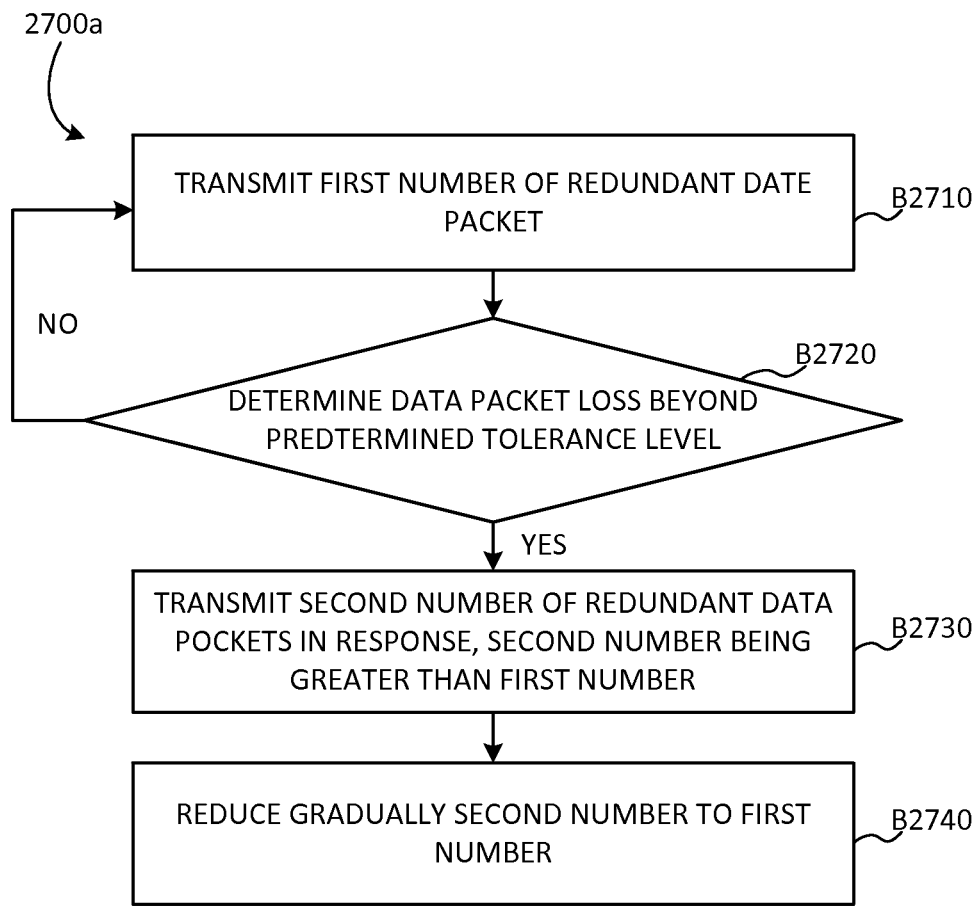
FIG. 27A is a process flowchart illustrating an example of a data packet loss optimization method according to various embodiments.

FIG. 27A is a process flowchart illustrating an example of a data packet loss optimization method 2700*a* according to various embodiments. FIG. 27B is a diagram 2700*b* illustrating an example of a redundant transmission scheme with a same number of packets being transmitted in each bundle. FIG. 27C is a diagram 2700*c* illustrating an example of a redundant transmission scheme with dynamically changing numbers of packets being transmitted in each bundle.

Even though evenly distributed audio data packet loss up to 15% is not likely to be noticeable by human ear, contiguous packet loss may be noticeable. In some embodiments, sending redundant audio data packets such as set forth in the diagram 2700*b* may seek to minimize loss by providing backup copies of previous frames audio data packets at a current frame. For example, each of bundle A 2750*a*, bundle B 2750*b*, bundle C 2750*c*, and bundle D 2750*d* may include 3 frames. Each frame may be associated with a frame index value. In the non-limiting example, the frame associated with a smaller frame index value may be first transmitted before a frame with a larger frame index value. The frame with the largest index (such as, but not limited to, frame [3] in bundle A 2750*a*) is the current frame, as indicated. The larger the number of frames included the bundle (the more the previous frames included), the lesser the overall audio data packet loss because previous frames are transmitted on more occasions. On the other hand, whereas the number of frames included in a given bundle is large, processing time and transmission time may increase latency. The client 130 may use the previous frames (redundant frames) as backup frames and play them in case there is a loss of data occurring at one of the redundant frames transmitted before.

In other embodiments, instead of having the number of previous frames remain constant, a dynamic process (such as, but not limited to, the data packet loss optimization method 2700a) may be implemented to increase the number of previous frames when needed (intolerable loss) and to reduce the number of previous frames when little or no loss has been detected. Such a process can assure low data loss while improves latency.

First at block B2710, the PCD 110 may transmit a first number of redundant (audio) data packets to the client 130. In some embodiments, the first number may be an optimized number that minimizes latency and while providing sufficient coverage for occasional or non-continuous loss of data packets. The first number may be predetermined. Next at block B2720, the PCD 110, the client 130, the host 120, and/or the server 1630 may determine whether data packet loss is beyond a predetermined tolerance level. The predetermined tolerance level may be a number of total data packets lost, a number of continuous data packet lost, a percentage corresponding to each, or a combination thereof. For example, the tolerance level may be total or continuous data packet loss of 10%, 15%, 20%, 30%, or the like. The client 130, as the device receiving the audio data, may determine the data packet loss (in number or in percentage) and transmit it to the PCD 110, the host 120, and/or the sever 1630.

Whereas data packet loss is not beyond the predetermined tolerance level (B2720:NO), the data packet loss optimization method 2700a returns to block B2710. On the other hand, whereas it is determined that the data packet loss is beyond the predetermined tolerance level, the PCD 110 may transmit a second number of redundant data packets in response, the second number is greater than the first number, at block B2730 (B2720:YES). As such, the number of redundant data packets is increased to extend backtracking to recover lost data packets.

Next at block B2740, the PCD 110 may reduce, gradually, the second number to the first number over a predetermined number subsequent frames (such as, but not limited to, 5, 10, 15, or the like). Given that a burst redundant data packet bundles are commissioned to recover lost data packets, subsequent frames need not to adhere to the second number (unless data packet loss at a subsequent frame is also beyond the predetermined tolerance level). The number of redundant frames may return to its optimal number (such as, but not limited to, the first number). For example, a subsequent frame may include a third number of redundant frames, the third number being between the first number and the second number.

In the nonlimiting example illustrated in FIG. 27C, the data packet loss may be determined to be beyond the predetermined tolerance level (B2720:YES) at frame 6 (i.e., after bundle G 2750g). Thus, bundle H 2750h may include an increased number of redundant data packets (such as, but not limited to, 4 redundant data packets instead of 2) to recover lost data packet. The number of redundant frames of subsequent frames may gradually be reduced to the first number (such as, but not limited to, 2). For example, the number of redundant frames for bundle I 2750i is 3, and the number of redundant frames for bundle J 2750j is 2 (such as, but not limited to, the first number).

In some embodiments, the PCD 110 may be determined to be a remote device connected to the network 150 based on geological data (as determined by geolocation, IP address, user input, and/or the like). For example, the PCD 110 may be determined to be a remote device if it is not within a predetermined area (such as, but not limited to, a conference hall). A remote device may function as a PCD 110 in requesting the floor, establish active sessions for data transmission, and/or other functions described herein.

It should be appreciated that the PCD-based PA systems as described herein may be implemented for events, conferences, universities for classes, meetings, and even for ad hoc events, etc.

Figure 28:
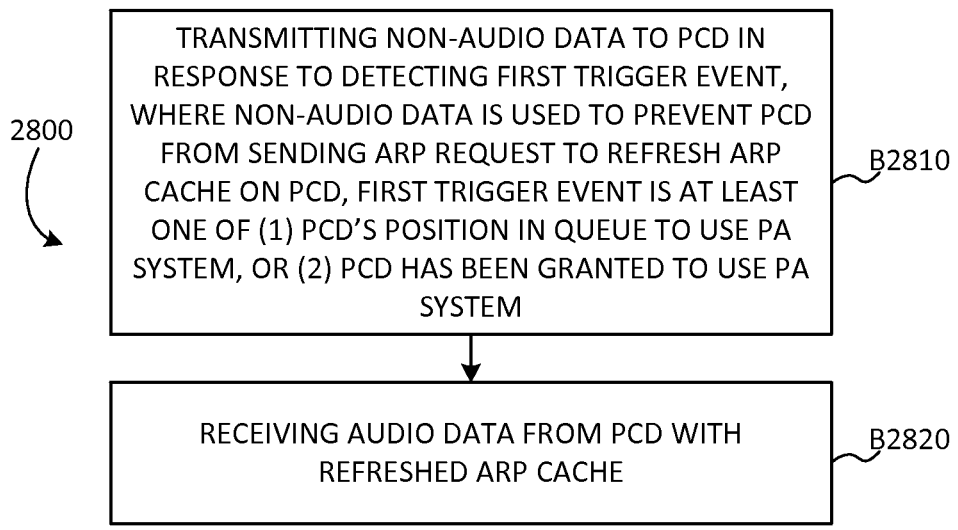
FIG. 28 is a process flowchart illustrating an example of a latency optimization process according to various embodiments.

FIG. 28 is a process flowchart illustrating an example of a latency optimization process 2800 according to various embodiments. Referring to FIGS. 1-28, the client 130 may transmit (via the network device 440 as configured by the processor 420) the non-audio data (such as, but not limited to, ping, UDP, or the like) to the PCD 110 in response to detecting the first triggering event, at block B2810. The non-audio data may be transmitted periodically. The non-audio data is used to prevent the PCD 110 from sending the ARP request to refresh the ARP cache on the PCD 110. The first triggering event may be at least one of (1) the PCD's particular position in the queue (floor queue) to use the PA system 140 or (2) the PCD 110 has been granted the floor to use the PA system 140. The PCD 110 would not need to send the ARP requests, thus reducing latency.

Next at block B2820, the client 130 may receive (via the network device 440 as configured by the processor 420) the audio data from the PCD 110 with the refreshed ARP cache. In the embodiments in which the first triggering event is the PCD's position in the queue, the non-audio data may be transmitted to the PCD 110 before the audio data is received from the PCD 110. The non-audio data may be periodically transmitted to the PCD 110 until the PCD 110 releases the floor or another PCD subsequently takes the floor. In the embodiments in which the first triggering event is the PCD 110 being granted the floor, the non-audio data may be periodically transmitted to the PCD 110 while the PCD 110 is granted the floor. During the floor grant, at least some audio data is received by the client 130 from the PCD 110.

Figure 29:
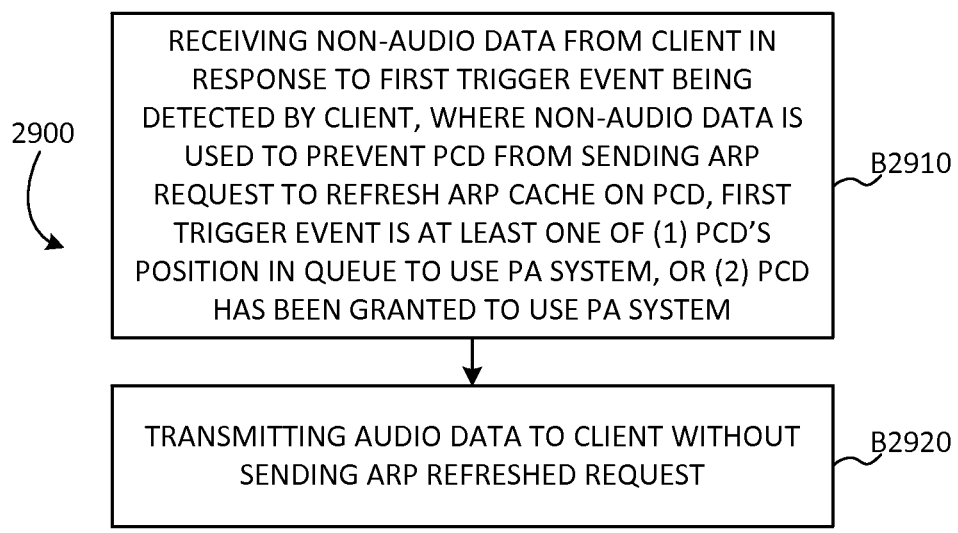
FIG. 29 is a process flowchart illustrating an example of a latency optimization process according to various embodiments.

FIG. 29 is a process flowchart illustrating an example of a latency optimization process 2900 according to various embodiments. Referring to FIGS. 1-29, the PCD 110 may receive the non-audio data from the client 130 in response to the client 130 detecting the first triggering event, at block B2910. The PCD 110 would not need to send ARP request to refresh the ARP cache when the non-audio data is received. The first triggering event is at least one of the PCD's position in a queue to use the PA system 140 or the PCD 110 being granted (the floor) to use the PA system 140. Next at block B2920, the PCD 110 may transmit the audio data to the client 130 without sending ARP refresh requests to refresh the ARP cache.

The de jitter buffer may be used by the client 130 (as implemented with at least one of the processor 420 or the network device 440) to smoothen the jitter and improve audio quality. In embodiments described herein, the de jitter buffer size may be dependent on the expected jitter in the network 150. The expected jitter in the network 150 may be present due to the wireless link delay variation. The wireless link delay variation may be due to device capabilities of the PCDs 110, the device capabilities of the client 130, the operating channel conditions of the network 150, and the like.

For example, whether QoS is supported by the PCDs 110 and/or the client 130 may affect the expected jitter in the network 150. The type of operating channel (such as, but not limited to, with respect to a WiFi network, a 2.4 GHz channel, 5 GHz channel, or the like) of the network 150 may affect expected jitter. The operating channel may be based on device deployment or capabilities of the PCDs 110. In one particular example, for a 2.4 GHz channel, overlapping may be common, and wireless link delay may be higher. Bluetooth may interfere with the 2.4 GHz channel, causing jitter.

In some embodiments, a mapping from one or more of the device capabilities of the PCDs 110, the device capabilities of the client 130, the operating channel conditions of the network 150 to the de jitter buffer size may be predetermined. Such mapping method may be used in a static (such as, but not limited to, with respect to FIG. 31B) and/or dynamic de jitter buffer selection (such as, but not limited to, with respect to FIG. 31C), such as described herein.

When a plurality of PCDs 110 are present in the system 100, the worst performing wireless link delay may be used to determine the de jitter buffer size. For example, the worst wireless link delay may be associated with the device capabilities of one of the plurality of PCDs 110. The de jitter buffer size may dynamically change when wireless link delays change. A trigger may be sent to the client 130 when the client 130 and/or at least one of the PCD 110 detect a change of operating conditions.

For each session, the client 130 may select the de jitter buffer size based on the capabilities of the PCD 110 currently in the session. For example, the client 130 may choose a de jitter buffer size that may satisfy the PCD 110 having the worst devices capabilities. Alternatively, the client 130 may choose a de jitter buffer size that may satisfy most of (or a predetermined number of) the PCDs 110 in the session.

FIG. 30 is a mapping table 3000 illustrating examples of predetermined correspondence between the de jitter buffer size and the wireless link delay variation according to various embodiments. Referring to FIGS. 1-30, the mapping table 3000 may include a de jitter buffer size column 3050 containing predetermined de jitter buffer sizes that correspond to various wireless link delay variations (as set forth in columns 3010-3040). The mapping table 3000 may also include channel conditions column 3010 filled with WiFi operating channel types. The mapping table 3000 may additionally include a PCD QoS column 3020 and a client QoS column 3030 indicating whether QoS is supported on the PCD 110 and the client 130, respectively. Furthermore, the mapping table 3000 may include a PCD Bluetooth column 3040 indicating whether Bluetooth is enabled and activated on the PCD 110. Each of the rows 3060 may present a set of wireless link delay variations corresponding to a predetermined de jitter buffer size.

For example, as compared to the 5 GHz channel, the 2.4 GHz channel may be associated with more channel overlap and higher network delay. The deployed access point may or may not support QoS for the network 150. Even when QoS is supported by the network 150, one or more of the PCD 110 or client 130 may not support QoS. Activated Bluetooth on a device may also generate interference with the 2.4 GHz channel on WiFi.

For example, a de jitter buffer size of 80 ms may be selected when the 2.4 GHz channel is used while QoS services and Bluetooth are not supported on the client 130 or the PCD 110. In another example, a de jitter buffer size of 60 ms may be selected when the 2.4 GHz channel is used while QoS is not supported on the client 130 but is supported on the PCD 110. Bluetooth is not activated on the PCD 110 for this case. In yet another example, a de jitter buffer size of 100 ms may be selected when the 2.4 GHz channel is used, Bluetooth is enabled on the PCD 110, and QoS is not supported on the client 130 or the PCD 110. In yet another example, a de jitter buffer size of 60 ms may be selected when a 5 GHz channel is used while QoS and Bluetooth are not supported on the client 130 or the PCD 110. The examples in which neither the client 130 nor the PCD 110 supports QoS may also correspond to the cases in which the access point does not support QoS for the network 150.

The mapping table 3000 may be predetermined and stored in the memory unit 430 of the client 130. Alternatively, the client 130 may request or received the mapping table 3000 from a server. One of ordinary skills in the art would appreciate that the examples shown in FIG. 30 are non-limiting. Additional channel conditions, device capabilities, or wireless link delay variation may be mapped to a de jitter buffer size in a manner such as, but not limited to, illustrated in the mapping table 3000.

Figure 31A:
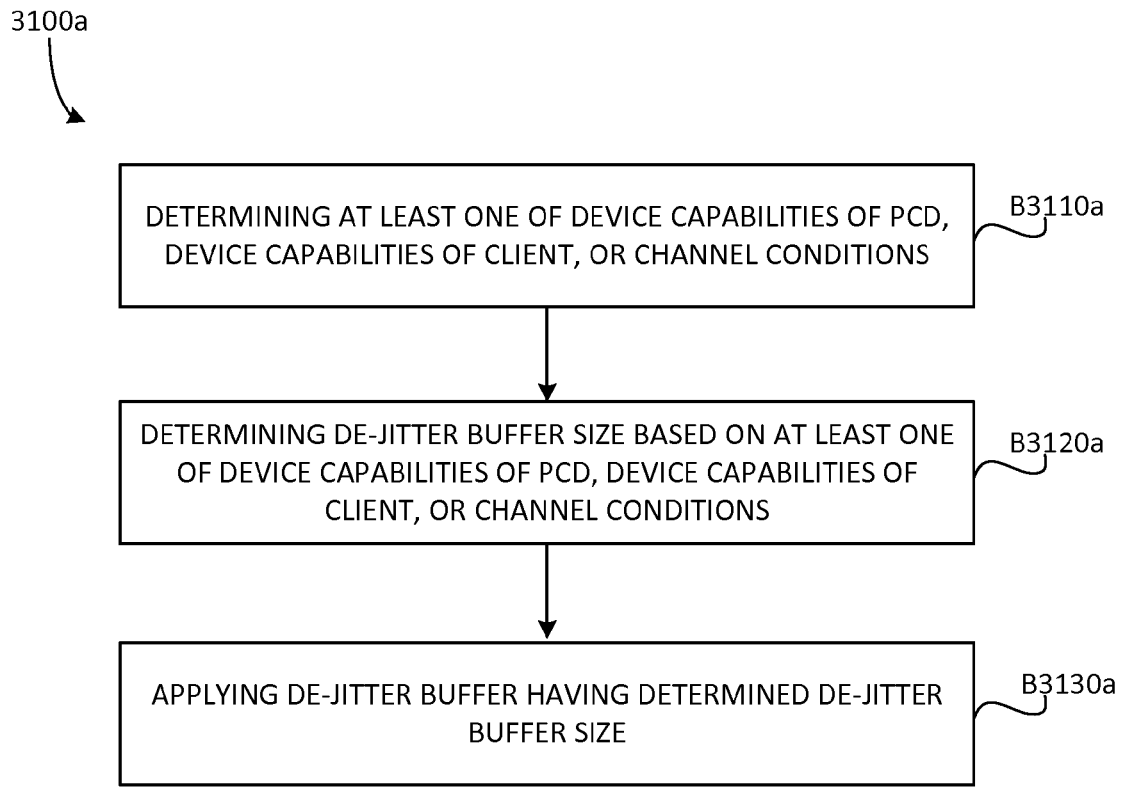
FIG. 31A is a process flowchart illustrating an example of a de-jitter buffer size selection method according to various embodiments.

FIG. 31A is a process flowchart illustrating an example of a de jitter buffer size selection method 3100a according to various embodiments. Referring to FIGS. 1-31A, the de jitter buffer size selection method 3100a may be performed by the processor 420 (as coupled to the network device 440) of the client 130.

At block B3110a, the processor 420 of the client 130 may determine at least one of device capabilities of the PCD 110, the device capabilities of the client 130, or channel conditions. In some embodiments, the device capabilities of the PCD 110 may include whether QoS is supported on the PCD 110, whether Bluetooth is activated on the PCD 110, and the like. In some embodiments, the device capabilities of the client 130 may include whether QoS is supported on the client 130. The device capabilities of the client 130 may be determined locally by the processor 420 of the client 130. The device capabilities of the client 130 may be stored in the memory unit 430 for repeated use. The channel conditions may include network environmental factors such as, but not limited to, types of channel (such as, but not limited to, which of the 2.4 GHz channel or the 5 GHz is being used), and the like.

The network 150 may include a first channel from the PCD 110 to the WiFi access point and a second channel from the WiFi access point to the client 130. The first channel and the second channel may be the same or different channels. The types of channel may be determined for one or both of the first channel or the second channel. The channel type of the first channel may be determined by the PCD 110. The channel type of the first channel may be transmitted by the PCD 110 to the client 130. The channel type for the second channel may be determined by the client 130. With respect to whether QoS may be supported by the network 150, whether the first channel supports QoS and whether the second channel supports QoS may also be determined by the PCD 110 and the client 130, respectively. For example, even though the PCD 110 may support QoS, the access point may not support QoS for the first channel.

The PCD 110 may transmit the device capability of the PCD 110 and/or channel conditions (determined by each PCD 110 for the first channel between the PCD 110 and the access point) to the client 130 via control signals when the active participant session 620 is being established. The PCD 110 may obtain one or more of the device capability of the PCD 110 or channel conditions from an associated access point and relay such information to the client 130 via signals. In some embodiments, the PCD 110 may transmit such data to the client 130 every time a new active participant session 620 is being established (in other words, between different active participant sessions 620). In further or alternative embodiments, the PCD 110 may transmit such data to the client 130 during the active participant session 620 (after the active participant session 620 is established) in response to a change in the device capability of the PCD 110 or channel conditions. Similarly, the client 130 may determine its own device capabilities and/or channel conditions (determined by the client 130 for the second channel between the access point and the client 130).

At block B3120*a*, the processor 420 of the client 130 may determine the de jitter buffer size based on the at least one of the device capabilities of the PCD 110, the device capabilities of the client 130, or channel conditions. In some embodiments, the processor 420 may determine the de jitter buffer size based on a predetermined mapping (such as, but not limited to, the mapping table 3000) between the predetermined de jitter buffer size associated with one or more of the device capabilities of the PCD 110, device capabilities of the client 130, or channel conditions. For example, the variables as determined in block B3110*a* may be entered, and a corresponding result may be determined by the processor 420 based on the mapping table.

At block B3130*a*, the processor 420 of the client 130 may apply the de jitter buffer having the determined de jitter buffer size.

Figure 31B:
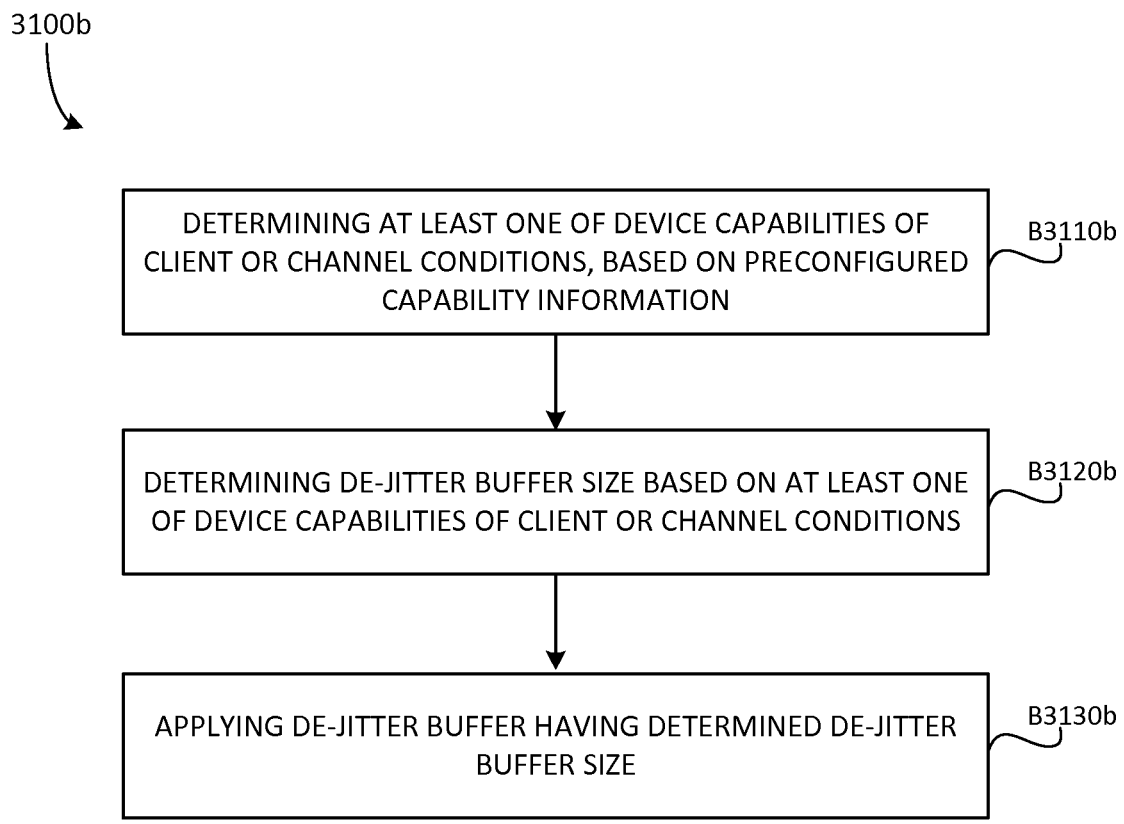
FIG. 31B is a process flowchart illustrating an example of a de-jitter buffer size selection method according to various embodiments.

FIG. 31B is a process flowchart illustrating an example of a de jitter buffer size selection method 3100*b* according to various embodiments. Referring to FIGS. 1-31B, the de jitter buffer size selection method 3100*b* may be performed by the processor 420 (as coupled to the network device 440) of the client 130. The de jitter buffer size selection method 3100*b* may not take into account device capabilities for the PCD 110.

At block B3110*b*, the processor 420 of the client 130 may determine at least one of the device capabilities of the client 130 or channel conditions, based on preconfigured capability information. The device capabilities of the client 130 may include whether QoS is supported on the client 130. The channel conditions may include network environmental factors such as, but not limited to, types of channel (such as, but not limited to, which of the 2.4 GHz channel or the 5 GHz is being used), and the like. For example, a configuration file having preconfigured capability information about the device capabilities of the client 130 and the channel conditions may be stored in the memory unit 430. The preconfigured capability information may be determined automatically by the processor 420 of the client 130. The preconfigured capability information may be determined based on input received via the user interface device 450. Alternatively, the preconfigured capability information may be received from another server (such as, but not limited to, the host 120 or another server(such as, but not limited to, the server 1630)).

Next at block B3120*b*, the processor 420 of the client 130 may determine the de-jitter buffer size based on the at least one of the device capabilities of the client 130 or channel conditions. In other words, the processor 420 of the client may determine the de-jitter buffer size based on the preconfigured capability information. In some embodiments, the processor 420 may determine the de-jitter buffer size based on a predetermined mapping (such as, but not limited to, the mapping table 3000 without columns 3020, 3040, as information related to the PCD 110 may not be used in the determination) between the predetermined de-jitter buffer size associated with one or more of the device capabilities of the client 130 or channel conditions. For example, the variables as determined in block B3110*b* may be entered, and a corresponding result may be determined by the processor 420 based on the mapping table.

Next at block B3130*b*, the processor 420 of the client 130 may apply the de-jitter buffer having the determined de-jitter buffer size.

Figure 31C:
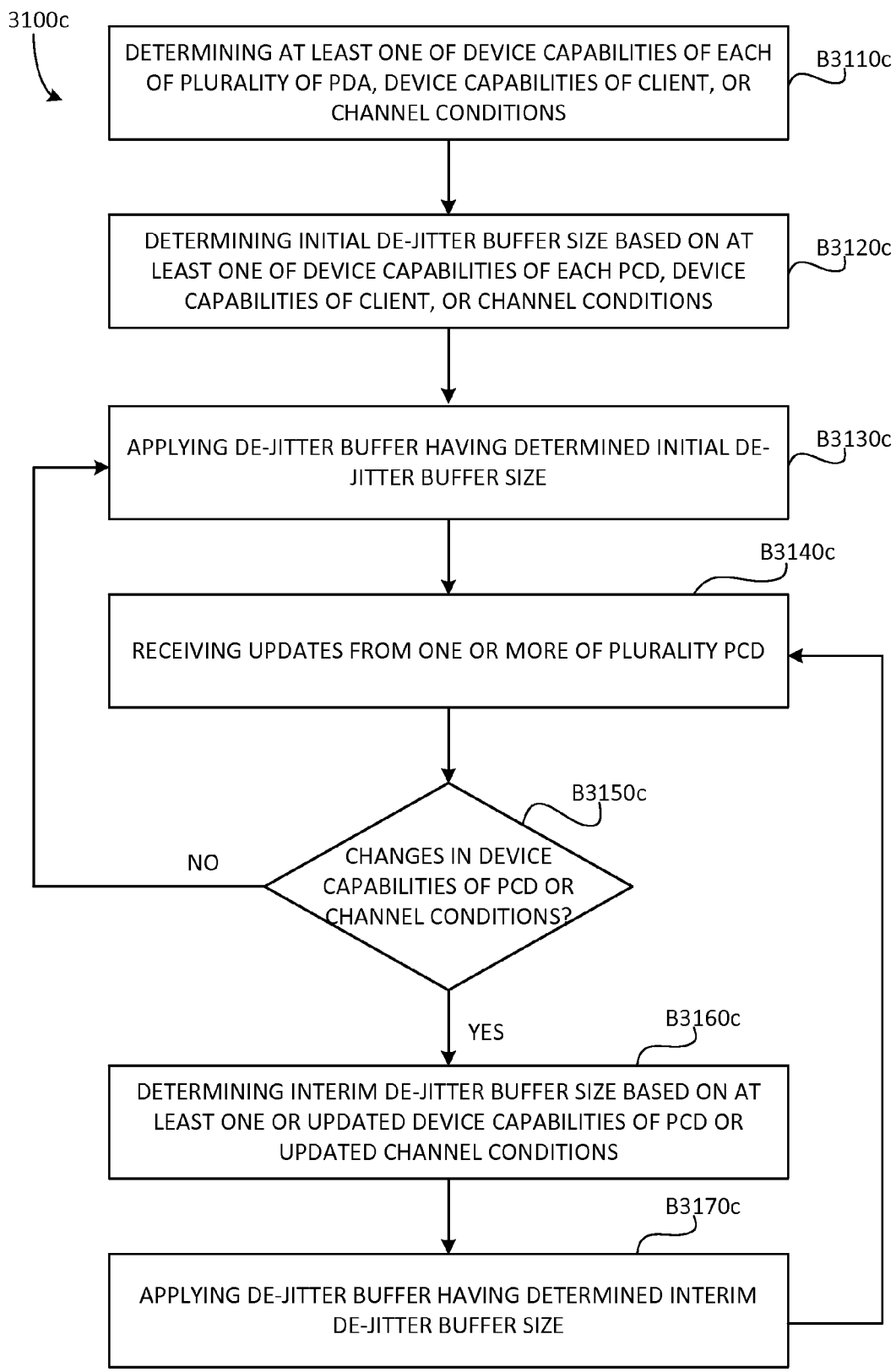
FIG. 31C is a process flowchart illustrating an example of a de-jitter buffer size selection method according to various embodiments.

FIG. 31C is a process flowchart illustrating an example of a de-jitter buffer size selection method 3100*c* according to various embodiments. Referring to FIGS. 1-31C, the de-jitter buffer size selection method 3100*a* may be performed by the processor 420 (as coupled to the network device 440) of the client 130.

At block B3110*c*, the processor 420 of the client 130 may determine at least one of device capabilities of each of a plurality of PCDs 110, the device capabilities of the client 130, or channel conditions. In some embodiments, the device capabilities of each of the plurality of PCDs 110 may include whether QoS is supported on each PCD 110, whether Bluetooth is activated on each PCD 110, and the like. In some embodiments, the device capabilities of the client 130 may include whether QoS is supported on the client 130. The device capabilities of the client 130 may be determined locally by the processor 420 of the client 130. The device capabilities of the client 130 may be stored in the memory unit 430 for repeated use. The channel conditions may include network environmental factors such as, but not limited to, types of channel (such as, but not limited to, which of the 2.4 GHz channel or the 5 GHz is being used), whether QoS is supported by the network 150, and the like.

The network 150 may include a first channel from the PCD 110 to the WiFi access point and a second channel from the WiFi access point to the client 130. The first channel and the second channel may be the same or different channels. The types of channel may refer to one or both of the first channel or the second channel. The channel type of the first channel may be determined by the PCD 110. The channel type of the first channel may be transmitted by the PCD 110 to the client 130. The channel type for the second channel may be determined by the client 130. With respect to whether QoS may be supported by the network 150, whether the first channel supports QoS and whether the second channel supports QoS may also be determined by the PCD 110 and the client 130, respectively. For example, even though the PCD 110 may support QoS, the access point may not support QoS for the first channel.

Each of the plurality of PCDs 110 may transmit its own device capabilities and/or the channel conditions (determined by each PCD 110 for the first channel between the PCD 110 and the access point) to the client 130 via control signals when the active participant session 620 is being established. In some embodiments, the PCD 110 may transmit such data to the client 130 every time a new active participant session 620 is being established. The PCD 110 may obtain one or more of the device capability of the PCD 110 as well as channel conditions from an associated access point and relay such information to the client 130. Similarly, the client 130 may determine its own device capabilities and/or channel conditions (determined by the client 130 for the second channel between the access point and the client 130).

Next at block B3120*c*, the processor 420 of the client 130 may determine an initial de-jitter buffer size based on the at least one of device capabilities of each PCDs 110, the device capabilities of the client 130, or channel conditions. In some embodiments, the processor 420 may determine the initial de-jitter buffer size based on a predetermined mapping (such as, but not limited to, the mapping table 3000) between the predetermined de-jitter buffer size associated with one or more of the device capabilities of each PCD 110, device capabilities of the client 130, or channel conditions. For example, the variables as determined in block B3110*a* may be entered, and a corresponding result may be determined by the processor 420 based on the mapping table.

Given the plurality of PCDs 110 are present in the system 100, the PCD device capabilities and/or the channel conditions for each PCD 110 may be considered together. In some embodiments, the worst PCD device capabilities and/or the worst channel conditions may be used (as the entered parameter for the mapping table 3000) in determining the mapping to the initial de-jitter buffer size. For example, when all of the PCDs 110 are provided with QoS except one, the parameter used for mapping (such as, but not limited to, at the PCD QoS column 3020) may be "NO." In other embodiments, the PCD device capabilities and/or the channel conditions worse than a predetermine percentage of PCDs 110 (such as, but not limited to, 75%, 80%, 90%, 95%, or the like) may be used in determining the mapping to the initial de-jitter buffer size.

Next at block B3130c, the processor 420 of the client 130 may apply the initial de-jitter buffer having the determined de-jitter buffer size. Next at block B3140c, the processor 420 (as coupled to the network device 440 for receiving data) may be configured to receive updates from one or more of the plurality of PCDs 110. Such updates may be periodic updates from each PCD 110 and include current device capabilities of each PCD and/or the channel conditions currently measured by each PCD 110. Next at block B3150c, the processor 420 may determine whether there has been a change in the device capabilities or the channel conditions based on the update. When the processor 420 determines that there has not been a change, the processor 420 may continue to apply the initial de-jitter buffer size, at block B3130c. When the processor 420 determines that there has been a change, the processor 420 may implement block B3160c (B3150c:NO). Alternatively, one of the plurality of PCDs 110 may send a update to the client device 130 only when that PCD 110 detects a change in the device capabilities and/or channel conditions at block B3140c (B3150c: ALWAYS YES).

For example, in a same active participant session 620, one of the plurality of PCDs 110, which has QoS enabled, may move from a first access point (does not support QoS) to another access point (supports QoS). As such, a change in device capabilities associated with that PCD 110 may result. In addition, the updates and/or changes may also include at least one additional PCD 110 joining the active participant session 620. Given that the de-jitter buffer size may be determined by considering the PCD device capabilities and/or the channel conditions for all of the plurality of PCDs 110 in the same active participant session 620, an additional device may cause a change in the collective values of the PCD device capabilities and/or the channel conditions. Subsequently, the parameter value used for the mapping table 3000 may also change. This may be especially important when the newly joined PCD 110 has the worst PCD device capabilities and/or the channel conditions.

At block B3160c, the processor 420 may determine an interim de-jitter buffer size based on at least one updated device capabilities of one of the PCDs 110 or updated channel conditions. The processor 420 may use the updated values and the unchanged values to determine the interim de-jitter buffer size based on the mapping table (such as, but not limited to, the mapping table 3000), in the manner described. A new or unchanged de-jitter buffer size may result.

Next at block B3170c, the processor 420 may apply the de-jitter buffer having the determined interim de-jitter buffer size. The processor 420 may continue to monitor for updates from one or more of the plurality of PCDs 110, at block B3140c, after applying the interim de-jitter buffer size. In various embodiments, the determining of the interim de-jitter buffer size and the applying of the interim de-jitter buffer size may be performed in a same active participant session 620 as the determining of the initial de-jitter buffer size and the applying of the initial de-jitter buffer size. In other embodiments, the determining of the interim de-jitter buffer size and the applying of the interim de-jitter buffer size may be performed in a different active participant session 620 as the determining of the initial de-jitter buffer size and the applying of the initial de-jitter buffer size.

With respect to retransmission count and latency budget, each PCD 110 may determine whether an audio frame is a silent frame or a voice frame using energy-based classification with pulse-code modulation (PCM). Silent frames may be associated with lower retransmission priority (lower retransmission count and/or lower latency budget). The MAC layer may determine transmission counts based on a type of access class (such as, but not limited to, background, best effort, video, audio, and the like) associated with the data packet. An application executed by the processor 220 of the PCD 110 may be used to further differentiate priority within a same access class (such as, but not limited to, audio). For example, voice frames may be associated with higher retransmission count (larger number of retries) and higher latency budget (more resistance to latency in the network 150) as compared to silent frames. As such, when the network is considerably burdened with undelivered data packets, the undelivered silence frames will not significantly negatively impact the transmission/retransmission of the voice frames, which carries actual voice data from the user of the PCD 110.

Figure 32:
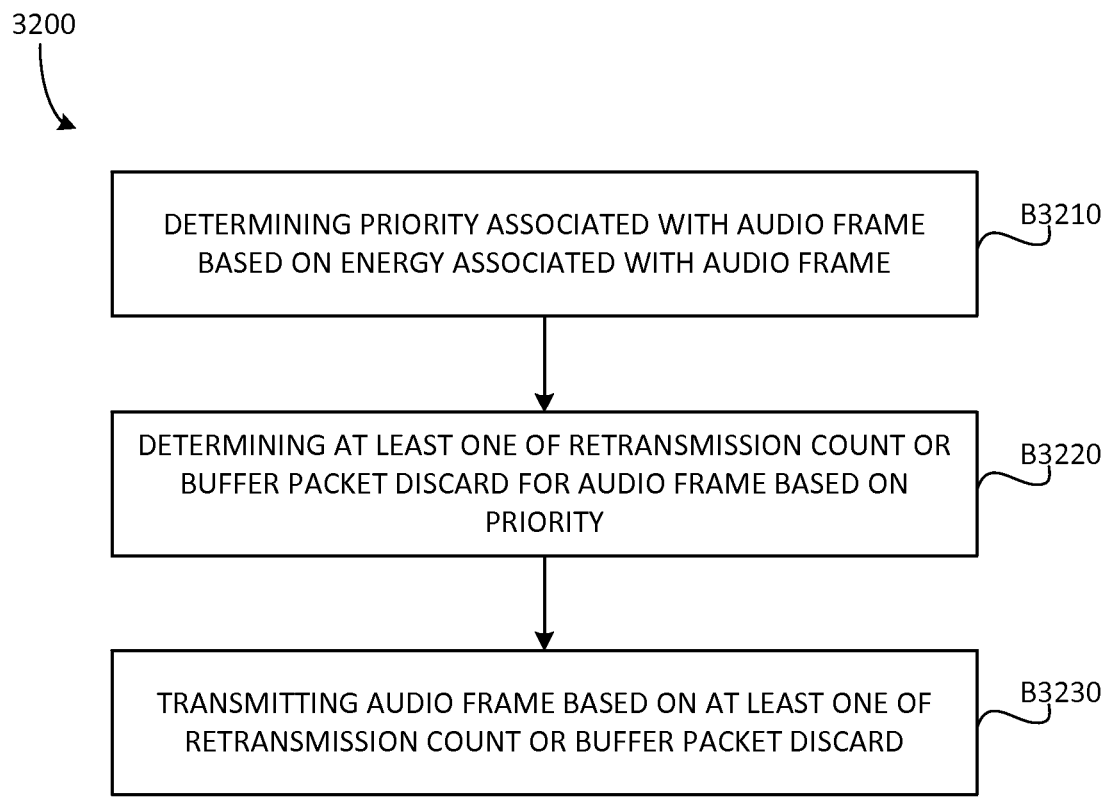
FIG. 32 is a process flowchart illustrating an example of a data transmission method according to various embodiments.

FIG. 32 is a process flowchart illustrating an example of a data transmission method 3200 according to various embodiments. Referring to FIGS. 1-32, the data transmission method 3200 may be performed by the processor 220 (as coupled to the network device 240) of the PCD 110. The MAC layer retransmission count may be determined based on whether the audio packet is a speech frame or a silence frame. The MAC layer retransmission count may also be determined based on the feedback received from the client 130 of the system 100. In such a case, transmitting the silence frames fewer times would help the undelivered data packets without causing any head-of-line queue blocking.

At block B3210, the processor 220 of the PCD 110 may determine a priority associated with an audio frame based on energy associated with the audio frame. The priority may be a transmission priority. The transmission priority may be determined based on energy associated with the audio frame as well as other criteria such as, but not limited to, a signal-to-noise-ratio (SNR), background noise, interference, a combination thereof, and/or the like. The processor 220 may determine an energy associated with the audio frame, at application layer. When the energy associated with the audio frame crosses one or more predetermined thresholds, the audio frame may be assigned a corresponding priority. Illustrating with a non-limiting example, when the energy associated with the audio frame exceeds a predetermined threshold, the audio frame may be classified as a voice frame associated with a higher transmission priority. On the other hand, when the energy associated with the audio frame is below the predetermined threshold, the audio frame may be classified as a silent frame associated with a lower transmission priority. It should be understood that additional thresholds may define three or more classifications of the audio frames based on energy level. Higher transmission priority may be associated with higher energy levels, vice versa. In other embodiments, the transmission priority may be determined with a vocoder.

Alternatively or in addition, the priority correspond to a delay bound determined for the audio frame. The processor 220 (implementing the upper layers) may determine the delay bound (delay tolerance upper bound) for the audio frame based on the energy associated with the audio frame. Illustrating with a non-limiting example, when the energy associated with the audio frame exceeds a predetermined threshold, the audio frame may be designated a larger delay bound (given the audio frame is a voice frame). On the other hand, when the energy associated with the audio frame is below the predetermined threshold, the audio frame may be designated a lesser delay bound (given the audio frame is a silent frame). It should be understood that additional thresholds may define three or more delay bounds.

Next at block B3220, the processor 220 (implementing the MAC layer) may determine at least one of retransmission count or buffer packet discard for the audio frame based on the priority associated with the audio frame. In particular, the MAC layer may determine the retransmission count based on the transmission priority. Higher transmission priority may correspond to higher transmission count. For example, a voice frame may benefit from a full retransmission count (such as, but not limited to, 6, 7, or the like). On the other hand, a silence frame may be associated with a lower retransmission count (such as, but not limited to, 1 or 2). Given that the retransmission count may also be dependent on factors (such as, but not limited to, SNR, background noise, interference, and the like), the retransmission count based solely on frame energy may be adopted as long as other factors do not alter the retransmission count. Otherwise, the retransmission count determined based on only frame energy may be adjusted based on the other factors. The MAC layer may also determine the buffer packet discard for the audio frame based on the delay bound associated with the audio frame.

The MAC layer may determine the retransmission count and MAC buffer packet discard based on the delay bound. For example, silent frames may be assigned a lower buffer packet discard (such as, but not limited to, first discarded when the buffer is full or almost full). On the other hand, voice frames may be assigned a higher buffer packet discard (such as, but not limited to, discarded after the audio frames with lower buffer packet discards have been discarded when the buffer is full or almost full).

Next at block B3230, the processor 220 (coupled with the network device 240) may be configured to transmit the audio frame based on (with) the at least one of retransmission count and/or buffer packet discard, in the active participant session 620 as the PCD output signal 540.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, components, circuits, and algorithm steps described in connection with the embodiments disclosed herein may be implemented as electronic hardware, computer software, or combinations of both. To clearly illustrate this interchangeability of hardware and software, various illustrative components, blocks, components, circuits, and steps have been described in this disclosure generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as, but not limited to, a combination of a DSP and a microprocessor, a plurality of microprocessors, at least one microprocessors in conjunction with a DSP core, or any other such configuration.

The steps of a method or algorithm described in connection with the embodiments disclosed herein may be embodied directly in hardware, in a software component executed by a processor, or in a combination of the two. A software component may be provided in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may be provided in an ASIC. The ASIC may be provided in a user terminal. In the alternative, the processor and the storage medium may be provided as discrete components in a user terminal.

In at least one exemplary embodiments, the functions described may be implemented in hardware, software, firmware, or any combination thereof. If implemented in software, the functions may be stored on or transmitted over as at least one instructions or code on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to carry or store desired program code in the form of instructions or data structures and that may be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The attached Appendix is incorporated herein by reference in its entirety. The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for data communication in a Public Address (PA) system, comprising:
    transmitting, by a client, non-audio data to a Personal Communication Device (PCD) in response to detecting a first triggering event, the non-audio data is used to prevent the PCD from sending an Address Resolution Protocol (ARP) request to refresh the ARP cache on the PCD and to disable the client from entering into a power-saving mode, wherein the first triggering event comprises at least one of:
    (1) the PCD's position in a queue to use the PA system; or
    (2) the PCD has been granted to use the PA system; and
    receiving, by the client, audio data from the PCD with the refreshed ARP cache.

2. The method of claim 1, wherein the non-audio data is transmitted to the PCD when the client has not received the audio data from the PCD and when the PCD is queued to use the PA system.

3. The method of claim 1, wherein:
    the non-audio data is transmitted to the PCD when the PCD has been granted to use the PA system, and;
    the queue comprises requests to access the PA system from a plurality of PCDs.

4. The method of claim 1, further comprising receiving, by the client, bidirectional non-audio data from the PCD in response to detecting the first triggering event, the bidirectional non-audio data comprises at least a request message expecting a response from client.

5. The method of claim 1, further comprising receiving, by the client, unidirectional non-audio data from the PCD to disable the power-saving mode when the PCD is muted, at a shorter interval as compared to the non-audio data sent to prevent ARP cache refresh.

6. The method of claim 1, wherein:
    the PCD outputs the audio data captured by the PCD when granted to use the PA system; and
    the non-audio data is at least one of ping or User Datagram Protocol (UDP).

7. The method of claim 1, wherein the non-audio data is being transmitted via at least one best efforts flow.

8. The method of claim 1, wherein the audio data is being transmitted via at least one Quality of Service (QoS) flow.

9. The method of claim 1, wherein the client sends the non-audio data to the PCD periodically in response to the first triggering event.

10. The method of claim 1, further comprising:
    determining, by the client, a second triggering event; and
    disabling, by the client, a power-saving mode of the client in response to the second triggering event.

11. The method of claim 10, wherein the second triggering event is launching an application on the client.

12. The method of claim 10, wherein the second triggering event is selecting the PCD from a plurality of PCDs to output audio data captured by the PCD.

13. The method of claim 10, wherein the client disables the power-saving mode by calling an Application Programming Interface (API) to disable the power-saving mode.

14. The method of claim 10, further comprising:
    determining, by the client, a third triggering event; and
    enabling, by the client, the power-saving mode of the client in response to the third triggering event.

15. The method of claim 14, wherein the third triggering event is terminating an application on the client.

16. The method of claim 14, wherein the third triggering event is receiving an indication to enable the power-saving mode from a host.

17. The method of claim 14, wherein the third triggering event is terminating outputting audio data captured by the PCD.

18. The method of claim 1, wherein the audio data is transmitted without vocoding, by transmitting Pulse-Code Modulation (PCM) frames.

19. A method for data communication in a Public Address (PA) system, comprising:
    receiving, by a Personal Communication Device (PCD), non-audio data from a client in response to a first triggering event being detected by the client, the non-audio data is used to prevent the PCD from sending an Address Resolution Protocol (ARP) request to refresh the ARP cache on the PCD, wherein the first triggering event comprises at least one of:
    (1) the PCD's position in a queue to use the PA system; or
    (2) the PCD has been granted to use the PA system; and
    transmitting, by the PCD, audio data to the client without sending ARP refresh request.

20. The method of claim 19, further comprising:
    transmitting, by the PCD at a first frame time, a first number of redundant data packets of the audio data;
    transmitting, by the PCD at a second frame time, a second number of redundant data packets of the audio data in response to data packet loss beyond a predetermined tolerance level, the second number being greater than the first number; and
    transmitting, by the PCD at a third frame time, a third number of redundant data packets of the audio data, the third number is between the first number and the second number.

21. The method of claim 20, further comprising determining whether the data packet loss is beyond the predetermined tolerance level, wherein:
    the first frame time is prior in time as compared to the second frame time; and
    the second frame time is prior in time as compared to the third frame time.

22. The method of claim 20, wherein the redundant data packets are audio data packets from audio frames transmitted prior in time.

23. The method of claim 20, further comprising transmitting, at a fourth frame time, the first number of redundant data packets, the first frame time being prior in time as compared to the fourth frame time.

24. The method of claim 20, wherein the predetermined tolerance level is at least one of a number of total data packets lost or a number of continuous data packets lost.

25. The method of claim 19, further comprising:
receiving user input related to gain adjustment of the audio data via an interface;
caching the gain adjustment based on the user input; and
adjusting the audio data based on the cached gain adjustment.

26. The method of claim 25, wherein:
the gain adjustment is normalized across a plurality of PCDs;
the gain is adjusted at the client using Automatic Gain Control (AGC);
the gain is adjusted at each of the plurality of PCDs using the AGC or the Dynamic Range Compression (DRC) based on at least one of device capabilities or changing the frequency of the output signal in a random or pre-determined manner.

27. The method of claim 19, further comprising:
connecting, by the PCD, to a plurality of networks, the network comprises two or more networks associated with at least one of a cellular network, WiFi network with multiple Service Set Identifiers (SSIDs); and
transmitting the audio data via a selected one of the plurality of networks based on attributes of the plurality of networks and requirements associated with the audio data.

28. The method of claim 19, further comprising:
receiving identification information of the client from a host; and
pair with the client in a Device-to-Device (D2D) link, the D2D link comprises at least one of a Wifi-Direct link or Long Term Evolution (LTE)-Direct link.

29. A non-transitory computer medium storing computer-executable instructions such that, when executed, causes a processor of a client in a Public Address (PA) system to:
transmit non-audio data to a Personal Communication Device (PCD) in response to detecting a first triggering event, the non-audio data is used to prevent the PCD from sending an Address Resolution Protocol (ARP) request to refresh the ARP cache on the PCD, wherein the first triggering event comprises at least one of:
(1) the PCD's position in a queue to use the PA system; or
(2) the PCD has been granted to use the PA system; and
receive audio data from the PCD with the refreshed ARP cache.

* * * * *